US012807873B2

(12) United States Patent
Abbott et al.

(10) Patent No.: US 12,807,873 B2
(45) Date of Patent: Nov. 24, 2026

(54) LIQUID CRYSTAL EMULSIONS AND USES THEREOF

(71) Applicant: Cornell University, Ithaca, NY (US)

(72) Inventors: Nicholas L. Abbott, Lansing, NY (US); Sangchul Roh, Ithaca, NY (US)

(73) Assignee: Cornell University, Ithaca, NY (US)

(*) Notice: Subject to any disclaimer, the term of this patent is extended or adjusted under 35 U.S.C. 154(b) by 0 days.

(21) Appl. No.: 18/568,233

(22) PCT Filed: Jun. 7, 2022

(86) PCT No.: PCT/US2022/032543
§ 371 (c)(1),
(2) Date: Dec. 7, 2023

(87) PCT Pub. No.: WO2023/283010
PCT Pub. Date: Jan. 12, 2023

(65) Prior Publication Data

US 2024/0279551 A1 Aug. 22, 2024

Related U.S. Application Data

(60) Provisional application No. 63/197,730, filed on Jun. 7, 2021.

(51) Int. Cl.
*G02F 1/1333* (2006.01)
*C09K 19/54* (2006.01)
*G02F 1/139* (2006.01)
*G02F 1/137* (2006.01)

(52) U.S. Cl.
CPC .......... *C09K 19/542* (2013.01); *G02F 1/1391* (2013.01); *C09K 2323/061* (2020.08); *G02F 1/13743* (2013.01)

(58) Field of Classification Search
CPC .................. C09K 19/52; C09K 19/542; C09K 2019/122; C09K 2019/123; G02F 1/1333; G02F 1/13743
See application file for complete search history.

(56) References Cited

U.S. PATENT DOCUMENTS

| | | | |
|---|---|---|---|
| 3,697,150 | A | 10/1972 | Wysocki |
| 3,974,317 | A | 8/1976 | Sharpless |
| 4,032,219 | A | 6/1977 | Constant et al. |
| 4,999,122 | A | 3/1991 | Lockwood et al. |
| 7,534,369 | B2 | 5/2009 | Suzuki et al. |
| 10,459,128 | B2 | 10/2019 | Milton et al. |
| 2008/0274305 | A1 | 11/2008 | Namiki et al. |
| 2009/0297493 | A1 | 12/2009 | Anderson |
| 2019/0203137 | A1 | 7/2019 | Oumar-Mahamat et al. |
| 2020/0181494 | A1 | 6/2020 | Kragt et al. |
| 2021/0000390 | A1 | 1/2021 | Rogers |
| 2021/0046098 | A1 | 2/2021 | Richter Dayan |
| 2024/0279551 | A1* | 8/2024 | Abbott ................. C09K 19/542 |

FOREIGN PATENT DOCUMENTS

| | | | |
|---|---|---|---|
| CN | 101481082 | A | 7/2009 |
| EP | 0260923 | A2 | 3/1988 |
| WO | 1998053027 | A1 | 11/1998 |
| WO | 2016026995 | A1 | 2/2016 |
| WO | 2019093886 | A1 | 5/2019 |

OTHER PUBLICATIONS

Rai et al., "Interfacial Tension of Liquid Crystalline Droplets", Langmuir, 2003, vol. 19, Issue 18, 7370-7373. (Year: 2003).*
Duven et al., "Structural properties of a cyanobiphenyl monolayer on the graphene surface coated with alkane and alcohol molecules as seen from MD simulations", Journal of Molecular Liquids, vol. 401, May 2024, 124529. (Year: 2024).*
Honaker et al., "Microfluidic Tensiometry Technique for the Characterization of the Interfacial Tension between Immiscible Liquids", Langmuir, 2018, vol. 34, Issue 7, 2403-2409. (Year: 2018).*
Nayani et al., "Steering Active Emulsions with Liquid Crystals", Dec 2019, Langmuir, vol. 36, Issue 25, pp. 3948-6956. (Year: 2019).*
Wang et al., "Thermally configurable Janus droplets with nematic liquid crystalline and isotropic compartments", Feb. 2019, Soft Matter, vol. 15, Issue 12, pp. 2580-2590. (Year: 2019).*
Bermudez et al., "Liquid Crystals in Tribology", International Journal of Molecular Sciences 2009, 10, pp. 4102-4115.
Manda et al., "Paper-like flexible optically isotropic liquid crystal film for tunable diffractive devices", Optics Express, vol. 27. No. 24, Nov. 25, 2019, pp. 34876-34887.

* cited by examiner

*Primary Examiner* — Geraldina Visconti

(57) ABSTRACT

Compositions comprising liquid crystal composition(s) and isotropic liquid composition(s), and optionally, one or more salt(s) and methods of using same. In various examples, a composition is a bistable liquid crystalline emulsion. In various examples, a composition exhibits reversible emulsification and/or demulsification when subjected to an electric field. An optical device can comprise the composition(s). In various examples, device is an optical device, such as, for example, a light shutter, which may be a bistable light shutter or the like, a display, a television, a sensor, a window, which may be a smart window, an energy efficient window, a privacy window, or the like, a smart label, an electronic paper, an electrooptical device, or the like.

20 Claims, 47 Drawing Sheets

State 1

State 2

State 3

LIQUID CRYSTAL EMULSIONS AND USES THEREOF

CROSS-REFERENCE TO RELATED APPLICATIONS

This application is the U.S. national stage of PCT/US2022/032543 filed Jun. 7, 2022, which claims the benefit of U.S. Provisional Patent Application No. 63/197,730, filed Jun. 7, 2021. The contents of the above-identified applications are hereby fully incorporated herein by reference in their entirety.

STATEMENT REGARDING FEDERALLY SPONSORED RESEARCH

This invention was made with government support under DE-SC0019762 awarded by the U.S. Department of Energy, W911NF-19-1-0071 awarded by the Army Research Laboratory—Army Research Office, and 1921722 awarded by the National Science Foundation. The government has certain rights in the invention.

BACKGROUND OF THE DISCLOSURE

Emulsions are a non-equilibrium state of a material in which liquid droplets are dispersed in an immiscible liquid medium. Most emulsions are optically translucent or opaque due to light scattering at dispersed droplets. Changes in sizes and number density of emulsion droplets lead to exponential variations in light transmittance of emulsions. It has been reported that an electric field can either emulsify or coalesce emulsion droplets, and this could be exploited for optical devices. However, it is still challenging to design an emulsion system switching between small droplet dispersion and larger droplet dispersion on-demand reversibly for optical devices. Indeed, without proper stabilization, dispersed droplets become destabilized.

External electric fields have been used to emulsify or demulsify conducting droplets or leaky dielectric emulsion droplets. Under an electric field at low frequency, residual ionic substances in many liquids are attracted to electrodes giving rise to circulating flow in medium or dispersed droplets of emulsions. The shear flow from ion convection can further lead to straining of emulsion droplets by overcoming interfacial tension and leading to fragmentation into smaller droplets. In contrast, dispersed droplets can coalesce under a specific condition of external electric fields through induced dipolar and dielectrophoretic interactions. Similar to the influence of sizes of droplets on optical properties of emulsions, electric field-induced emulsification/demulsification could be the basis of optical devices. However, in common emulsions consisting of isotropic liquids, potential issues include 1) instability of dispersed droplets, 2) difficulty in reversible emulsification and demulsification due to high interfacial tension, and 3) opaque optical appearance of emulsions due to existing large droplets after demulsification.

Liquid crystals (LCs) are viscoelastic liquids consisting of rigid rod-like molecules assuming long-range orientational order. Because of this, LCs exhibit dielectric anisotropy and optical birefringence. These two properties enable LCs to serve as a key material for many electro-optic devices. One of the well-known LC optical devices is polymer dispersed liquid crystals (PDLCs), where LC droplets are uniformly distributed in an isotropic polymer matrix. Without an electric field, PDLCs are opaque due to light scattering at droplet interfaces. By turning on an electric field, LC molecules in the droplet phases are aligned along the field, giving rise to refractive indices match between liquid crystal and polymer matrix. Therefore, PDLCs switch between transparent and opaque states by turning an electric field on and off, respectively. PDLCs have limitations: 1) they are not energetically efficient because the electric field must be applied continuously to maintain transparency, and 2) they exhibit narrow viewing angles (transparency is only apparent when viewed as near-normal incidence). To overcome these limitations, polymer-stabilized bistable cholesteric LCs have been developed as well. These traditional optical devices rely on dielectric anisotropy and birefringence of LCs.

SUMMARY OF THE DISCLOSURE

In various examples, a composition comprises: one or more liquid crystal composition(s); and one or more isotropic liquid composition(s), where the liquid crystal composition(s) and the isotropic liquid composition(s) form coexisting phases, and the interfacial tension between two of the coexisting phases is about 10 mM/m or less. In various examples, the liquid crystal composition(s) is/are chosen from thermotropic liquid crystal compositions, nematic liquid crystalline compositions, and any combination thereof. In various examples, the liquid crystal composition(s) is/are chosen from E7 (4-cyano-4'-n-pentyl-biphenyl, 4-cyano-4'-n-heptyl-biphenyl, 4-cyano-4'-n-oxyoctyl-biphenyl, and 4-cyano-4"-n-pentyl-p-terphenyl at a weight percent ratio of about 51:25:16:8 (based on the total weight of the of 4-cyano-4'-n-pentyl-biphenyl, 4-cyano-4'-n-heptyl-biphenyl, 4-cyano-4'-n-oxyoctyl-biphenyl, and 4-cyano-4"-n-pentyl-p-terphenyl)); cyclohexane-fluorinated biphenyl compounds, fluorinated terphenyl compounds, and mixtures thereof, 4'-butyl-4-heptyl-bicyclohexyl-4-carbonitrile (CCN-47, CAS number 102714-85-2); PCH5 (4-(trans-4-pentylcyclohexyl)benzonitrile); PCH3 (trans-4 (4-propylcyclohexy)benzonitrile); 5CB (4-n-pentyl-4'-cyanobiphenyl); 7CB (4'-Heptyl-4-biphenylcarbonitrile); 80CB (n-octyloxy-cyanobiphenyl); 5CT (CAS No. 54211-46-0; 4-cyano-4'-pentylterphenyl); acrylate functionalized liquid crystal monomers; HNG715600-100; MBBA (N-(p-methoxybenzylidene)-p-butylaniline); DSCG (disodium cromoglycate); and the like; and any combination thereof. In various examples, the liquid crystal composition(s) is/are present in the composition at about 50 volume percent to about 99 volume percent of the coexisting phases. In various examples, the isotropic liquid composition(s) is/are chosen from aliphatic compounds, compounds comprising one or more aliphatic group(s), aliphatic ethers, fluorinated analogs and derivates thereof, and any combination thereof. In various examples, the aliphatic groups are independently at each occurrence a $C_6$ to $C_{16}$ alkyl group. In various examples, the isotropic liquid composition(s) is/are chosen from mineral oils; hexadecanes; dioctylphthalate; squalane; squalene; perfluorononanes; polydimethylsiloxanes; polyphenylmethylsiloxanes; polydiphenysiloxane; polyethers; and the like; and any combination thereof. In various examples, the isotropic liquid component(s) is/are present in the composition at about 1 volume percent to about 50 volume percent of the coexisting phases. In various examples, the liquid crystal composition is E7 (4-cyano-4'-n-pentyl-biphenyl, 4-cyano-4'-n-heptyl-biphenyl, 4-cyano-4'-n-oxyoctyl-biphenyl, and 4-cyano-4"-n-pentyl-p-terphenyl at a weight percent ratio of about 51:25:16:8 (based on the total weight of the of 4-cyano-4'-n-pentyl-biphenyl, 4-cyano-4'-n-heptyl-biphenyl, 4-cyano-4'-n-oxyoctyl-biphenyl, and 4-cyano-4"-n-pentyl-p-terphenyl)). In various examples, the composition comprises: E7 (4-cyano-4'-n-pentyl-biphenyl, 4-cyano-4'-n-heptyl-biphenyl, 4-cyano-4'-n-oxyoctyl-biphenyl, and 4-cyano-4"-n-pentyl-p-terphenyl at a weight percent ratio of about 51:25:16:8 (based on the total weight of the of 4-cyano-4'-n-pentyl-biphenyl, 4-cyano-4'-n-heptyl-biphenyl, 4-cyano-4'-n-oxyoctyl-biphenyl, and 4-cyano-4"-n-pentyl-p-terphenyl)) and mineral oil; E7 and hexadecane; E7 and dioctylphthalate and squalene; E7 and dioctylphthalate; E7 and squalene; E7 and perfluorononane; E7 and polydimethylsiloxane; E7 and polyphenylmethylsiloxane; E7 and polydiphenysiloxane; or E7 and squalane. In various examples, the composition further comprises one or more salt(s). In various examples, the one or more salt(s) is/are chosen from metal salts, organic salts, and any combination thereof. In various examples, the salt(s) is/are chosen from tetrabutylammonium bromide, tetrabutylammonium tetrafluoroborate, malondialdehyde tetrabutylammonium salt, sodium perchlorate, tetra-n-butylammonium perchlorate, trimethylphenylammonium bromide, n-ethyl-1-naphthylamine hydrobromide, trimethylsulfonium bromide, acetylcholine bromide, 2-bromoethylamine hydrobromide, 2-ethoxy-2-oxoethyl dimethyl sulfonium bromide, 3-(carboxymethyl)benzothiazolium bromide, 3-benzylthiazolium bromide, trimethylsulfoxoniumb, 1-butyl-1-methylpiperidinium bromide, bromodimethylsulfonium bromide, (2-carboxyethyl) dimethylsulfonium bromide, triphenylsulfonium bromide, 1-methyl-1-propylpiperidinium bromide, trimethylsulfonium bromide, 1,1'-(2,6-pyridinediyl)bis(3-methylimidazolium) dibromide, potassium iodide, and the like, and any combination thereof. In various examples, the salt(s) is/are present in the composition at about $1\times10^{-10}$ percent by weight (wt %) to 10 percent by weight (wt %) (based on the total weight of the composition). In various examples, the liquid crystal composition comprises E7 (4-cyano-4'-n-pentyl-biphenyl, 4-cyano-4'-n-heptyl-biphenyl, 4-cyano-4'-n-oxyoctyl-biphenyl, and 4-cyano-4"-n-pentyl-p-terphenyl at a weight percent ratio of about 51:25:16:8 (based on the total weight of the of 4-cyano-4'-n-pentyl-biphenyl, 4-cyano-4'-n-heptyl-biphenyl, 4-cyano-4'-n-oxyoctyl-biphenyl, and 4-cyano-4"-n-pentyl-p-terphenyl)), the isotropic liquid composition comprises squalane and dioctylphthalate, wherein the squalane and dioctylphthalate are present at a volume/volume ratio of about 30:70 to about 70:30 (e.g., about 1:1), and the salt is tetrabutylammonium bromide tetrabutylammonium bromide is present at about $1\times10^{-7}$ to about $1\times10^{-3}$ weight per volume (based on the volume of E7). In various examples, the composition is disposed in a space defined by two between two ITO or ITO coated substrates (e.g., ITO coated glass substrates or the like). In various examples, the composition comprises domains of the isotropic liquid composition dispersed in a liquid crystal composition; the composition does not comprise domains of isotropic liquid composition dispersed in the liquid crystal composition; or the composition comprises domains of isotropic liquid composition disposed on a liquid crystal composition and/or a substrate surface. In various examples, the composition is transparent; translucent, or opaque. In various examples, the composition is disposed in a space defined by at least two substrates, where at least two (or all) of the substrates are electrically conducting substrates, and at least one (or all) of the substrates is/are transparent. In various examples, the composition is an emulsion or a multiphase system. In various examples, the composition is a bistable light shutter. In various examples, the composition exhibits one or more or all of the following: a transparent state, a translucent state, or an opaque state after subjecting the composition to an electric field and removing the electric field; reversible emulsification/demulsification of the isotropic liquid component(s) when subjected to an electric field; the liquid crystal composition(s) and isotropic liquid composition(s) are present in distinct phases; or the liquid crystal composition(s) and isotropic liquid composition(s) are present in a multiphase or a multilayer state where at least a portion of or all of the isotropic liquid composition(s) form a layer disposed on at least a portion of or all of a confining surface.

In various examples, A method of altering one or more optical characteristic(s) of one or more composition of the present disclosure, the method comprising: subjecting a layer comprising one or more composition(s) to an electric field, wherein one or more optical propert(ies) and/or one or more structural properties of the layer and/or the composition(s) is/are altered. In various examples, a composition comprises a first state before subjecting the composition to the electric field and a second state after the electric field is removed. In various examples, the first state is an emulsified state or translucent state and the second state is a non-emulsified state or a first state is an non-emulsified state and the second state is an emulsified state or translucent state. In various examples, the one or more structural properties of the layer and/or the composition(s) is/are altered after removal of the electric field.

In various examples, a device comprising one or more composition(s) of the present disclosure. In various examples, the device is an optical device or the like. In various examples, the device is configured to apply an electric field to the composition(s). In various examples, the device is chosen from light shutters, displays, televisions, sensors, smart windows, energy efficient windows, smart labels, electronic paper, electrooptical devices, privacy windows, and the like.

BRIEF DESCRIPTION OF THE FIGURES

For a fuller understanding of the nature and objects of the disclosure, reference should be made to the following detailed description taken in conjunction with the accompanying figures herein.

FIG. 1 shows: (FIG. 1E (right)) A schematic illustration of a transparent state of the same optical device. An isotropic oil phase forms films between the LC phase and the electrodes.

FIG. 2 shows.

A micrograph of a DS/E7 mixture under a direct current (DC) electric field ($E_{DC}$). Bridges connected both electrodes because of electrohydrodynamic (EHD) flow.

FIG. 15 shows a schematic of optical sheets comprising bistable liquid crystalline emulsions (BCLEs).

FIG. 16 shows: (FIG. 16-16F) Schematic illustration and corresponding micrographs of MO and E7 blends (Scale bars: 50 μm), (FIG. 16G) Diameter of MO droplets vs. frequency of AC electric field (250 V), (FIG. 16H) Diameter change of MO droplets formed at 250V and 10 Hz vs. time.

FIG. 17 shows electric field induced coalescence of MO droplets.

FIG. 18 shows: (FIG. 18A, 18B) A photograph and corresponding schematic of a BLCE in a transparent state.

FIG. 20 shows.

DETAILED DESCRIPTION OF THE DISCLOSURE

Figures 1A, 1B, 1C, 1D:
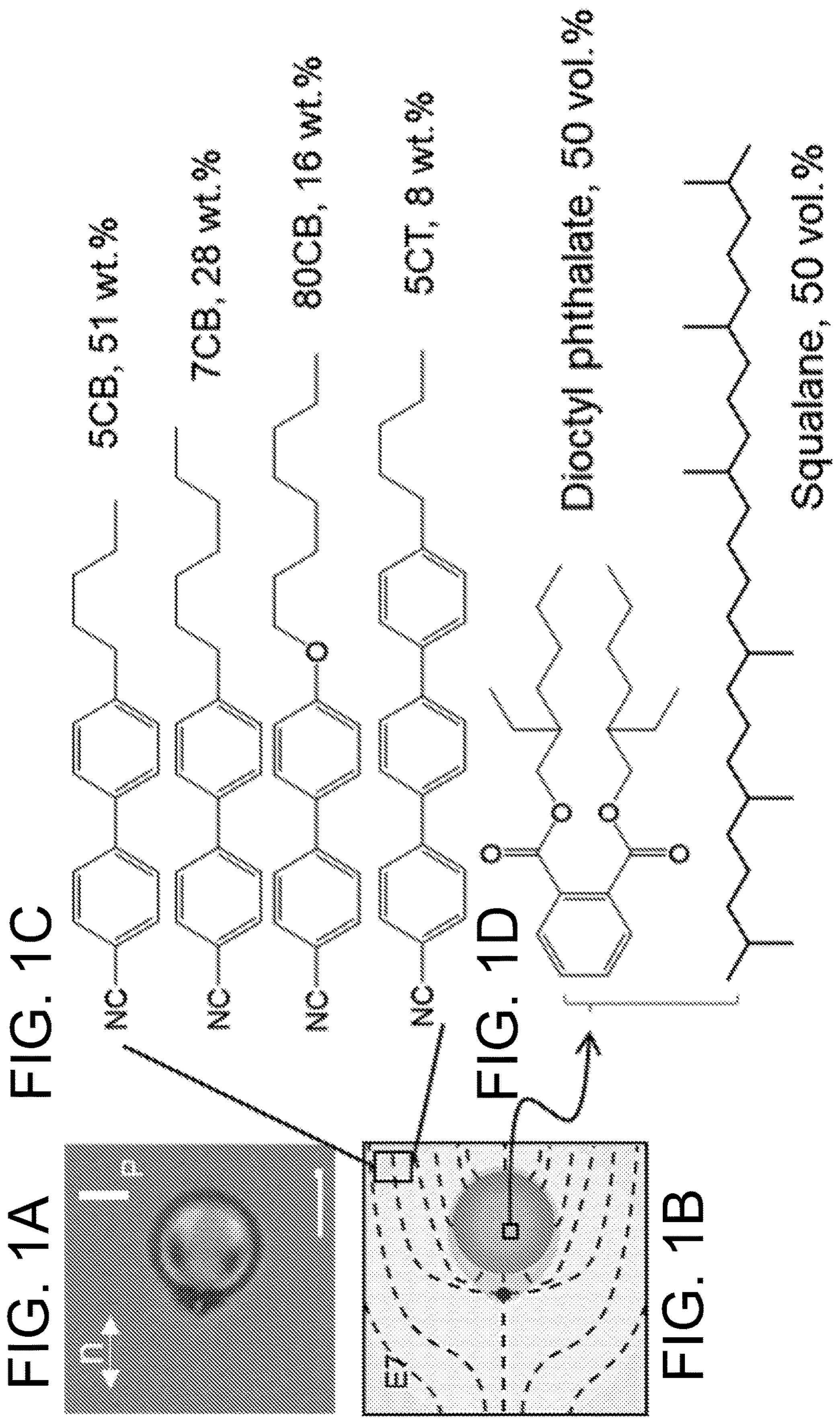
(FIG. 1A) An optical micrograph of an isotropic oil (a 1/1 volume/volume (v/v) mixture of a dioctyl phthalate and squalene (DS)) droplet suspended in a liquid-crystalline (LC) medium, E7 (15 volume percent (vol. %) DS in E7). Scale bar: 10 microns (μm). The arrow indicates bulk LC orientation, and the direction of a polarizer (p) is indicated top-right corner.
(FIG. 1B) A schematic illustration of a director profile of FIG. 1A and a point defect of E7 near a DS droplet. Molecular structures of (FIG. 1C) a liquid crystalline phase (E7) and (FIG. 1D) a isotropic oil phase (DS) used.

Although claimed subject matter will be described in terms of certain examples and embodiments, other examples and embodiments, including examples and embodiments that do not provide all of the benefits and features set forth herein, are also within the scope of this disclosure. Various structural, logical, and process step changes may be made without departing from the scope of the disclosure.

As used herein, unless otherwise indicated, "about", "substantially", or "the like", when used in connection with a measurable variable (such as, for example, a parameter, an amount, a temporal duration, or the like), a list of alternatives, or the like, is meant to encompass variations of and from the specified value including, but not limited to, those within experimental error (which can be determined by, e.g., a given data set, an art accepted standard, etc. and/or with, e.g., a given confidence interval (e.g. 90%, 95%, or more confidence interval from the mean), such as, for example, variations of +/−10% or less, +/−5% or less, +/−1% or less, and +/−0.1% or less of and from the specified value), insofar such variations in a variable and/or variations in the alternatives are appropriate to perform in the instant disclosure. As used herein, the term "about" may mean that the amount or value in question is the exact value or a value that provides equivalent results or effects as recited in the claims or taught herein. That is, it is understood that amounts, sizes, compositions, parameters, and other quantities and characteristics are not and need not be exact, but may be approximate and/or larger or smaller, as desired, reflecting tolerances, conversion factors, rounding off, measurement error, or the like, or other factors known to those of skill in the art such that equivalent results or effects are obtained. In general, an amount, size, composition, parameter, or other quantity or characteristic, or alternative is "about" or "the like," whether or not expressly stated to be such. It is understood that where "about," is used before a quantitative value, the parameter also includes the specific quantitative value itself, unless specifically stated otherwise.

Ranges of values are disclosed herein. The ranges set out a lower limit value and an upper limit value. Unless otherwise stated, the ranges include the lower limit value, the upper limit value, and all values between the lower limit value and the upper limit value, including, but not limited to, all values to the magnitude of the smallest value (either the lower limit value or the upper limit value) of a range. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also, unless otherwise stated, include individual values (e.g., about 1%, about 2%, about 3%, and about 4%) and the sub-ranges (e.g., about 0.5% to about 1.1%; about 0.5% to about 2.4%; about 0.5% to about 3.2%, and about 0.5% to about 4.4%, and other possible sub-ranges) within the indicated range. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about, it will be understood that the particular value forms a further disclosure. For example, if the value "about 10" is disclosed, then "10" is also disclosed.

An aliphatic compound, unless otherwise stated, is a branched or unbranched (linear) hydrocarbon compound or a cyclic hydrocarbon compound, optionally, comprising one or more degree(s) of unsaturation. An aliphatic compound may be an alkane. Non-limiting examples of aliphatic compounds with one or more degree(s) of unsaturation include alkene compounds, alkyne compounds, and the like. In various examples, an aliphatic compound is a $C_1$ to $C_{40}$ aliphatic compound, including all integer numbers of carbons and ranges of numbers of carbons therebetween (e.g., a $C_1$, $C_2$, $C_3$, $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, Cis, $C_{19}$, $C_{20}$, $C_{21}$, $C_{22}$, $C_{23}$, $C_{24}$, $C_{25}$, $C_{26}$, $C_{27}$, $C_{28}$, $C_{29}$, $C_{30}$, $C_{31}$, $C_{32}$, $C_{33}$, $C_{34}$, $C_{35}$, $C_{36}$, $C_{37}$, $C_{38}$, $C_{39}$, or $C_{40}$ aliphatic compound). An aliphatic compound may be unsubstituted or substituted with one or more substituent(s). Examples of substituents include, but are not limited to, halogen groups (—F, —Cl, —Br, and —I), halogenated aliphatic groups, aryl groups, halogenated aryl groups, alkoxide groups, amine groups, nitro groups, carboxylate groups, carboxylic acid groups, ether groups, hydroxyl group, and the like, and combinations thereof. Groups that are aliphatic may be alkyl groups, alkenyl groups, alkynyl groups, or carbocyclic groups, and the like, and combinations thereof.

An aliphatic group, unless otherwise stated, is a branched or unbranched (linear) hydrocarbon group or a cyclic hydrocarbon (carbocyclic) group, optionally, comprising one or more degree(s) of unsaturation. An aliphatic group may be an alkyl group. Non-limiting examples of aliphatic groups with one or more degree(s) of unsaturation include alkenyl groups, alkynyl groups, and aliphatic cyclic groups. In various examples, an aliphatic group is a $C_1$ to $C_6$ aliphatic group, including all integer numbers of carbons and ranges of numbers of carbons therebetween (e.g., a $C_1$, $C_2$, $C_3$, $C_4$, $C_5$, or $C_6$ aliphatic group). In various examples, an aliphatic group is a $C_6$ to $C_{20}$ aliphatic group, including all integer numbers of carbons and ranges of numbers of carbons therebetween (e.g., a $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, or $C_{20}$ aliphatic group). An aliphatic group may be unsubstituted or substituted with one or more substituent(s). Examples of substituents include, but are not limited to, halogens (—F, —Cl, —Br, and —I), aryl groups, halogenated aryl groups, alkoxide groups, amine groups, nitro groups, carboxylate groups, carboxylic acids, ether groups, hydroxyl group, and the like, and combinations thereof.

As used herein, unless otherwise stated, the term "group" refers to a chemical entity that is monovalent (i.e., has one terminus that can be covalently bonded to other chemical species), divalent, or polyvalent (i.e., has two or more termini that can be covalently bonded to other chemical species). The term "group" also includes radicals (e.g., monovalent and multivalent, such as, for example, divalent, trivalent, and the like, radicals). Illustrative examples of groups include:

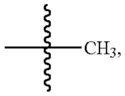,
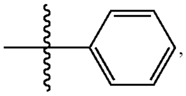,
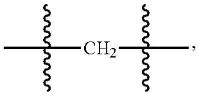, and 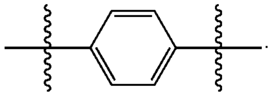.

The present disclosure provides compositions. The present disclosure also provides products of the methods of using and uses of the compositions.

It was surprisingly found, inter alia, that, for example, compositions of the present disclosure form two-phase systems where interfacial tension between an isotropic liquid phase and a liquid crystal phase is low (about 10 mN/m or less). Without intending to be bound by any particular theory, it is considered that this facilitates emulsification of the two-phase system. Further is it considered these compositions determine the anchoring (i.e., orientation) of liquid crystal composition at the interface with the isotropic phase, which may be important for optical appearance and stability of the optical states of the system. It may be desirable that the isostropic liquid composition has a similar viscosity (e.g., about identical) to that of the liquid crystal composition. Without intending to be bound by any particular theory, it is considered this effects the electric field strengths that result in emulsification. It may be desirable that the contact angle of the isotropic liquid composition on a substrate (e.g., an ITO electrode) are low (e.g., about 20 degrees or less) under the liquid crystals. Without intending to be bound by any particular theory, it is considered this enables formation of a transparent state. In various examples, it was surprisingly found that that all these requirements can be met with a composition of the present disclosure.

In an aspect, the present disclosure provides compositions. In various examples, a composition is a bistable liquid crystalline emulsion (BLCE) composition. In various examples, a composition is a bistable light shutter. Non-limiting examples of compositions are provided herein.

In various examples, a composition comprises (consists essentially of or consists of): one or more liquid crystal composition(s); one or more isotropic liquid composition(s), and optionally, one or more salt(s). In various examples, the one or more liquid crystal composition(s) and the one or more isotropic liquid composition(s) forms coexisting phases. In various examples, a composition is an emulsion or a multiphase system (e.g., a two-phase system or the like). In various examples, the amount of liquid crystal composition(s), isotropic liquid composition(s), and, optionally, salt(s) by weight percent or volume percent total 100%. In various examples, a composition does not comprise a polymer (such as, for example, a carbon-based polymer or the like) or the like (which may be a matrix material).

A composition can comprise various coexisting phases. In various examples, a mixture of a liquid crystal composition/compositions and an isotropic liquid composition/composition(s) form coexisting and/or discrete phases. In various examples, the isotropic liquid composition(s) (e.g., isotropic liquid(s)) are a dispersed phase and the liquid crystal composition(s) (e.g., liquid crystal(s)) are a continuous phase. In various examples, the isotropic liquid composition(s) (e.g., isotropic liquid(s)) are a discrete phase (e.g., a layer or the like) and the liquid crystal composition(s) (e.g., liquid crystal(s)) are a discrete phase (e.g., a layer or the like), and the discrete phases form an interface.

A composition can comprise various combinations of liquid crystal compositions and isotropic liquid compositions. Without intending to be bound by any particular theory, it is considered that liquid crystal composition(s) and isotropic liquid composition(s) that have affinity for each other and result in desirable surface tension mixtures (e.g., less than about 10 mN/m, 5 mN/m, or less than about 1 mN/m) provide suitable compositions. By "affinity" it is meant that the isotropic liquid composition(s) (e.g., isotropic liquid(s)) are at least partly miscible or miscible with the liquid crystal composition(s) (e.g., liquid crystal(s)) (e.g., at least some isotropic liquid dissolves into the liquid crystal and at least some of liquid crystal dissolves in the isotropic liquid.

In various examples, the interfacial tension between two of the coexisting phases is about 10 milliN/m (N=Newton(s); m=meter) or less, 5 milliN/m, or less than about 1 milliN/m. In various examples, the interfacial tension between two of the coexisting phases is about 10 mM/m to about 1 microN/m, including all 0.1 microN/m values and ranges therebetween. The interfacial tension can be measured by methods known in the art. In various examples, the interfacial tension is measured using the pendant drop method. The pendant droplet method is an optical method that permits the characterization of the interfacial tension. In various examples, the interfacial tension is measured using a pendant drop method with a goniometer (e.g., obtained from Attension Theta, Biolin Scientific or the like), where a droplet of the liquid crystal composition in the isotropic liquid composition medium hanging from a needle is formed and imaged. As the droplet shape is determined by balancing between interfacial tension and gravitational force, the interfacial tension is measured by analysis of the images with the Young-Laplace equation.

A composition can comprise various liquid crystal compositions. In various examples, a liquid crystal composition comprises (or is) one or more compounds(s) that exhibit liquid crystalline behavior. In various examples, a liquid crystal composition (e.g., a liquid crystal composition that comprises or is one or more liquid crystal compound(s)s or liquid crystal(s)) that exhibits at one or more orientation dependent propert(ies) (e.g., orientation dependent optical propert(ies) or the like). In various examples, a liquid crystal composition is a thermotropic liquid crystal composition (e.g., comprising one or more thermotropic liquid crystal compounds). In various examples, a liquid crystal composition is a nematic liquid crystalline composition (e.g., comprising one or more nematic liquid crystal compounds). Suitable liquid crystal compositions are known in the art. In various examples, liquid crystal composition(s) is/are commercially available and/or can be made by methods known in the art.

In various examples, a liquid crystal composition(s) is/are (or forms/form) a liquid crystal phase or phases in the presence of the isotropic liquid composition(s). In various examples, a liquid crystal composition is a liquid crystal in the absence of a coexisting isotropic liquid, or a liquid crystal composition may not be a liquid crystal (or exhibit liquid crystalline behavior/structure) by itself (e.g., in the absence of an isotropic liquid), but forms a liquid crystal (or exhibit liquid crystalline behavior/structure) in the presence of (e.g., in a mixture with or contacted with) the isotropic liquid composition(s). In various examples, a liquid crystal composition becomes (or forms or is) isotropic in the presence of (e.g., in a mixture with or contacted with) one or more isotropic liquid composition(s).

In various examples, the liquid crystal composition(s) exhibits a conductivity of about $1\times10^{-9}$ or greater Siemens per meter (S/m). In various examples, the liquid crystal composition(s) comprise a conductivity of about $1.0\times10^{-9}$ to about $1.0\times10^{-3}$ S/m.

In various examples, the liquid crystal composition(s) is/are chosen from E7 liquid crystal compositions, mixtures of cyclohexane-fluorinated biphenyls and fluorinated terphenyls), which may form a nematic phase, such as, for example TL205 and the like), CCN-47 (CAS number 102714-85-2), PCH5 (4-(trans-4-pentylcyclohexyl)benzonitrile), PCH3 (trans-4 (4-propylcyclohexy) benzonitrile), 5CB (4-n-pentyl-4'-cyanobiphenyl), 7CB (4'-Heptyl-4-biphenylcarbonitrile), 80CB (n-octyloxy-cyanobiphenyl), 5CT (CAS No. 54211-46-0; 4-cyano-4'-pentylterphenyl), liquid crystal monomers (such as, for example, acrylate functionalized LC monomers (e.g., RM257, RM82, and the like)), where the monomers are substantially unpolymerized or completely unpolymerized, HNG715600-100 (which can be purchased from Jiangsu Hecheng Display Technology), MBBA (N-(p-methoxybenzylidene)-p-butylaniline), DSCG (disodium cromoglycate) (which may be in an aqueous solution), and the like, and combinations thereof. In various examples, the liquid crystal composition is chosen from one or more cyano-, alkyl-substituted biphenyl compounds. In various examples, the cyano-, alkyl-substituted biphenyl compounds are chosen from 4-cyano, alkyl-substituted biphenyl compounds, where the alkyl group(s) is/are independently a $C_4$ to $C_{12}$ alkyl group, which may be a linear alkyl group, and the like.

In various examples, a liquid crystal composition comprises (or is) a 4-cyano-4'-n-alkyl biphenyl (e.g., where the n-alkyl group is a $C_4$ to $C_{10}$ alkyl group or the like); 4-cyano-4'-n-oxyalkyl-biphenyl (e.g., where the n-alkyl group is a $C_4$ to $C_{10}$ alkyl group or the like); 4-cyano-4"-n-alkyl-p-terphenyl (e.g., where the n-alkyl group is a $C_4$ to $C_{10}$ alkyl group or the like), or the like, or any combination thereof. In various examples, a liquid crystal composition comprises (or is) a mixture of 4-cyano-4'-n-pentyl-biphenyl, 4-cyano-4'-n-heptyl-biphenyl, 4-cyano-4'-n-oxyoctyl-biphenyl, and 4-cyano-4"-n-pentyl-p-terphenyl. In various examples, a composition comprises an E7 liquid crystal composition, where the E7 composition is a mixture of 4-cyano-4'-n-pentyl-biphenyl, 4-cyano-4'-n-heptyl-biphenyl, 4-cyano-4'-n-oxyoctyl-biphenyl, and 4-cyano-4"-n-pentyl-p-terphenyl at a weight percent ratio of about 51:25:16:8 (based on the total weight of the of 4-cyano-4'-n-pentyl-biphenyl, 4-cyano-4'-n-heptyl-biphenyl, 4-cyano-4'-n-oxyoctyl-biphenyl, and 4-cyano-4"-n-pentyl-p-terphenyl).

A composition can comprise various amounts of liquid crystal composition(s). In various examples, the liquid crystal composition(s) is/are present in the composition at about 50 volume percent to about 99 volume percent, including all 0.1 volume percent values and ranges therebetween, of the coexisting phases (e.g., the phases after mixing of the liquid crystal composition(s) and isotropic liquid composition(s)). In various examples, the liquid crystal composition(s) is/are present in the composition at about 70 volume percent to about 90 volume percent of the coexisting phases (e.g., the phases after mixing of the liquid crystal composition(s) and isotropic liquid composition(s)).

A composition can comprise various isotropic liquid compositions. In various examples, an isotropic liquid composition comprises (or is) one or more isotropic liquid(s). In various examples, an isotropic liquid comprises (or is) an oil or an isotropic oil. In various examples, an isotropic liquid composition or compositions form(s) a coexisting isotropic phase with the liquid crystalline compositions(s). In various examples, an isotropic liquid can form or forms an isotropic phase that coexists with the liquid crystal composition(s). In various examples, an isotropic composition (e.g., an isotropic composition that comprises or is one or more isotropic liquid(s)) does not exhibit any orientation dependent properties (e.g., orientation dependent optical propert(ies) or the like). Non-limiting examples of isotropic liquid compositions include mineral oils, hexadecanes, squalanes, dioctylphthalates, silicone-based oils, halogenated oils, polyethers, lipids, and the like, and combinations thereof.

In various examples, the isotropic liquid composition(s) are chosen from aliphatic compounds, compounds comprising one or more aliphatic group(s), aliphatic ethers, and the like, and combinations thereof. In various examples, the isotropic liquid composition(s) are chosen from fluorinated (e.g., perfluorinated) aliphatic compounds, compounds comprising one or more fluorinated (e.g., partially fluorinated or perfluorinated) aliphatic group(s), fluorinated (e.g., partially fluorinated or perfluorinated) aliphatic ethers, and the like, and combinations thereof. In various examples, an isotropic liquid composition is a mixture of two more different alkanes. In various examples, an isotropic liquid is an aliphatic compound comprising one or more alkyl group(s). In various examples, a compound comprising one or more alkyl group(s) is a dialkylphthalate or ether comprising two alkyl groups. The alkyl groups are the same or different. In various examples, the alkyl groups are $C_6$ to $C_{16}$ alkyl groups, including all integer number of carbons and ranges therebetween. In various examples, the alkyl groups are independently at each occurrence a $C_6$ to $C_{16}$ alkyl group.

In various examples, an isotropic liquid is a compound comprising one or more alkyl group(s), which may further comprise one or more aliphatic group(s). In various examples, an isotropic liquid is a compound comprising one or more alkyl group(s), which may further comprise one or more aliphatic group(s).

In various examples, an isotropic liquid is a polysiloxane. In various examples, a polysiloxane is an a polyalkylsiloxane (such as, for example, polydimethylsiloxane or the like). In various examples, a polysiloxane is an a polyarylsiloxane (such as, for example, polydiphenylsiloxane or the like). In various examples, a polysiloxane is an a polyalkylaryl siloxane (such as, for example, polyphenylmethuylsiloxane or the like). A polysiloxane can have various molecular weight. Suitable polysiloxanes are known in the art and are commercially available.

A composition can comprise various amounts of isotropic liquid composition(s). In various examples, the isotropic liquid component(s) is/are present in the composition at about 1 volume percent to about 50 volume percent, including all 0.1 volume percent values and ranges therebetween, of the coexisting phases (e.g., the phases after mixing of the liquid crystal composition(s) and isotropic liquid composition(s)).

In various examples, the liquid crystal composition comprises (or is) E7. In various examples, a composition comprises (or is): E7 and mineral oil; E7 and hexadecane; E7 and dioctylphthalate and squalane (which may be present in about a 1:1 volume ratio); E7 and dioctylphthalate; E7 and squalane; E7 and perfluorononane; E7 and polydimethylsiloxane; E7 and polyphenylmethylsiloxane; E7 and polydiphenysiloxane; or E7 and squalene.

In various examples, the viscosity ratio of the liquid crystal composition(s) viscosity to isotropic liquid composition(s) viscosity is about unity (e.g., +/−5%, 4%, 3%, 2%, 1%, 0.5% or 0.1%, where the viscosity may be measured in centipoise (cP)) and/or the interfacial tension between the phases is low (e.g., less than 5 mN/m or less than 1 mN/m) and/or the liquid crystal composition(s) density and isotropic liquid composition(s) density are similar ((e.g., +/−5%, 4%, 3%, 2%, 1%, 0.5% or 0.1%, where the density may be measured in $g/cm^3$)). In various examples, the viscosity ratio of the isotropic liquid composition(s) viscosity (e.g., dispersed phase) to liquid crystal composition(s) (e.g., continuous phase) viscosity is about 1000 or less (e.g., about 900 or less, about 800 or less, about 700 or less, about 600 or less, about 500 or less, about about 400 or less, about 300 or less, or about 100 or less (e.g., about 90 or less, about 80 or less, or about 70 or less)) (where the viscosity may be measured in centipoise (cP)).

In various examples, the liquid crystal composition (s) (e.g., liquid crystals) orient substantially perpendicular or perpendicular to the interface (e.g., a domain interface, such as, for example, a film interface or a droplet/bubble interface) between the isotropic liquid composition(s) and the liquid crystal composition(s). In various examples, in a transparent phase, the liquid crystal composition (s) (e.g., liquid crystals) orient substantially perpendicular or perpendicular to the interface (e.g., a domain interface, such as, for example, a film interface or a droplet/bubble interface) between the isotropic liquid composition(s) and the liquid crystal composition(s).

In various examples, a composition further comprises one or more salt(s). In various examples, a salt is a metal salt, an organic salt (e.g., salts comprising organic cation(s) or the like), or the like. In various examples, an organic salt is an ammonium salt or an alkylammonium salt (e.g., a mono, di, tri, or tetraalkylammonium salt) of an anion, such as, for example, tetrafluorborate, sulfate, halide (F anion, Cl anion, Br anion, I anion, or the like), or the like. In the case of alkylammonium salt(s), the alkyl group(s) of each of the alkylammonium salt(s) are independently $C_1$, $C_2$, $C_3$, $C_4$, $C_5$, or $C_6$ alkyl groups. It may be desirable that the salts be polarizable and soluble in the liquid crystal composition(s) and/or isotropic liquid composition(s) or in a composition. Non-limiting examples of salts include tetrabutylammonium bromides, tetrabutylammonium tetrafluoroborates, malondialdehyde tetrabutylammonium salts, sodium perchlorate, tetra-n-butylammonium perchlorate, trimethylphenylammonium bromide, n-ethyl-1-naphthylamine hydrobromide, trimethylsulfonium bromide, acetylcholine bromide, 2-bromoethylamine hydrobromide, 2-ethoxy-2-oxoethyl dimethyl sulfonium bromide, 3-(carboxymethyl)benzothiazolium bromide, 3-benzylthiazolium bromide, trimethylsulfoxoniumb, 1-butyl-1-methylpiperidinium bromide, bromodimethylsulfonium bromide, (2-carboxyethyl) dimethylsulfonium bromide, triphenylsulfonium bromide, 1-methyl-1-propylpiperidinium bromide, trimethylsulfonium bromide, 1,1'-(2,6-pyridinediyl)bis(3-methylimidazolium) dibromide, potassium iodide, and the like, and combinations thereof.

A composition may further comprise various amounts of salt(s). In various examples, the salt(s) is/are present in a composition at about $1\times10^{-10}$ to about 10 weight % (based on the total weight of the composition), including all $1\times10^{-10}$ weight % values and ranges therebetween. In various examples, the salt(s) is/are present in a composition at about $1\times10^{-10}$ to about 0.1 weight % (based on the total weight of the composition).

In various examples, a composition comprises (or consists essentially of or consists of) E7 as the liquid crystal composition and squalene (or squalane) and dioctylphthalate (which are present in a volume/volume ratio of about 30:70 to about 70:30 (e.g., about 1:1)), where the E7:squalene (or squalane)/dioctylphthalate volume ratio is about 80:20 to 95:5 (e.g., 85:15 to 90:10 or about 87:13), including all 0.1 volume percent ratios and ranges therebetween, where the composition may be disposed in a space defined by two ITO or ITO coated substrates. In various examples, a composition comprises (or consists essentially of or consists of) E7 as the liquid crystal composition and squalene (or squalane) and dioctylphthalate (which are present in a volume/volume ratio of about 30:70 to about 70:30 (e.g., about 1:1)) as the isotropic liquid composition, where the E7:squalene (or squalane)/dioctylphthalate volume ratio is about 80:20 to 95:5 (e.g., 85:15 to 90:10), including all 0.1 volume percent ratios and ranges therebetween, and about $1\times10^{-7}$ to about $1\times10^{-3}$ weight per volume (based on the amount of E7 of one or more tetrabutylammonium halide salt(s) (e.g., tetrabutylammonium bromide or the like), where the composition may be disposed in a space defined by two ITO or ITO coated substrates.

A composition can exhibit various morphologies. In various examples, a composition, which may be an emulsified composition and/or an emulsifiable (e.g., reversibly emulsifiable or the like) composition, has (e.g., reversibly has) various number density and/or size domains (e.g., bubbles or droplets) of isotropic liquid composition dispersed (e.g., uniformly dispersed) in the liquid crystal composition.

A composition can have various forms (e.g., structural features or the like). In various examples, a composition comprises domains (e.g., bubbles or droplets) of isotropic liquid composition dispersed in a liquid crystal composition. In various example, the domains (e.g., bubbles or droplets) are observable by optical microscopy. This may be referred to as an emulsified state. In various examples, a composition does not comprise domains (e.g., bubbles or droplets) of isotropic liquid composition dispersed in the liquid crystal composition. In various examples, the lack of domains (e.g., bubbles or droplets) are observable by optical microscopy. This may be referred to as a non-emulsified state. In various examples, a composition comprises domains (e.g., a layer) of isotropic liquid composition disposed on a liquid crystal composition and/or a substrate surface. The domains (e.g., a layer) may be observable by optical microscopy. This may be referred to as a transparent state. In various examples, the transparent state comprises 5 volume percent (vol. %) or less of bubbles or droplets.

In various examples, a composition is transparent (e.g., the composition exhibits an optical transmission of greater than 60% to 100% (for one or more optical wavelength(s), such as, for example about 400-700 nanometers, including all 0.1 nanometer values and ranges there between). In various examples, a composition is translucent (e.g., the composition exhibits an optical transmission of greater than 30% to 60% (for one or more optical wavelength(s), such as, for example about 400-700 nanometers, including all 0.1 nanometer values and ranges there between). In various examples, a composition is opaque (e.g., the composition exhibits an optical transmission of greater than 0.1% to 30% (for one or more optical wavelength(s), such as, for example about 400-700 nanometers, including all 0.1 nanometer values and ranges there between). Without intending to be bound by any particular theory it is considered that one or more optical propert(ies) of a composition can be altered by applying an electric field to the composition.

In a transparent phase of a composition, in various examples, the liquid crystal composition(s) are anchored. In various examples, in a transparent phase an optical axis of the liquid crystal composition(s) is about +/−10 degrees, 5 degrees, or 1 degree, or about parallel to an axis normal (perpendicular) to an interface between the liquid crystal composition(s) and isotropic liquid composition(s).

In various examples, a composition is disposed in a space defined by two substrates, at least one of which is transparent (e.g., a space defined by a surface of a first substrate that is substantially parallel to a surface of a second substrate). In various examples, the space (which may be referred to a gap) has a thickness (e.g., a dimension perpendicular to a largest surface of one or both of the transparent substrates) of 1 micrometer to 1 millimeter (e.g., 50 microns to 500 microns), including all 0.1 micrometer values and ranges therebetween.

A substrate (e.g., a transparent substrate) may be conducting (e.g., conducting transparent substrate). In various examples, one or all (e.g., both) of the substrates are conducting substrates. A substrate may be reflecting. In various examples, at least one of the substrates is reflective. Non-limiting examples of reflecting substrates include metal substrates and the like. In various examples, one or all (e.g., both) of the substrates are transparent (e.g., transparent conducting substrates). Non-limiting examples of transparent substrates include metal oxide substrates, polymer substrates, and the like.

In various examples, a substrate comprises one or more transparent non-conducing material(s). In various examples, a substrate is a non-conducting substrate (such as, for example, a glass, a polymer, or the like) comprising a conducting material (e.g., a transparent metal film (such as for example, a gold film or the like), graphene, carbon nanotubes, conducting nanowires (which may be metal nanowires, such as, for example, silver nanowires) (which may be in the form of a layer or the like), or the like, or any combination thereof disposed on at least a portion of or all of a surface of the non-conducting substrate that is (or would be) in contact with the composition(s).

In various examples, a substrate (which may be a transparent substrate) comprises (or is) a layer of a material for which at least a portion of or all of the isotropic liquid composition (in the presence of the liquid crystal composition) has a positive spreading coefficient, a small contact angle (e.g., a contact angle of less than 60 degrees), or any combination thereof. In an example, a material having a positive spreading coefficient, a small contact angle, or any combination thereof, is an indium tin oxide (ITO) coating (which may be further coated with DMOAP or the like) or the like.

A substrate (which may be a transparent substrate) may comprise surface topography. Non-limiting examples of surface topography step edges, pillars, and the like, and combinations thereof (which may be disposed on an exterior surface of a substrate that is in contact (or would be) with the composition(s).

In various examples, the space (e.g., the gap) is formed by one or more spacer(s), where each spacer disposed between and in contact with one or both of the substrates, and each spacer having a dimension parallel to the largest surface of one or both of the surfaces (e.g., transparent surfaces). In various examples, spacer(s) independently comprise(s) glass, polymers (e.g., liquid crystalline polymers or the like), liquid crystals, and the like, and any combination thereof. In various examples, the spacer(s) is/are flexible films (e.g., polymer films, such as, for example, polyimide films, liquid crystalline polymer films, adhesive coated polymer films, or the like, or any combination thereof, or the like, or any combination thereof) or the like. In various examples, the spacer(s) is/are surface functionalized spacer(s) (e.g., surface functionalized glass spacer(s), surface functionalized polymer spacer(s), or the like, or any combination thereof), or the like. In various examples, surface functionalized spacer(s) is/are surface functionalized with silanation, thiols, liquid crystal polymer grafting, or the like, or any combination thereof.

In various examples, the substrates (which may be transparent substrate(s)) comprise(s) (or is/are) untreated glass(es), glass(es) coated with a layer of a transparent material, or the like. In various examples, the transparent substrate(s) (e.g., glass(es) or the like) comprise(s) (or is/are) indium-tin-oxide (ITO) (which may be coated with DMOAP or the like), OTS, polyimides, gold film, graphene, carbon nanotubes, silver nanowires, or the like, or any combination thereof. In various examples, the transparent substrate(s) is/are gold film/graphene/carbon nanotubes/silver nanowires-coated glass(es), gold-coated glass(es), ITO-coated glasses (which may be further coated with DMOAP or the like), or the like. In various examples, gold-coated and ITO coated glass(es) is/are further coated with a polyimide, a parylene derivative, a silicone, or the like, or any combination thereof.

It may be desirable the isotropic liquid wets the confining surface(s) of the substrate(s) (which may be transparent substrate(s)) in the presence of the liquid crystal composition. In various examples, an isotropic liquid has a contact angle with a confining surface (or substrate) of about 90 degrees or less (e.g., about 60 degrees or less, about 45 degrees or less, about 30 degrees or less, about 20 degrees or less, about 10 degrees or less, about 5 degrees or less, about 1 degree or less, or zero degrees).

The area of a surface of a substrate that is in contact with one or more composition(s) is not particularly limited. Suitable large area formation processes are known in the art.

In various examples, a composition exhibits one or more or all of the following. The composition exhibits bistability (e.g., multistability or the like) (which may be optical bistability) (e.g., the composition exhibits a transparent state, a translucent state, or an opaque state, such as, for example, after subjecting the composition to an electric field and removing the electric field). The composition exhibits reversible emulsification/demulsification of the isotropic liquid component(s) (e.g., when subjected to an electric field or the like). This may be referred to as field induced emulsification/demulsification. The liquid crystal composition(s) and isotropic liquid composition(s) are present in distinct phases (e.g., a first phase and a second phase, respectively). The liquid crystal composition(s) and isotropic liquid composition(s) are present in a multiphase system (e.g., in an emulsion (which may be an opaque state or a translucent state) or a multilayer state where at least a portion of or all of the isotropic liquid composition(s) (e.g., isotropic liquids) form a layer (which may be a continuous layer) disposed on at least a portion of or all of a confining surface (e.g., a surface of a substrate in contact with the composition). In various examples, a transparent state has an optical transmission (e.g., for one or more optical wavelength(s), such as, for example about 400-700 nanometers, including all 0.1 nanometer values and ranges there between) of greater than 60 to 100%. In various examples, the optical transmission is substantially not angle dependent. In various examples, the optical transmission is not angle dependent.

In a transparent state, an isotropic liquid composition(s) (e.g., isotropic liquid(s)) form/forms a layer disposed on a confining surface (e.g., a surface of a substrate in contact with the composition) and/or the isotropic liquid composition(s) (e.g., isotropic liquid(s)) and liquid crystal composition(s) (e.g., liquid crystals) form/forms finite contact angles. In an example, in a transparent state, at least a portion of or all of the isotropic liquid composition(s) (e.g., isotropic liquid(s)) at least partially wet (e.g., possess a finite contact angle) on at least a portion of or all of a confining surface (e.g., a surface of a substrate in contact with the composition).

In various examples, an opaque state has an optical transmission (e.g., for one or more optical wavelength(s), such as, for example about 400-700 nanometers, including all 0.1 nanometer values and ranges there between) of 0% to 30% (e.g., from about 5% to about 25%, from about 10% to about 20%, or about 0%, about 5%, about 10%, about 20%, about 25%, or about 30%). In various examples, a translucent state has an optical transmission (e.g., for one or more optical wavelength(s), such as, for example about 400-700 nanometers, including all 0.1 nanometer values and ranges there between) of greater than 30% to 60% (e.g., from about 35% to about 55%, from about 40% to about 50%, or about 35%, about 40%, about 45%, about 50%, about 55%, or about 60%). In various examples, the optical transmission is substantially not angle dependent. In various examples, the optical transmission is not angle dependent.

In various examples, subjecting a composition or compositions to an electric field does not result in substantial or any molecular rearrangement of the liquid crystal composition(s) (e.g., a change in orientation of the liquid crystal composition(s) or like) resulting from direct interaction of the electric field with the liquid crystal composition(s) (e.g., no rotational torque is applied to the liquid crystal composition(s) as a result of dielectric anisotropy of the liquid crystal composition(s) or the like). In various examples, subjecting a composition or compositions to an electric field does not result in observable molecular rearrangement of the liquid crystal composition(s) (e.g., a change in orientation of the liquid crystal composition(s) or like). Molecular rearrangement can be observed by method known in the art.

In an aspect, the present disclosure provides methods of using one or more composition(s) of the present disclosure. In various examples, a method alters one or more propert(ies) (e.g., one or more structural/morphological characteristic(s) and/or one or more optical characteristic(s), or the like) of one or more composition(s) or one or more composition(s) of a layer comprising one or more composition(s). Non-limiting examples of methods are provided herein.

In various examples, a method of altering one or more optical characteristic(s) of one or more composition(s) comprises: subjecting a layer comprising one or more composition(s) or one or more composition(s) to an electric field (e.g., applying an electric field to a layer comprising one or more composition(s)), wherein one or more propert(ies) (e.g., one or more structural/morphological characteristic(s) and/or one or more optical characteristic(s), or the like) of the layer and/or composition(s) is/are altered. In various examples, the optical transmission (for one or more optical wavelength(s), such as, for example about 400-700 nanometers, including all 0.1 nanometer values and ranges there between), diffuse reflectance, light scattering, light depolarization, light absorbance of light, opaqueness, or haziness of the composition(s) or the like, or a combination thereof is altered. In various examples, the optical characteristic(s) is/are altered as a result of the composition changing from an emulsified state to a non-emulsified state or a non-emulsified state to an emulsified state. In various examples, at least a portion of, substantially all, or all of the altering is maintained after the subjecting is complete. In various examples, the subjecting the layer to the electric field is not continuous. In various examples, the altered optical characteristic(s) is/are substantially maintained or maintained after the layer is no longer subjected to the electric field.

An electric field may be a DC or an AC electric field. In various examples, the electric field is applied for one or more period(s) (e.g., one or more periods(s) independently having a duration of about 0.1 second to about 60 seconds (including all 0.05 second values and ranges therebetween). In various examples, an electric field is about 0.001 V/μm to about 10 V/μm, including all 0.0005 V/μm values and ranges therebetween. In various examples, the electric field frequency range is about 0.11 Hz to about 10 MHz, including all 0.005 Hz (Hertz) values and ranges therebetween. The electric field (e.g., electric field strength, electric field frequency, or the like, or a combination thereof) may be changed gradually or abruptly.

In various examples, a layer or a composition/compositions is/are subjected to an electric field by applying an electric current to the substrate(s) (e.g., at least two opposing substrates or the like). The electric current may be a DC or an AC electric current. The electric current may be applied in one or more pulse(s). In various examples, an individual pulse duration is about 0.1 second to about 60 seconds, including all 0.1 second values and ranges therebetween.

In various examples, subjecting a composition (which may be an opaque or translucent composition/state) to the electric field results in dielectrophoresis, electrohydrodynamic flow, or any combination thereof, and formation of a translucent composition (e.g., translucent dielectric)/state. This may be referred to as a high frequency electric field.

In various examples, subjecting a composition (which may be a transparent composition/state) to the electric field results in electroconvection and formation of an opaque/translucent state. This may be referred to as a low frequency electric field.

In various examples, a composition comprises a first state before subjecting the composition to the electric field (e.g., the electric field effects one or more or all of the structural and/or optical feature(s) of the composition(s)) and a second state after the electric field is removed (e.g., the electric field no longer effects one or more or all of the structural and/or optical feature(s) of the composition(s)). In various examples, a first state is an emulsified state or translucent state and a second state is a non-emulsified state (which may be a transparent state) or a first state is an non-emulsified state (transparent state) and the second state is an emulsified state or translucent state.

In various examples, subjecting the composition(s) to an electric field does not result in substantial or any molecular rearrangement of the liquid crystal composition(s) (e.g., a change in orientation of the liquid crystal composition(s) or like) resulting from direct interaction of the electric field with the liquid crystal composition(s) (e.g., no rotational torque is applied to the liquid crystal composition(s) as a result of dielectric anisotropy of the liquid crystal composition(s) or the like). In various examples, subjecting the composition(s) to an electric field does not result in observable molecular rearrangement of the liquid crystal composition(s) (e.g., a change in orientation of the liquid crystal composition(s) or like). Molecular rearrangement can be observed by method known in the art.

A composition may comprise domains (e.g., droplets or the like) comprising the isotropic liquid composition(s) disposed in the liquid crystal composition(s). In various examples, a composition comprises domains having size (which may be a linear dimension, such as, for example, a diameter) such that the domains act as scattering sites (e.g., scattering states for light having one or more optical wavelength(s) (e.g., about 400 to about 700 nanometers, including all 0.1 nanometer values and ranges therebetween)). This composition may be said to be an opaque or translucent composition or in an opaque state or a translucent state. A composition may not comprise domains (e.g., droplets or the like) comprising the isotropic liquid(s) disposed in the liquid crystal composition(s). In various examples, a composition does not comprise domains having size (which may be a linear dimension, such as, for example, a diameter) such that the domains act as scattering sites (e.g., scattering states for light having wavelengths of optical wavelengths (e.g., about 400 to about 700 nanometers, including all 0.1 nanometer values and ranges therebetween)). This composition may be said to be a transparent composition or in transparent state.

Subjecting a layer to an electric field can result in a layer being in a transparent state, a translucent state, or an opaque state. In various examples, a transparent state becomes a translucent state or an opaque state, a translucent state becomes a transparent state or opaque state, or an opaque state becomes a transparent or translucent state. It is within the purview of one having ordinary skill in the art to identify the conditions (e.g., electric field propert(ies), layer propert(ies), such as, for example, layer thickness, layer composition, etc., or the like) that provide a desired state.

In various examples, a first state is an opaque or translucent state, and a second state is a transparent state. In various other examples, a first state is a transparent state, and a second state is an opaque state. An opaque state may be an emulsified state. A transparent state may be a non-emulsified state.

In various examples, a first state is a transparent state or translucent state and subjecting the composition to an electric field (e.g., an electric field resulting from application of an electric current) 0.01 V/μm to 100 V/μm, including all 0.005 V/μm values and ranges therebetween and/or a frequency of 0 Hz to 1 kHz, including all 1 Hertz values and ranges therebetween) alters the composition such that composition is in a second state, which is an opaque state or translucent state. In various examples, application of the electric field results in immobilization of the isotropic liquid composition domains in the liquid crystal composition. In various examples, the opaque state or translucent state is stable (e.g., 20% or less, 15% or less, 10% or less, 5% or less, 1% or less, or 0.1% or less change in transmittance (e.g., transmission of light having one or more optical wavelength(s), such as, for example, about 400 to about 700 nanometers, including all 0.1 nanometer values and ranges therebetween), diffuse reflectance, light scattering, light depolarization, light absorbance of light, opaqueness, haziness, or the like, or a combination thereof, for at least 1 minute, at least 10 minutes, at least 30 minutes, at least one hour, at least six hours after removal of (or in the absence of) the electric field). In various examples, the states (e.g., first states and second states) are stable after subjecting the composition to an electric field.

In various examples, a first state is an opaque state or translucent state and subjecting the composition to an electric field (e.g., an electric field resulting from application of an electric current) of 0.01 V/μm to 10 V/μm, including all 0.005 V/μm values and ranges therebetween and/or a frequency of 50 Hz to 10 MHz, including all 1 Hertz values and ranges therebetween) alters the composition such that composition is in a second state, which is a transparent state. In various examples, application of the electric field results in coalescence of the isotropic liquid composition domains. In various examples, the transparent state is stable (e.g., 20% or less, 15% or less, 10% or less, 5% or less, 1% or less, or 0.1% or less change in transmittance (e.g., transmission of light having one or more optical wavelength(s), such as, for example, about 400 to about 700 nanometers, including all 0.1 nanometer values and ranges therebetween), diffuse reflectance, light scattering, light depolarization, light absorbance of light, opaqueness, haziness, or the like, or a combination thereof, for at least 1 minute, at least 10 minutes, at least 30 minutes, at least one hour, at least six hours after removal of (or in the absence of) the electric field).

In various examples, the subjecting is carried out multiple times. In various examples, the states (e.g., first states and second states) are stable after each subjecting.

In an aspect, the present disclosure provides systems. In various examples, a system comprises one or more composition(s) of the present disclosure and/or is configured to carry out a method of the present disclosure. Non-limiting examples of systems are provided herein.

In various examples, a system comprises one or more composition(s), a plurality of substrates (at least two of which are electrically conducting substrates), and a voltage source. The composition(s) are disposed between the substrates. The voltage source is in electrical contact with at least two of the substrates. In various examples, the voltage source provides an AC or DC potential to the substrates.

In various examples, a system comprises at least two electrically conducting substrates, a power source configured to apply one or more potential(s) (e.g. at least two different potentials with different voltages or frequencies or combination thereof) between the at least two electrically conducting substrates, and one or more composition(s) comprising one or more liquid crystal composition(s) and a one or more isotropic liquid composition(s) disposed between the at least two substrates, where the one or more liquid crystal composition(s) and the one or more isotropic liquid composition(s) can form (or form) at least two (e.g. two or three) states (e.g. different states having at least two different transmittance rates with a first transmittance rate of at least 50%, 60%, 70%, or 80%, a second transmittance rate of less than 50%, 40%, 30%, or 20%, and optionally a third transmittance rate between the first and the second transmittance rate) while at least two different potentials (having variations in the values of voltages or frequencies, or a combination thereof) are applied to the at least two electrically conducting substrates and where the at least two states comprise a first state having a first phase (e.g. a phase having substantially no emulsion droplets) under a first potential and a second state having second phase (e.g. a first emulsion phase having a first number of droplets and/or a first average size of droplets (e.g., about 4 μm to about 35 μm) under a second potential and optionally a third state having a third phase (e.g. a second emulsion phase having a second number of droplets and/or a second average size of droplets (e.g., about 4 μm to about 35 μm)) under a third potential.

In an aspect, the present disclosure provides devices. In various examples, a device comprises one or more composition(s) and/or is configured to carry out a method of the present disclosure. In various examples, a device comprises one or more system(s) of the present disclosure and/or is configured to carry out a method of the present disclosure. Non-limiting examples of devices are provided herein.

Various devices can comprise one or more composition(s). A device may be a flexible device. In various examples, a device is a flexible optical device. Non-limiting examples, of devices including light shutters, which may be bistable light shutters or the like, displays, televisions, sensors, windows, which may be smart windows, energy efficient windows, or privacy windows, or the like, smart labels, electronic paper, electrooptical devices, privacy, and the like.

In various examples, a device is an optical device. In various examples, a device exhibits a desirable viewing angle. In various examples, a device exhibits a useful viewing angle of at least 30 degrees (or at least 60 degrees) from the surface normal.

In various examples, a device is configured to apply an electric field to the composition(s). In various examples, a device is configured to apply an electric field to at least a portion of the one or more composition(s). In the case of devices comprising two or more compositions, the device may be configured to apply an electric field to individual compositions.

In various examples, a device comprises one or more multiphase or multilayer composition(s) comprising one or more liquid crystal composition(s) and one or more isotropic liquid composition(s), wherein the one or more liquid crystal composition(s) and the one or more isotropic liquid composition(s) form coexisting phases and an interfacial tension between two of the coexisting phases is about 10 mM/m or less; and at least two conductive elements, each conductive element comprising one or more electrode(s) or an electrically conducting substrate, configured to apply one or more electric field(s) to the one or more multiphase or multilayer composition(s) such that the one or more multiphase or multilayer composition(s) exhibit(s) a plurality of states comprising a first state under and/or after applying a first electric field and a second state under and/or after applying a second electric field, wherein the plurality of states are reversible and are independently a non-emulsified state or an emulsified state. In various examples, the at least two conductive elements comprise at least two electrically conducting substrates having at least one substrate being transparent, and wherein the one or more multiphase or multilayer composition(s) is/are disposed in a space defined by the at least two electrically conducting substrates. In various examples, the first electric field and the second electric field have different frequencies independently from 1Hz-50 kHz, and optionally the first electric field has a frequency of 10Hz or less and the second electric field has a frequency of 1kHz or more.

The following Statements describe various examples of compositions, methods, and devices of the present disclosure and are not intended to be in any way limiting:

Statement 1. A composition comprising (consisting essentially of or consisting of): one or more liquid crystal composition(s); and one or more isotropic liquid composition(s).

Statement 2. A composition according to claim 1, wherein the liquid crystal composition(s) is/are chosen from E7 liquid crystal compositions, mixtures of cyclohexane-fluorinated biphenyls and fluorinated terphenyls), which may form a nematic phase, such as, for example TL205 and the like), CCN-47 (CAS number 102714-85-2), PCH5 (4-(trans-4-pentylcyclohexyl)benzonitrile), PCH3 (trans-4 (4-propylcyclohexy)benzonitrile), 5CB (4-n-pentyl-4'-cyanobiphenyl), 7CB (4'-Heptyl-4-biphenylcarbonitrile), 80CB (n-octyloxy-cyanobiphenyl), 5CT (CAS No. 54211-46-0; 4-cyano-4'-pentylterphenyl), liquid crystal monomers (such as, for example, acrylate functionalized LC monomers (e.g., RM257, RM82, and the like), HNG (HNG715600-100), MBBA (N-(p-methoxybenzylidene)-p-butylaniline), DSCG (disodium cromoglycate) (which may be in an aqueous solution), and the like, and combinations thereof.

Statement 3. A composition according to claim 1 or 2, wherein the liquid crystal composition(s) is/are present in the composition at 50-99% (e.g., 70-90%) volume percent of the coexisting phases (e.g., the phases after mixing of the liquid crystal composition(s) and isotropic liquid composition(s)).

Statement 4. A composition according to any one of the preceding claims, wherein the isotropic liquid composition(s) are chosen from aliphatic compounds, compounds comprising one or more aliphatic group(s), aliphatic ethers, and the like, and combinations thereof.

Statement 5. A composition according to any one of the preceding claims, wherein the isotropic liquid component(s) is/are present in the composition at 1-50% volume percent of the coexisting phases (e.g., the phases after mixing of the liquid crystal composition(s) and isotropic liquid composition(s)).

Statement 6. A composition according to any one of the preceding claims, wherein the composition comprises: E7 and mineral oil; E7 and hexadecane; E7 and dioctylphthalate and squalane (which may be present in about a 1:1 volume ratio); E7 and dioctylphthalate; E7 and squalane; E7 and perfluorononane; E7 and polydimethylsiloxane E7 and polyphenylmethylsiloxane; or E7 and polydiphenysiloxane.

Statement 7. A composition according to claim 1, further comprising one or more salt(s).

Statement 8. A composition according to any one of the preceding claims, wherein the salt(s) is/are chosen from tetrabutylammonium bromide, tetrabutylammonium tetrafluoroborate, malondialdehyde tetrabutylammonium salt, sodium perchlorate, tetra-n-butylammonium perchlorate, trimethylphenylammonium bromide, n-ethyl-1-naphthylamine hydrobromide, trimethylsulfonium bromide, acetylcholine bromide, 2-bromoethylamine hydrobromide, 2-ethoxy-2-oxoethyl dimethyl sulfonium bromide, 3-(Carboxymethyl) benzothiazolium bromide, 3-benzylthiazolium bromide, trimethylsulfoxoniumb, 1-butyl-1-methylpiperidinium bromide, bromodimethylsulfonium bromide, (2-carboxyethyl)dimethylsulfonium bromide, triphenylsulfonium bromide, 1-methyl-1-propylpiperidinium bromide, trimethylsulfonium bromide, 1,1'-(2,6-pyridinediyl)bis(3-methylimidazolium) dibromide, and potassium iodide, and the like, and combinations thereof.

Statement 9. A composition according to any one of the preceding claims, wherein the metal salt(s) is/are present in the composition at $1\times10^{-10}$ to 10 (e.g., $1\times10^{-7}$ to 0.1) weight % (based on the total weight of the composition), including all $1\times10^{-10}$ weight % values and ranges therebetween.

Statement 10. A composition according to any one of the preceding claims, wherein The composition comprises domains (e.g., bubbles or droplets) of isotropic liquid composition dispersed in a liquid crystal composition. The domains (e.g., bubbles or droplets) may be observable by optical microscopy. This may be referred to as an emulsified state.

The composition does not comprise domains (e.g., bubbles or droplets) of isotropic liquid composition dispersed in the liquid crystal composition. The domains (e.g., bubbles or droplets) may be observable by optical microscopy. This may be referred to as a non-emulsified state.

The composition comprises domains (e.g., a layer) of isotropic liquid composition disposed on a liquid crystal composition and/or a substrate surface. The domains (e.g. a layer) may be observable by optical microscopy. This may be referred to as a transparent state.

Statement 11. A composition according to any one of the preceding claims, wherein The composition is transparent (e.g., the composition exhibits an optical transmission of greater than 60% to 100% (for one or more optical wavelength(s), such as, for example about 400-700 nanometers, including all 0.1 nanometer values and ranges there between).

The composition is translucent (e.g., the composition exhibits an optical transmission of greater than 20% to 60% (or greater than 30% to 60%)(for one or more optical wavelength(s), such as, for example about 400-700 nanometers, including all 0.1 nanometer values and ranges there between).

The composition is opaque (e.g., the composition exhibits an optical transmission of greater than 0% to 30% (for one or more optical wavelength(s), such as, for example about 400-700 nanometers, including all 0.1 nanometer values and ranges there between).

Statement 12. A composition according to any one of the preceding claims, wherein the composition is disposed in a space defined by two transparent substrates (e.g., a space defined by a surface of a first substrate that is substantially parallel to a surface of a second substrate).

Statement 13. A composition according to any one of the preceding claims, wherein the composition exhibits one or more or all of the following:

The composition exhibits bistability (e.g., multistability or the like) (which may be optical bistability) (e.g., the composition exhibits a transparent state, a translucent state, or an opaque state, such as, for example, after subjecting the composition to an electric field and removing the electric field).

The composition exhibits reversible emulsification/demulsification of the isotropic liquid component(s) (e.g., when subjected to an electric field or the like). This may be referred to as field induced emulsification/demulsification.

The liquid crystal composition(s) and isotropic liquid composition(s) are present in distinct phases (e.g., a first phase and a second phase, respectively).

The liquid crystal composition(s) and isotropic liquid composition(s) are present in a multiphase system (e.g., in an emulsion (which may be an opaque state or a translucent state) or a multilayer state where at least a portion of or all of the isotropic liquid composition(s) (e.g., isotropic liquids) form a layer (which may be a continuous layer) disposed on at least a portion of or all of a confining surface (e.g., a surface of a substrate in contact with the composition).

Statement 14. A method of altering one or more optical characteristic(s) of one or more composition of the present disclosure (e.g., a composition(s) according to any one of the preceding claims) comprising: subjecting a layer comprising one or more composition(s) to an electric field (e.g., applying an electric field to a layer comprising one or more composition(s)), wherein one or more propert(ies) (e.g., one or more structural/morphological characteristic(s) and/or one or more optical characteristic(s), or the like) of the layer and/or composition(s) is/are altered.

Statement 15. A method according to claim 13, wherein a composition has a first state before subjecting the composition to the electric field (e.g., the electric field effects one or more or all of the structural and/or optical feature(s) of the composition(s)) and a second state after the electric field is removed (e.g., the electric field no longer effects one or more or all of the structural and/or optical feature(s) of the composition(s)).

Statement 16. A device comprising one or more composition(s) of the present disclosure (e.g., one or more composition of any of claims 1-13).

Statement 17. A device according to claim 16, wherein the device is configured to apply an electric field to the composition(s).

Statement 18. A device according to claim 16 or 17, wherein the device is chosen from light shutters, displays, televisions, sensors, smart windows, energy efficient windows, smart labels, electronic paper, electrooptical devices, privacy windows, and the like.

The steps of the methods described in the various embodiments and examples disclosed herein are sufficient to carry out a method of the present disclosure. Thus, in various embodiments, a method consists essentially of a combination of the steps of the methods disclosed herein. In various other embodiments, a method consists of such steps.

The following examples are presented to illustrate the present disclosure. The example is not intended to be limiting in any manner.

Example 1

The following is an example of compositions of the present disclosure, methods of making same, and methods of using same.

In this example, a new class of multistable optical sheets is described comprising a biphasic isotropic oil (a mixture of dioctyl phthalate and Squalane, 1/1 (v/v)) and liquid crystalline oil (E7) mixture confined between two transparent electrodes. The optical sheets exhibit multistable states, including: 1) a transparent state (State 1, transmittance~76%) consisting of layers of LC and isotropic oil without dispersed microdroplets; 2) an opaque state (State 2, transmittance~11%) consisting of a 3D continuous network of microdroplets in liquid crystals (LCs); and 3) less opaque states consisting of levitating small clusters of droplets (State 3, transmittance~34%). The multiple states are accessed by short pulses of an AC electric field at various voltages (0.025-2.5 V/μm) and frequencies (10 Hz-1 kHz). Each state is stabilized for more than 1 hr (hr(s)=hour(s)) without changing in their transmittance significantly. One can engineer pathways to destabilize or stabilize by the change in the nature of the topological defects in states 2, 3, and the change in the topological defect is further controlled by an AC electric field. The capability of an electric field for emulsification and topological defect manipulation forms the basis of designing multistable optical materials with tunable transmittance.

In bulk, nematic LCs exhibit uniform alignment at a ground state. Straining LC from uniform alignment by splay, bend, twist, and saddle-splay modes of deformation generates elastic free energy in bulk LC. At LC interfaces, LC exhibits preferred orientation depending on the intermolecular interaction between LC and a substrate. Deviation from its preferred orientation elevates interfacial free energy at LC interfaces. When LC hosts microdroplets, the orientation of LC near the microdroplets is determined by competition between elastic energy (≈KR) and interfacial free energy (≈$WR^2$), where K is the Frank elastic constant (typical value for thermotropic LCs: K~$10^{-11}$ N), and R is the radius of droplets W is the anchoring energy coefficient (W~$10^{-6}$ J/$m^2$). In the case of $WR^2$>KR, droplet phases generate strong, attractive/repulsive interactions with each other by elastically straining the LCs. Elastic strain and associated topological defects prevent coalescence of emulsion droplets leading to emulsion stabilization (FIG. 1A-1B). The repulsion by elastic force is significantly more substantial than the typical repulsion of water droplets stabilized by surfactants in an oil phase.

Topological defect-mediated stabilization and destabilization of liquid crystalline emulsions as the basis of multistable optical materials. In this example, specific pairs of isotropic oil in liquid crystal emulsion are utilized, enabling fully functional optical devices using electric field-induced emulsification and demulsification. The liquid crystalline medium provides new principles for stabilization of immiscible fluid states using the topological defects of liquid crystals. In this work, topological defects of liquid crystalline phases are exploited as a basis for a multistable droplet system.

Figure 1E:
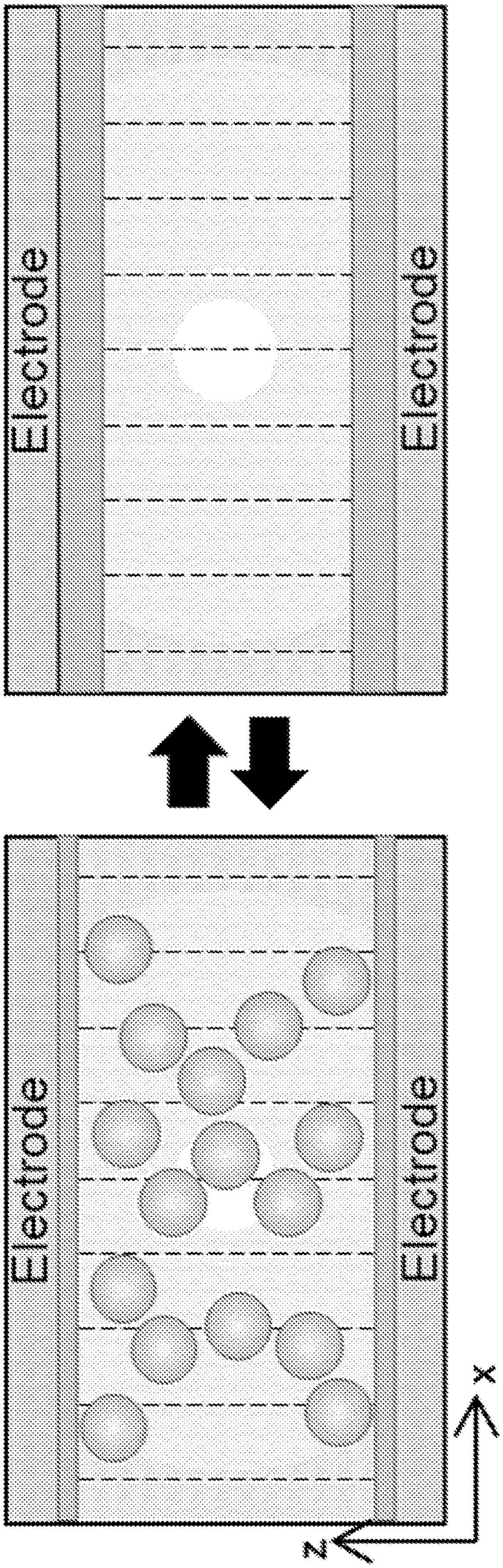
(FIG. 1E (left)) A schematic illustration of an opaque state of an optical sheet comprising emulsion confined between two transparent electrodes. Isotropic oil droplets are dispersed and stabilized in an LC phase.

A multistable optical device was demonstrated comprising isotropic oil and nematic liquid crystal. E7 was used as a nematic liquid crystalline phase (FIG. 1C) and a mixture of dioctyl phthalate and squalane (DS) as an isotropic oil phase (FIG. 1D). The mixture displayed: 1) multiple opaque/translucent states (FIG. 1E (left)); and 2) a transparent state (FIG. 1E (right)). In the opaque/translucent states, DS droplets were evenly dispersed in the E7 medium (FIG. 1E (left)). Topological defect between DS droplets prevented coalescence leading to stabilization of emulsion droplets. In a transparent state (State 1), the DS phase formed skin layers on transparent electrodes, and E7 was confined between DS (FIG. 1E (right)). The multiple states were accessed by a short pulse of an AC electric field at diverse voltages and frequencies. Electric field-induced emulsification of DS in E7, stabilization/destabilization of DS droplets in E7, and optical properties at the multiple states were investigated.

Figure 5B:
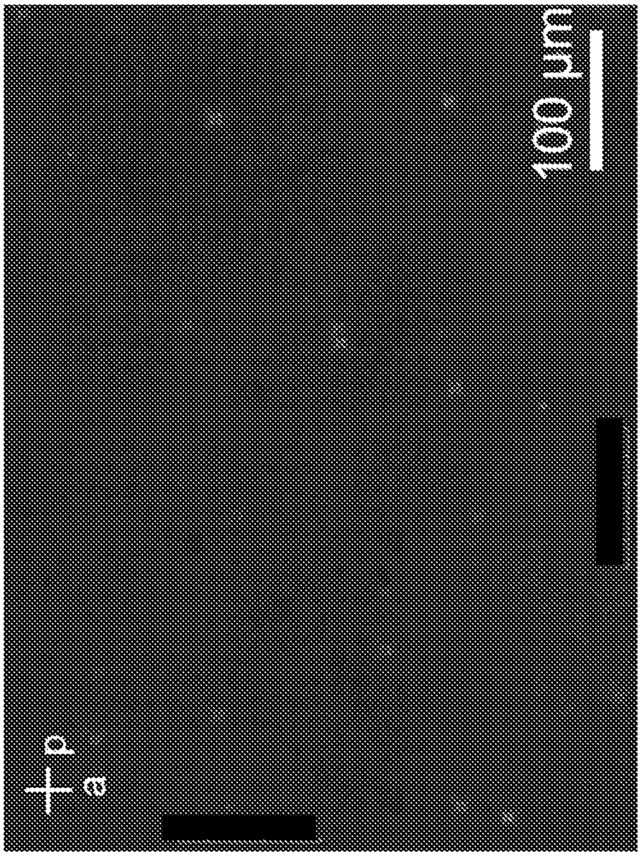
FIG. 5 shows optical micrographs of optical sheets comprising an E7 film between DS layers under (FIG. 5A) single polarizer and (FIG. 5B) crossed polarizers (polarizer (p), analyzer (a)). The directions of polarizers are shown top left corners of the micrographs.

To investigate emulsification of the DS phase by an electric field (FIG. 1E), a 100 μm thick mixture of DS/E7=15/85 (v/v) was prepared between dimethyloctadecyl[3-(trimethoxysilyl)propyl]ammonium chloride (DMOAP) treated ITO glasses. Initial observation revealed that DS phase formed flat films between E7 and ITO glass. When viewed from crossed polarizers, E7 exhibited a dark optical appearance implying that the director, n, aligned perpendicular to the interface of DS film (homeotropic anchoring, FIG. 5). An estimate showed the spreading coefficient (S) is positive, indicating that the DS film formation was favorable. The DS/E7/DS film structure constituted the first stable state (FIGS. 1E (right) and 5).

Figure 2A:
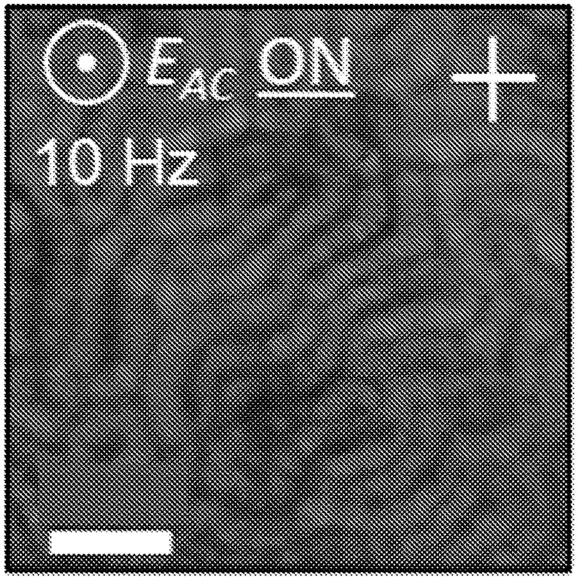
(FIG. 2A) An optical micrograph (cross polars) of a fingerprint pattern from a DS/E7 mixture (15 vol. % DS in E7) under 250 volts (V) and 10 hertz (Hz).
Figure 2B:
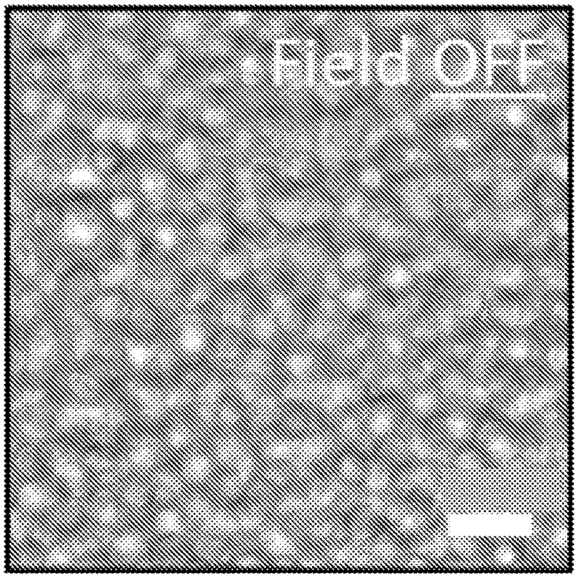
(FIG. 2B) An optical micrograph of DS droplets formed after switching off an alternating current (AC) electric field ($E_{AC}$) at 250 V and 10 Hz.

When various voltage (1-250 V) and frequencies (0-1 kHz) were applied to the layers of E7 and DS films, many variations in the morphology of the E7 and DS mixture were observed (FIG. 2A-2I). Especially under 250 V and 10 Hz, a fingerprint pattern was observed which is a signature of EHD flow of liquid crystals with positive ionic conductivity anisotropy and positive dielectric constant anisotropy (FIG. 2A). After switching off the electric field at 250V and 10 Hz, densely packed emulsion droplets of DS (<5 μm) were observed, and the droplets were uniformly distributed throughout the entire E7 medium (FIG. 2B).

Figure 6:
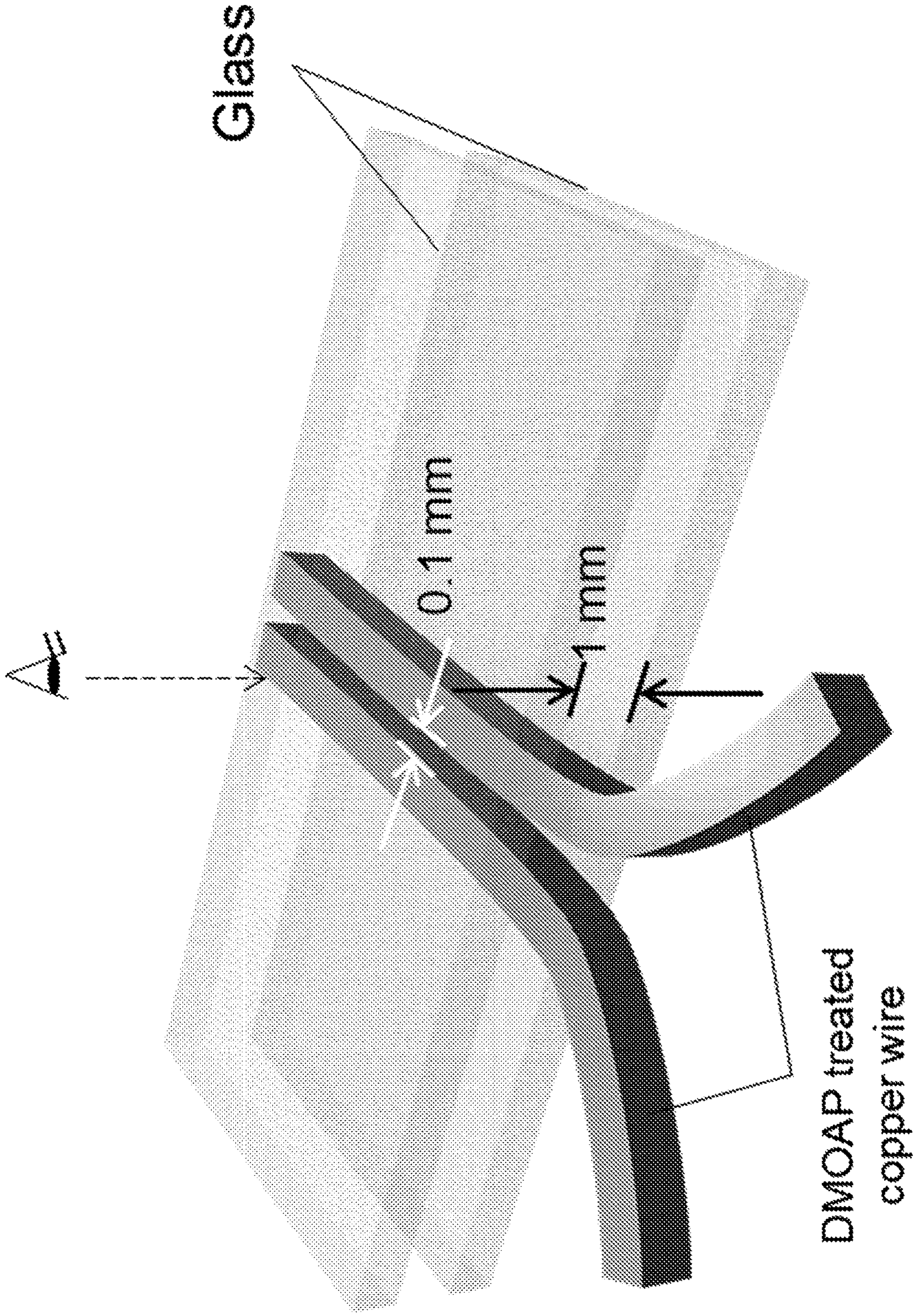
FIG. 6 shows a schematic illustration of an experimental setup to observe a cross-section of pure E7 between two copper electrodes.
Figure 7A:
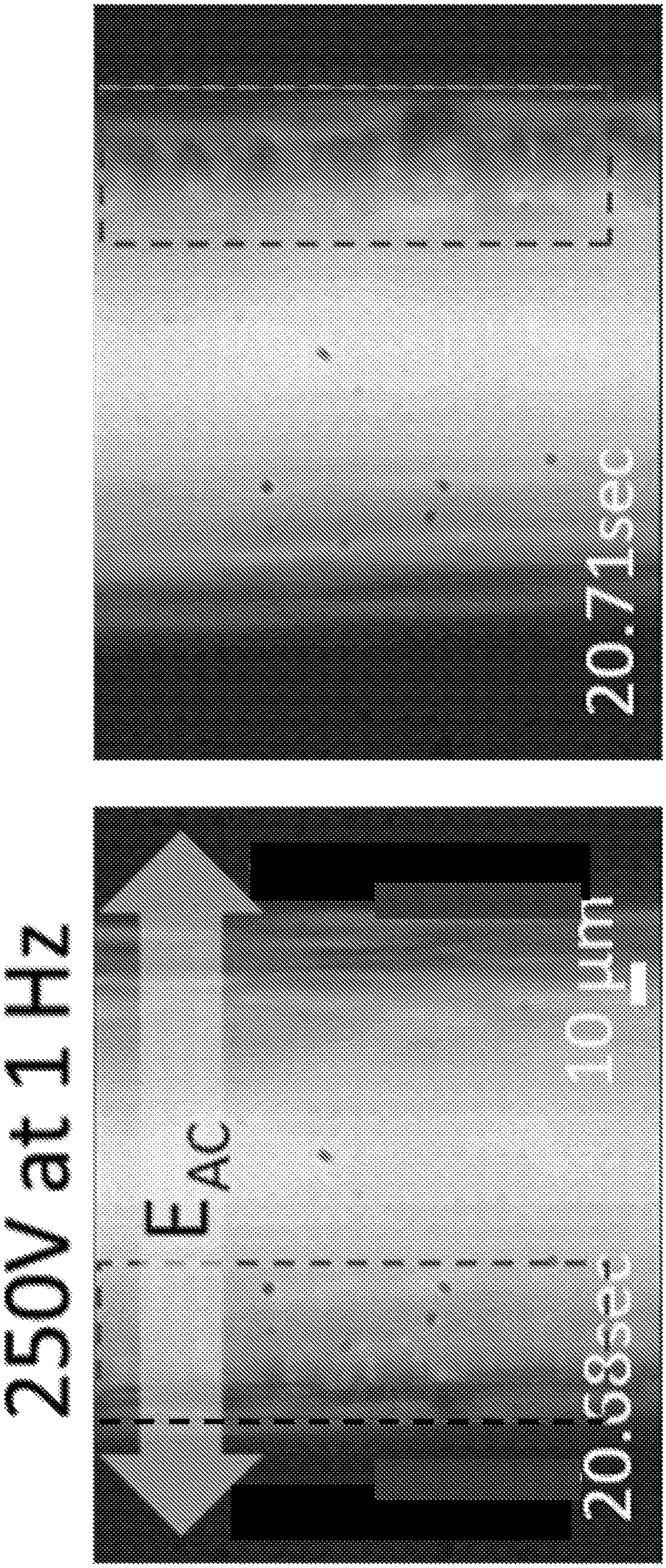
FIG. 7 shows optical micrographs showing tracer particle (polyethylene (PE) particle) movement in pure E7 liquid in the experimental setup of FIG. 6 under an electric field at 250 V (FIG. 7A) 1 Hz, (FIG. 7B) 10 Hz, (FIG. 7C) 50 Hz, and (FIG. 7D) 1 kHz (after field off). The boxes indicate the location of PE particles. The micrographs were taken under a polarizer.
Figure 7B:
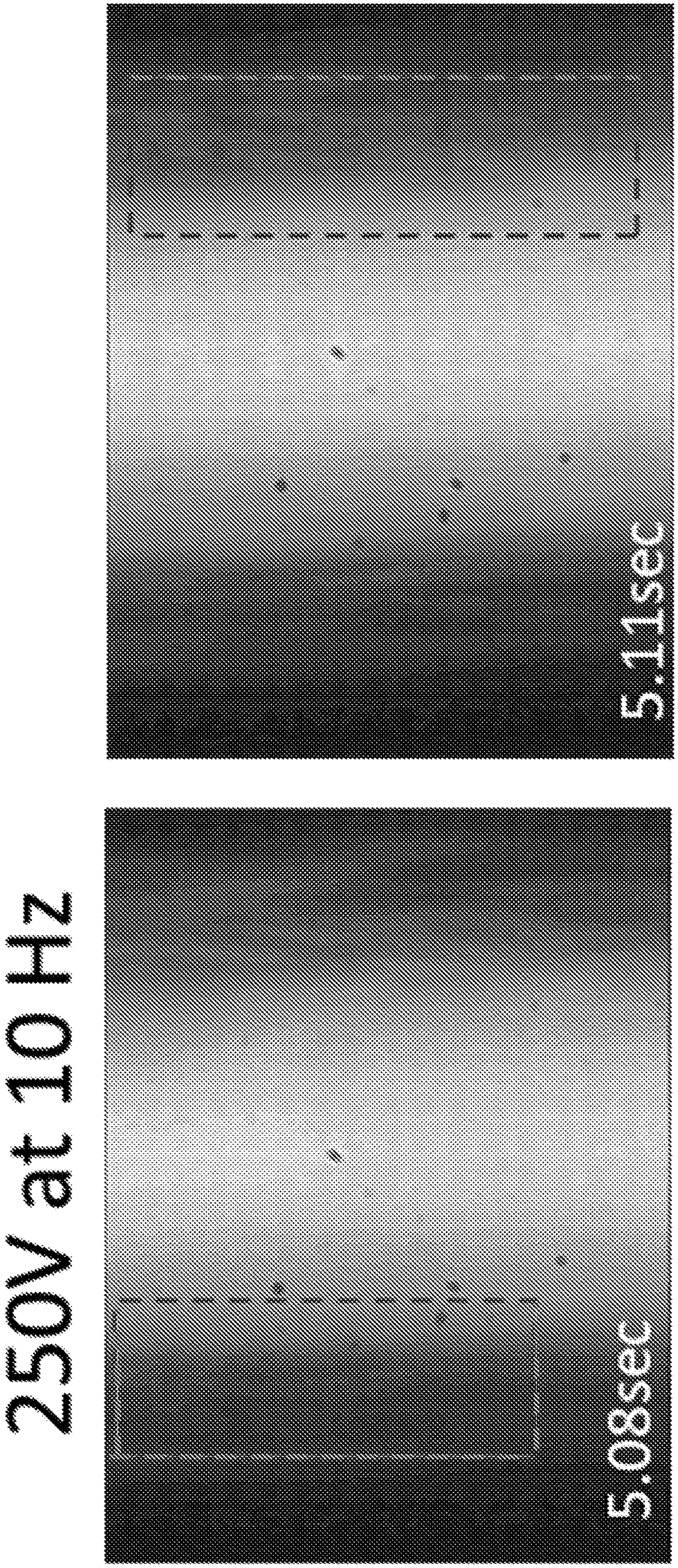
Figure 7C:
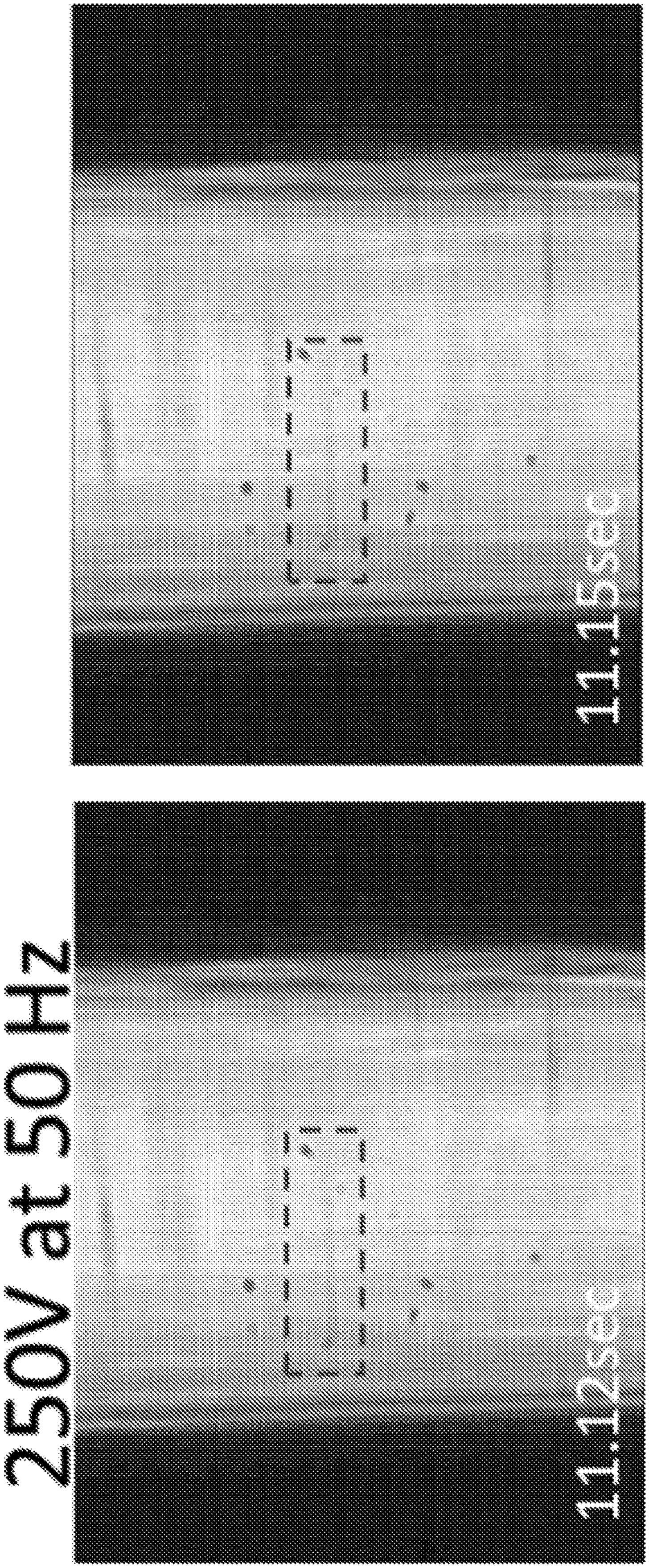
Figure 7D:
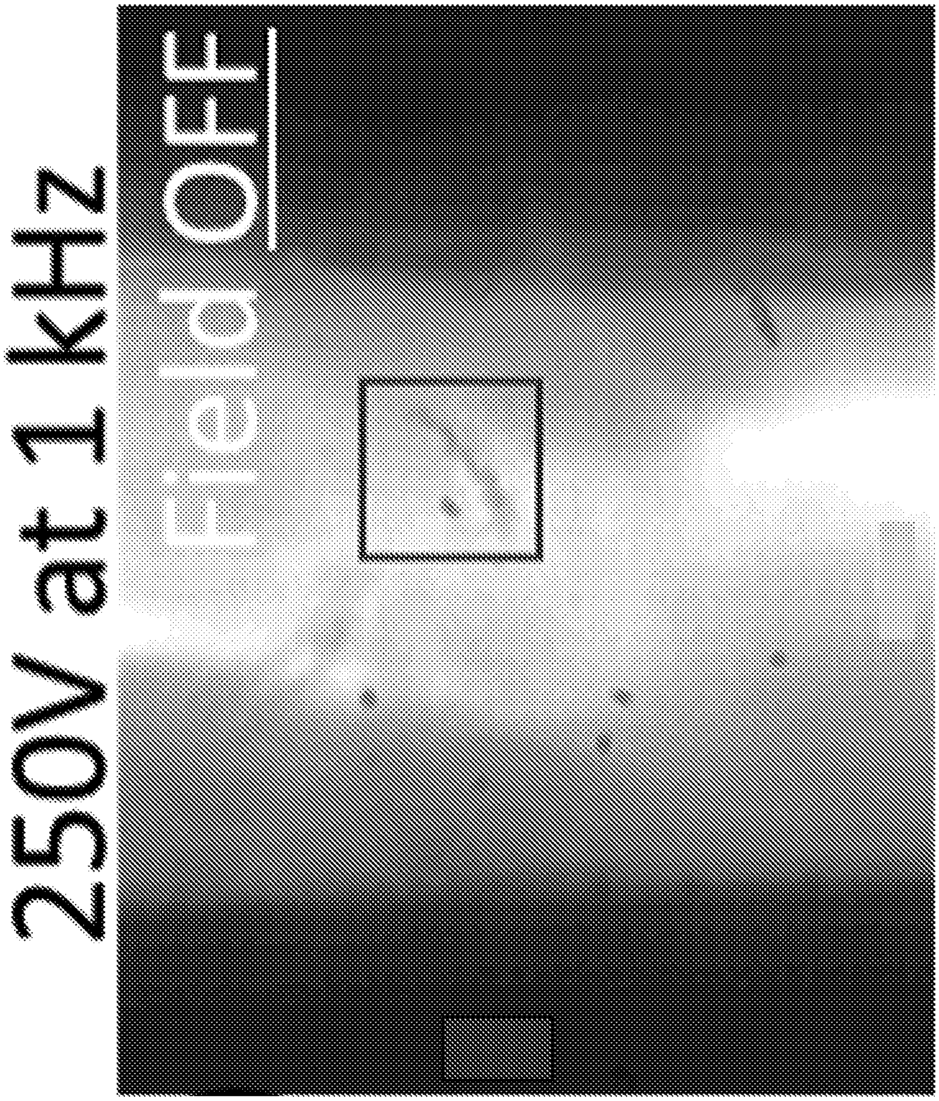

The relatively low-frequency range (1-10 Hz) and the fingerprint pattern (FIG. 2A-2B) for small droplet formation led to the speculation that efficient emulsification of the DS phase is driven by electrohydrodynamic (EHD) flow resulting from the circulation of inherent ionic impurities (conductivity of E7~$10^{-7}$-$10^{-8}$ Siemens per meter (S/m)) in LC. For a better understanding of the EHD flow behavior, tracer particles (polyethylene (PE), 1-3 μm in diameter) were dispersed in pure E7 sandwiched between two copper wire electrodes (FIG. 6) and applied AC electric field at 250V at a various frequency (f=0-1 kHz, FIG. 7A-7D (boxes indicate the location of PE particles)). Within the frequency range of less than 10 Hz, the particles switched their positions rapidly from one surface of the electrode to the other surface of the electrode whenever the electrodes change their polarity (FIG. 7A). At 250 V, the velocity of particles was estimated to v>3.6 mm/sec between 0-10 Hz (FIG. 7B). At a moderate frequency range (100 Hz<f<500 Hz), the particles started vibrating in the bulk LC medium without reaching the electrodes (FIG. 7C). Above 1 kHz, the particles were chained and stayed in bulk without any noticeable vibration (FIG. 7D). From this result, it was concluded that the EHD flow was more active at the low-frequency range (0-10 Hz) and was highly suppressed above 10 Hz.

Figure 2C:
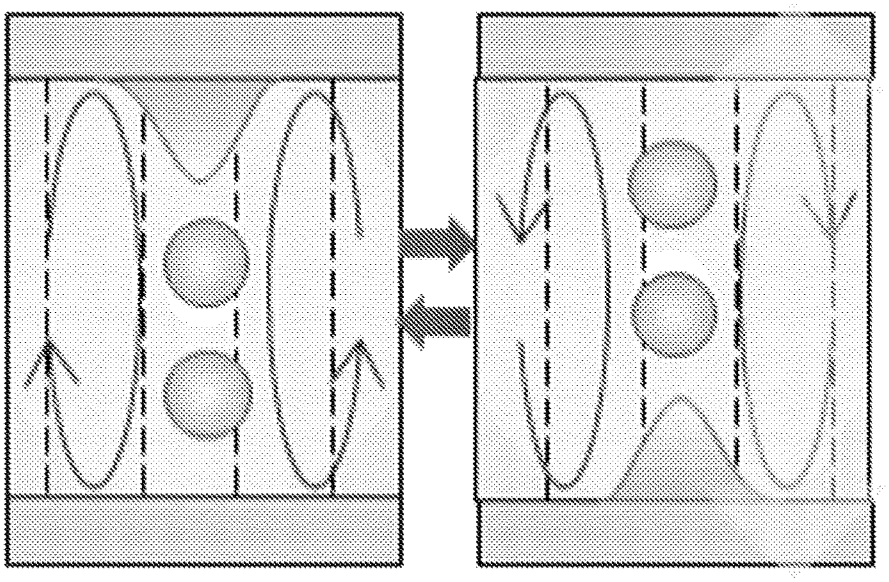
(FIG. 2C) A schematic illustration of a mechanism of emulsification at 250 V/10 Hz.
Figure 2D:
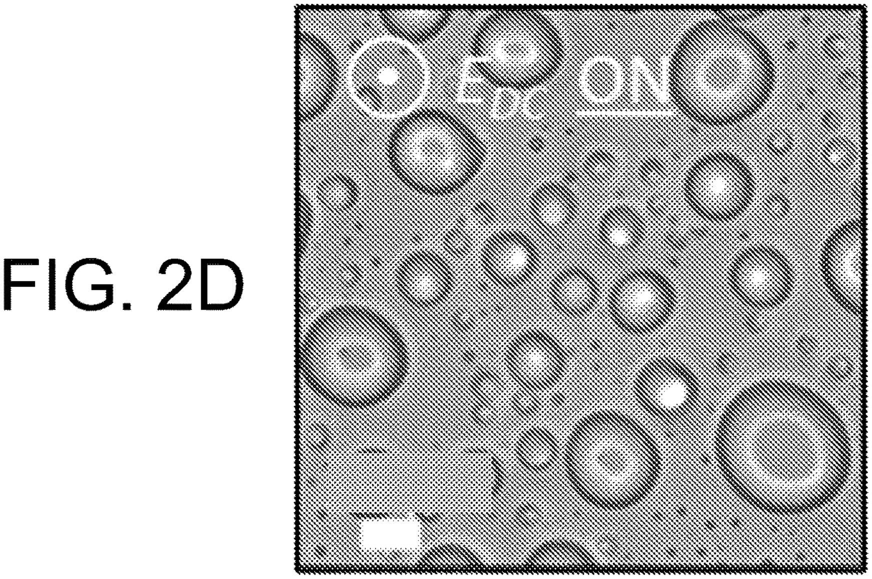
(FIG. 2D)

Next, it was investigated whether the EHD flow generated a high enough shear stress to emulsify the DS phase. The shear rate of the E7 is $\dot{\gamma}$~2v/$d_p$~575 $sec^{-1}$, where v is the flow velocity (e.g., mm/sec) in the E7 phase, and $d_p$ is the lateral size (e.g., mm) of flow circulation as discussed herein (FIG. 2D). Given the viscosities of E7, $\eta_{E7}$~30 millipascal-second (mPa·s), dioctyl phthalate, $\rho_{DOP}$~56 mPa·s, and squalane, $\eta_{squalane}$~31 mPa·s, the viscosity ratio between dispersed phase/continuous phase is ~1 of which corresponding critical capillary number ($Ca_{cr}$) is approximately 0.5 which is close to minimum $Ca_{cr}$ for the efficient emulsification. The shear stress of E7 is $\eta_{E7}\dot{\gamma}$=17.25 Pa. At this shear stress, characteristic capillary length, which approximately accounts for the sizes of emulsion droplets is given by $a=\gamma/\tau\ Ca_{cr}$~7 μm where γ is interfacial tension (measured in millinewton per meter (mN/m)) of DS/E7 (Table 1). This estimation indicates that any DS droplets that are larger than 7 μm can be elongated and fragmented by a shear stress induced by EHD flow. This estimation is well correlated with the experimentally obtained droplet size (<5 μm).

TABLE 1

| Liquid Crystal Phase | Isotropic Oil Phase | Electric Field Induced Emulsification | Interfacial Tension mN/m | Viscosity mPa · s |
|---|---|---|---|---|
| E7 | Mineral Oil | Yes | — | ~20 |
| E7 | Perfluorodecahydronaphthalene | No | 9.8 ± 0.1 | 5.1 |
| E7 | Water (w/5 mM SDS) | No | 5 | 1 |
| E7 | Squalane/Dioctylphthalate (1/1 v/v mix) | Yes | <0.3 | ~30 |
| E7 | Silicone Oil | No | 1.4 ± 0.1 | 200 |

Figure 2E:
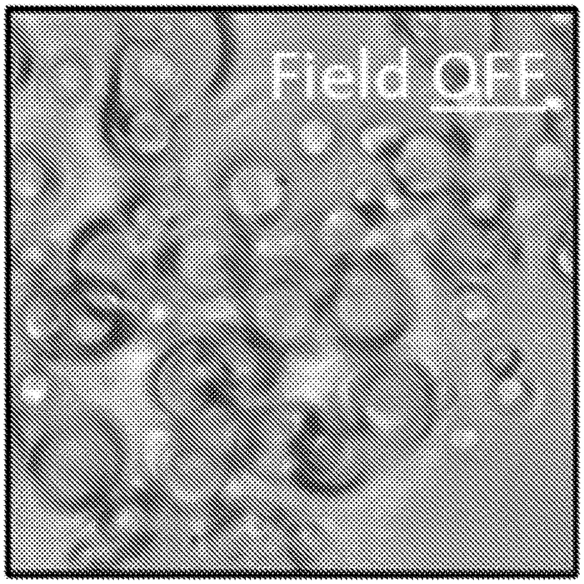
(FIG. 2E) DS droplets formed from 250V DC.
Figure 2F:
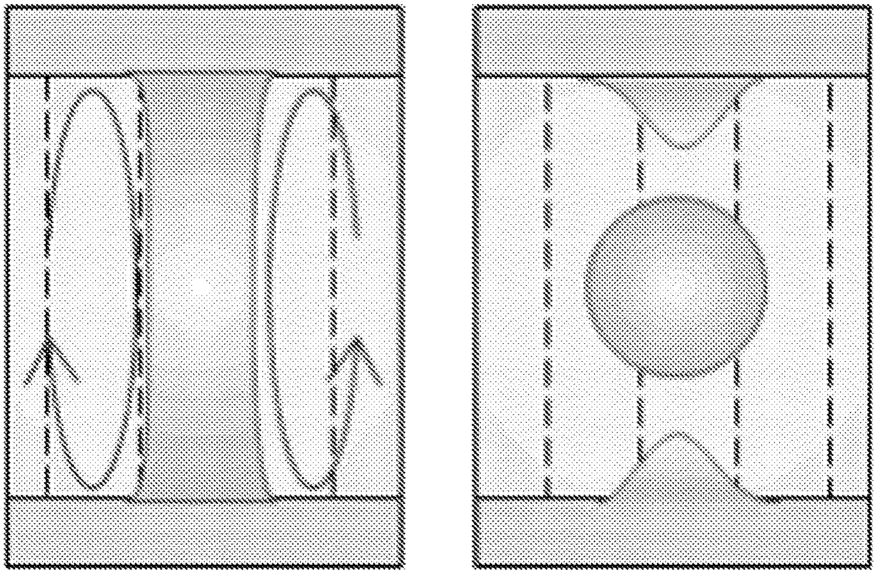
(FIG. 2F) A schematic illustration of a DS bridge under an DC electric field and formation of large droplets upon cessation of the electric field.
Figure 2G:
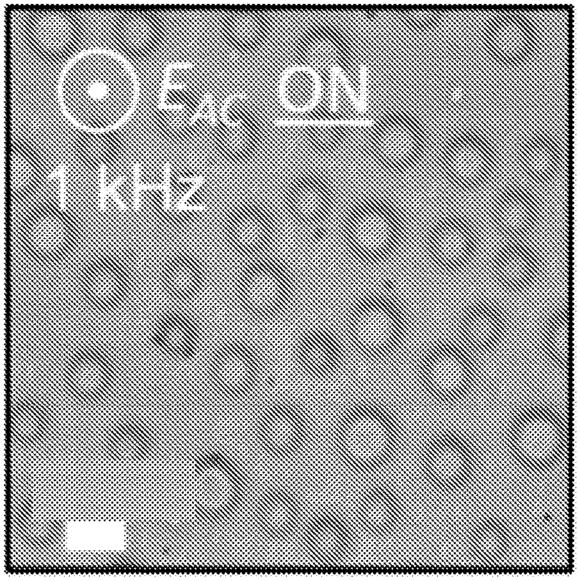
(FIG. 2G) A micrograph of a DS/E7 mixture under an AC electric field (250V/1 kHz). A DS phase forms multiple bridges between the electrodes.
Figure 2H:
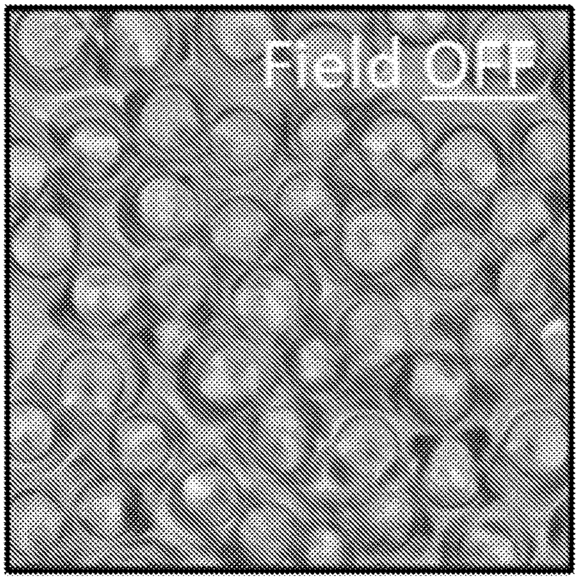
(FIG. 2H) Droplets formed from the bridges of FIG. 2G.
Figure 2I:
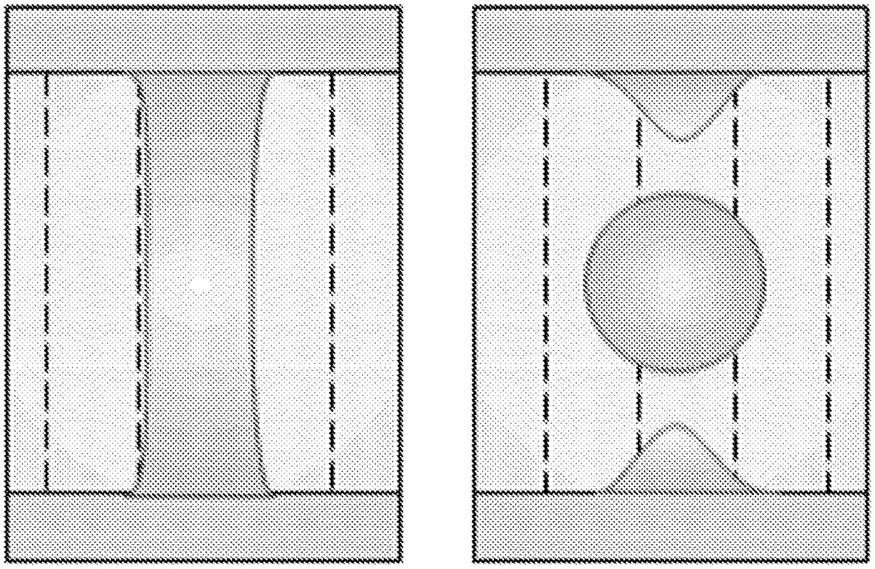
(FIG. 2I) A schematic illustration of bridge formation and rupturing into droplets.
Figure 2J:
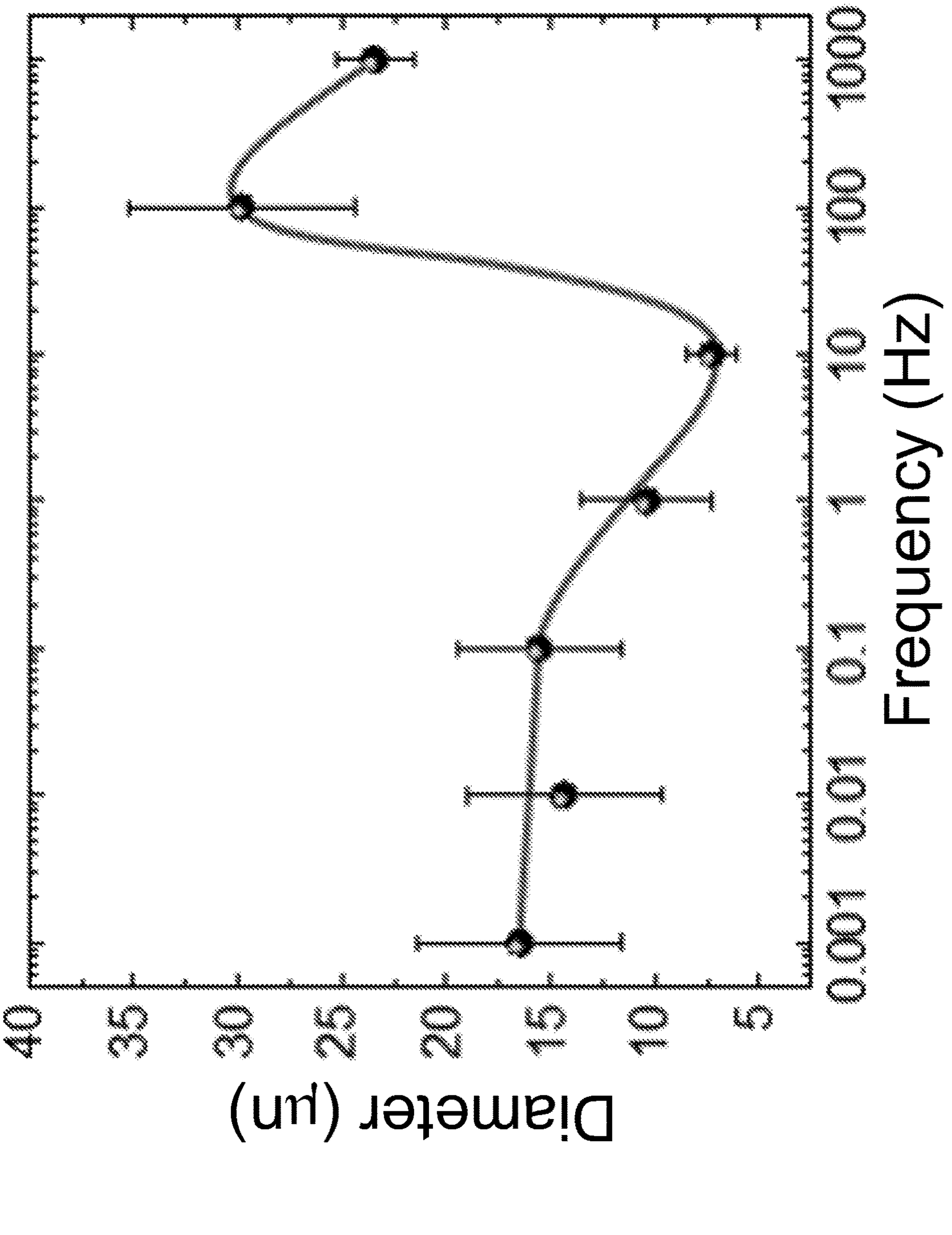
(FIG. 2J) Droplet size variation (in μm) upon various frequencies (Hz) of electric fields at 250 V. An electric field was applied for 5 seconds (sec) for all frequencies (The error bars are the standard deviations (S.D.) of 67-100 measurements of droplet size. The lines are drawn to guide the eye).
Figure 8A:
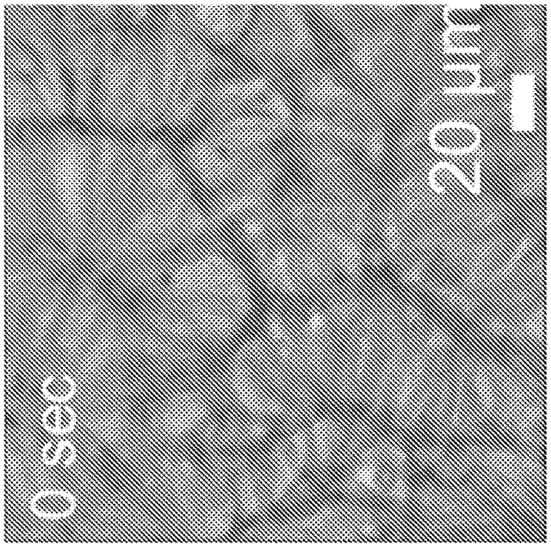
FIG. 8 shows optical micrographs of DS in E7 under 250V DC as (FIG. 8A) 0 sec, (FIG. 8B) 0.03 sec, (FIG. 8C) 0.6 sec, (FIG. 8D) 0.18 sec, (FIG. 8E) 0.45 sec, (FIG. 8F) 2.27 sec of continuous electric field. Bridges are formed at 0.18 sec, and the bridges grew in size as more DS droplets circulating near the bridges coalesce to the bridges. The micrographs were taken under a single polarizer.
Figure 8B:
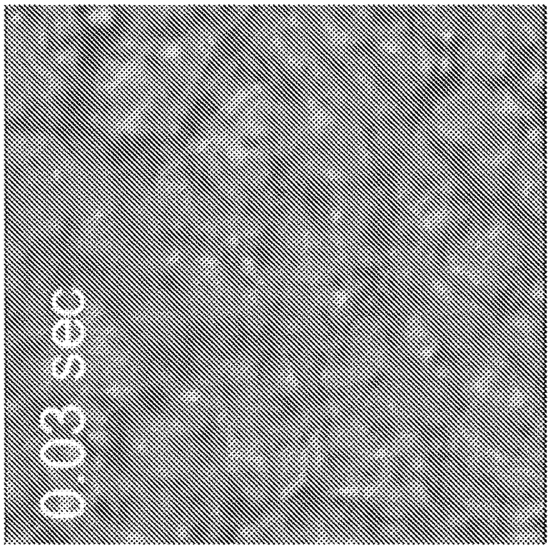
Figure 8C:
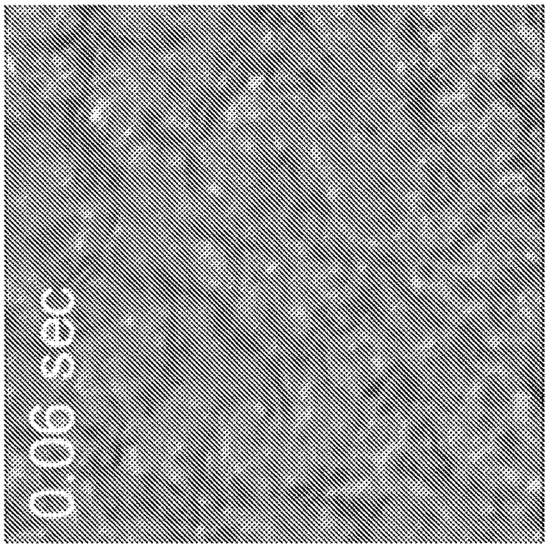
Figure 8D:
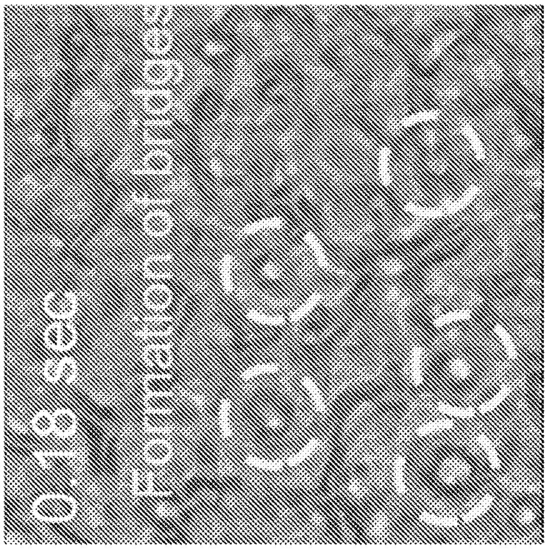
Figure 8E:
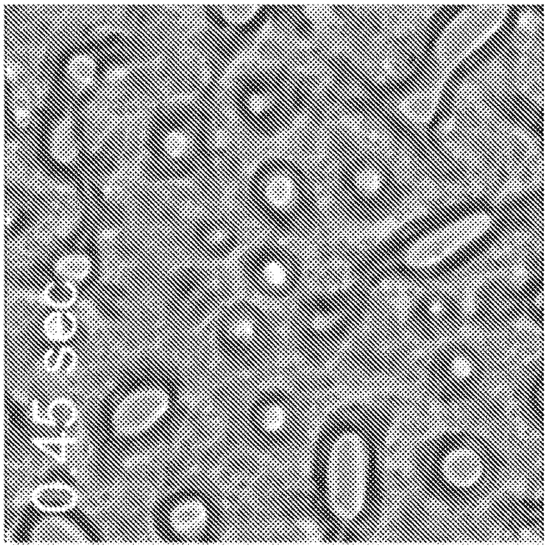
Figure 8F:
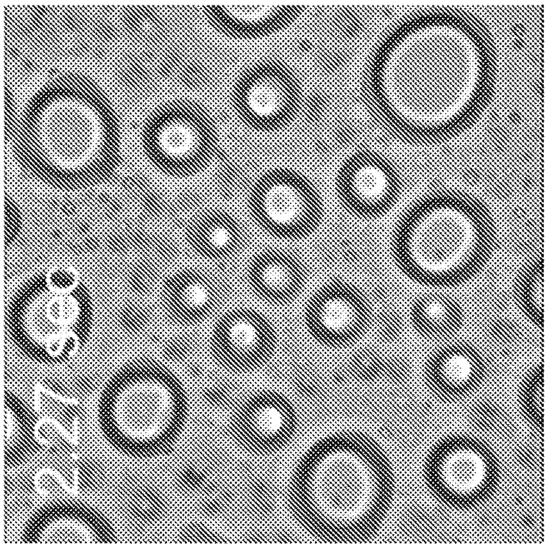

Although it was confirmed that EHD flow is dominated below 10 Hz and can generate intense shear stress to emulsify, the smallest average diameter of droplets was obtained at a specific frequency range, 1-10 Hz (FIG. 2J). Under DC field (or equivalently <1 mHz), many microdroplets were observed to form upon onset of the electric field (FIG. 8A-8C), but bridges were emergent within ~0.18 sec of an electric field (FIG. 8D). The microdroplets circulated near the bridges and merged into bridges overtime at 250 V and 0 Hz (FIG. 8A-8F). These bridges grew in their size as more microdroplets were merged into the bridges (FIG. 8A-8F). At 2.27 sec of continuous DC field, most of the small droplets disappeared, and only bridges remained (FIG. 2D). These sequential observations led to the conclusion that the formation of bridges was likely due to localized vortices in E7. The average distance between bridges was $d_b$~25.5±8.5 μm which indicates that the characteristic lateral dimension of vortices made by EHD flow was 12.8±4.3 μm, which was used to estimate the shear rate above. When the DC electric field was turned off, the bridges disappeared by being adsorbed at the ITO interface. Some of the bridges left droplets (14.5±6.0 μm) (FIG. 2E-2F). Therefore, it was concluded that DC was not suitable to produce small and many droplets due to bridge formation, which led to large droplets (FIG. 2F). Instead, with 1-10 Hz, the direction of circulation was switched every 0.05-0.5 secs (FIG. 2C). This time scale was adequate to generate strong EHD flow while preventing the formation and growth of bridges since the bridges start forming at ~0.18 sec at DC. Therefore, small and many droplets were formed at this specific frequency range (~10 Hz).

Figure 5A:
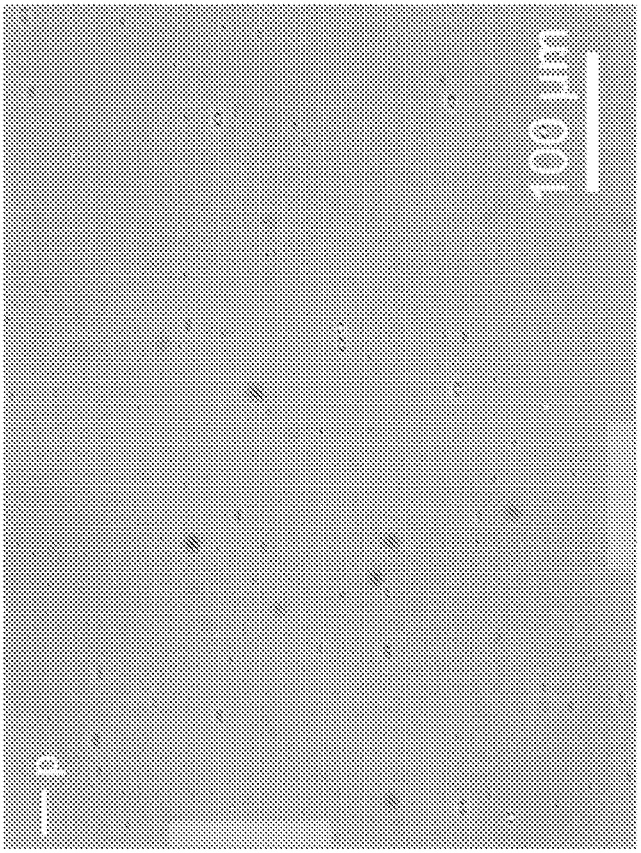

Past studies have revealed that an interface of a flat liquid film contacting with immiscible fluid phase can be deformed under electric fields by forming bridges between electrodes. Similar bridges were constructed in this study at DC and AC (1 kHz) (FIG. 2D, 2G). However, past studies have not reported continuous rupturing and efficient emulsification of droplets (FIG. 2B) from a flat film geometry as was observed in this study (FIGS. 1B and 5A). This is likely attributed to one or two of the parameters comprising the equation for $Ca_{cr}$ compromising efficient emulsification by EHD flow. Likewise, there are many pairs of isotropic oils and liquid crystals that do not result in electric field-induced emulsification (see Table 1). For example, perfluorodecahydronaphthalene was not emulsified in E7 under the electric field. This pair gave rise to the high interfacial tension (9.8±0.1 mN/m) and small viscosity ratios (~0.1: leading to an increase in $Ca_{cr}$), which lead to the characteristic capillary length of ~0.5 mm. For silicone oil, while the interfacial tension is relatively low 1.4±0.1 mN/m, the high viscosity (~200 mPa·s) of the silicone oil prevents efficient emulsification in the E7 phase. Thus, it can be concluded that the EHD flow-induced efficient emulsification was achieved by carefully engineering 1) strong EHD flow in LC, 2) the viscosity ratio~1 leading to the most efficient emulsification, 3) low interfacial tension (<1 mN/m), and 4) choice of the adequate frequency range. Therefore, careful selection of isotropic oil phase can be used to satisfy the four requirements. Further, there likely are effects of ionic species circulation in the dispersed droplet phase with high conductivity (e.g., dispersed water phase).

Figure 2K:
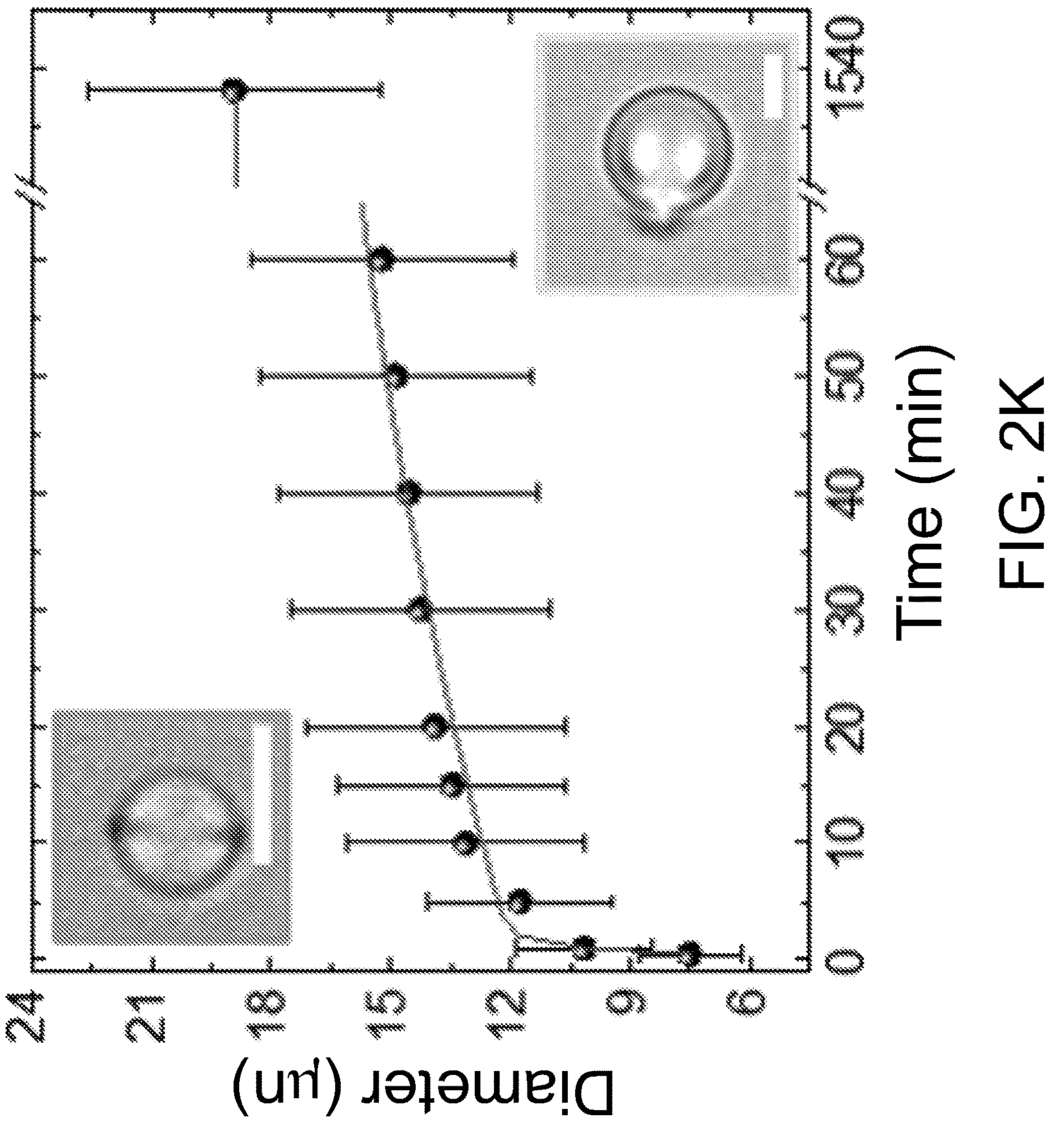
(FIG. 2K) Change in size of droplets at various times after 250 V and 10 Hz (scale bars: 100 μm). The insets of FIG. 2K show representative micrographs of DS droplets with a Saturn ring defect (left) and a hyperbolic point defect (right). Except for (FIG. 2A), all other images were taken with a single polarizer.

Emulsion stability of droplets emulsified by an electric field (250V/10 Hz) was further investigated. Initially, the size of the droplets increased rapidly after emulsification (FIG. 2K). After 10 mins, the droplets (originally <5 μm after emulsification) became 13.1±3.0 m, and the coarsening was greatly retarded. The droplet stabilization was accompanied by defect formation and defect transformation from Saturn ring to hyperbolic point defect. The elastic energy to distort LC orientation near droplets was ~KR and anchoring energy by deviating the preferred orientation of LC (perpendicular to DS interface) at the interface was ~WR, where K and W are independent of sizes of guest droplets. For small droplets, the contribution of $WR^2$ was weaker than KR. Therefore, small DS droplets (<K/W) did not induce strong distortion in E7, giving rise to coalescence upon free diffusion and collision without elastic energy barrier.

Figure 9:
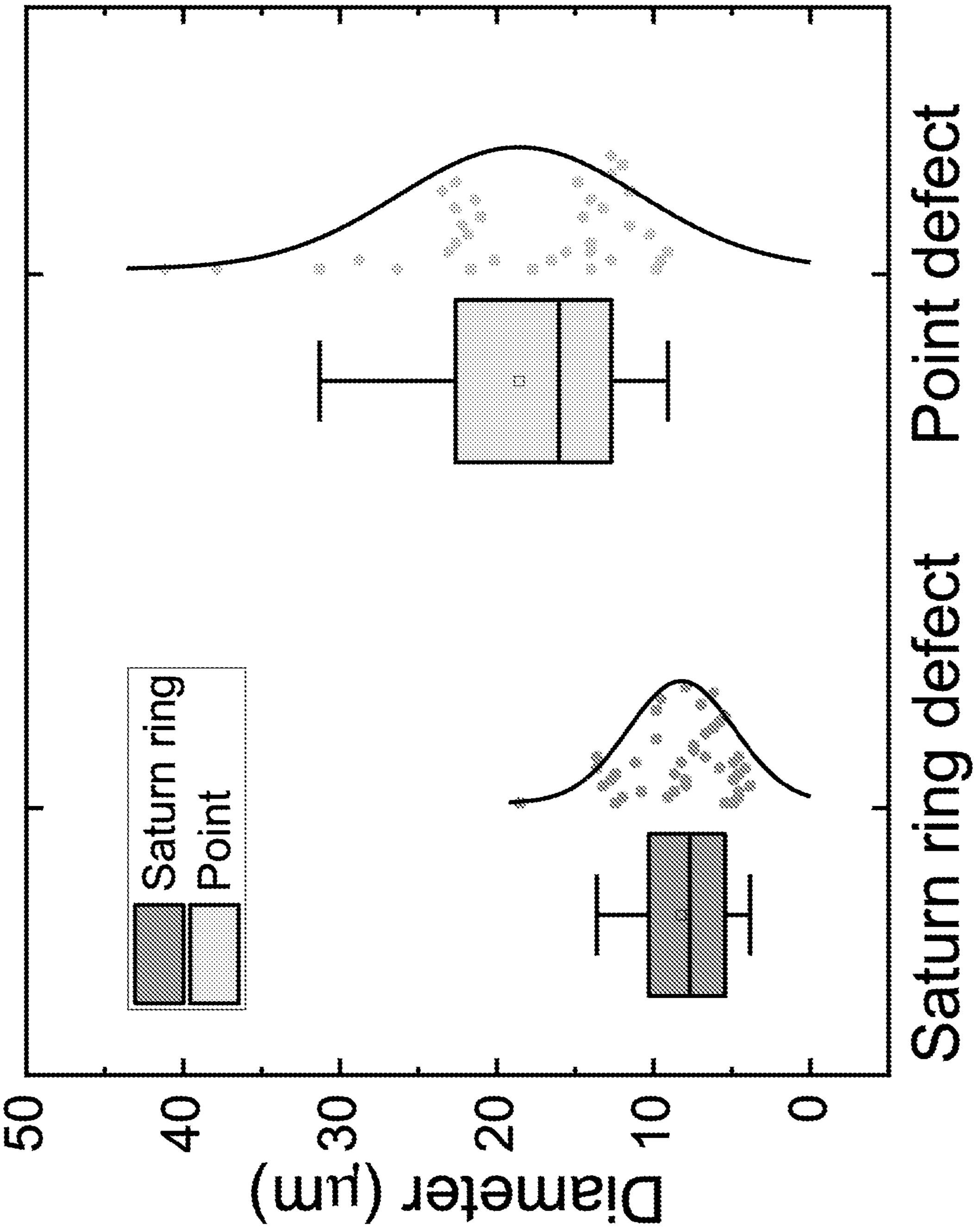
FIG. 9 shows a diameter distribution of DS droplets having Saturn ring defect and hyperbolic point defect.

As the microdroplets (<K/W) coalesced, the anchoring energy became more dominant, and droplets were accompanied by topological defects. DS droplets were emulsified in E7 using a vortex mixer for 10 secs to understand size-dependent topological defect change. The emulsified DS droplets in E7 were injected in a sandwich cell coated with rubbed polyimide on which E7 can be aligned in-plane (FIG. 2K). Such droplets formed by the mechanical shear stress had a large polydispersity and were suitable for analyzing size-dependent defect configuration (FIG. 9). It was observed that droplets having diameters within a range of 4-20 μm accompanied Saturn ring defects. DS droplets having diameters larger than ~10 μm accompanied hyperbolic point defects. The transition from Saturn ring defect to hyperbolic point defect occurred between 10-15 μm. The transition was associated with the length of the disclination line (line defect). The disclination line of the Saturn ring was energetically unstable, and energy associated with the line defect was proportional to the sizes of droplets. On the other hand, the point defects were the same size regardless of the size of droplets. To minimize the energy associated with defects, as the size of droplets increased, the defects transformed to hyperbolic point defect. It has been reported that droplets with hyperbolic point defects repel each other more effectively than Saturn ring defects. This led to the stabilization of emulsion droplets in the E7 medium in this system as well. Thus, this constituted the second stable state. Since the critical size for Saturn ring to hyperbolic point defect transformation was associated with W, the size of droplets that led to stabilization were also further engineered by using other isotropic oil phases. For example, mineral oil droplets were stabilized at approximately 7 μm (see, e.g., FIG. 11 and Table 1).

Figure 10B:
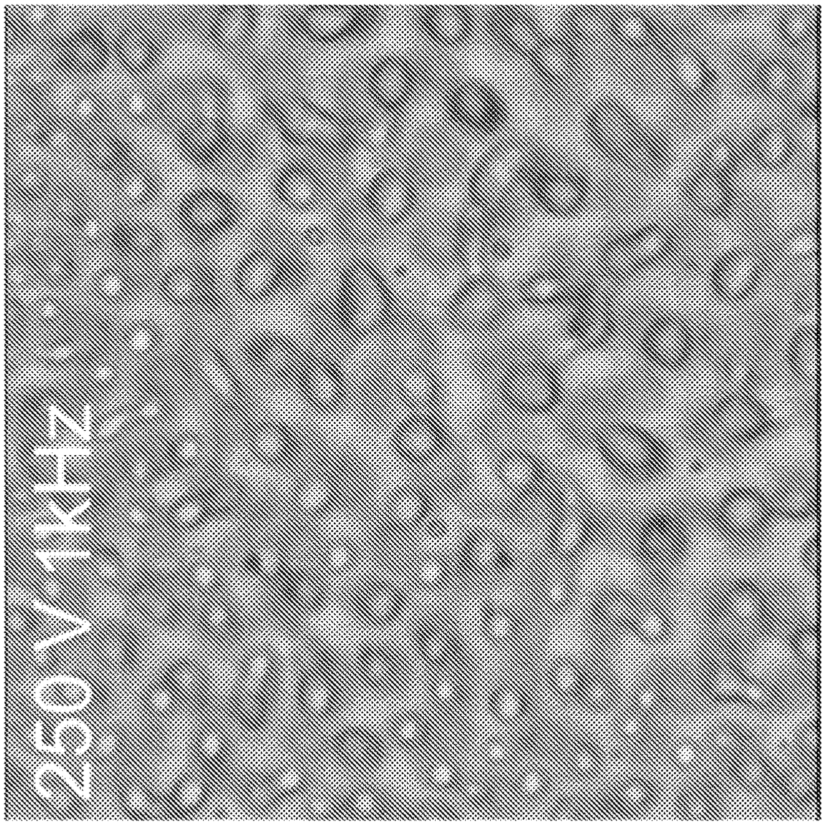
FIG. 10 shows optical micrographs of DS in E7 under (FIG. 10A) 0 V and (FIG. 10B) onset of 250V 1 kHz. The micrographs were taken under a single polarizer.
Figure 10A:
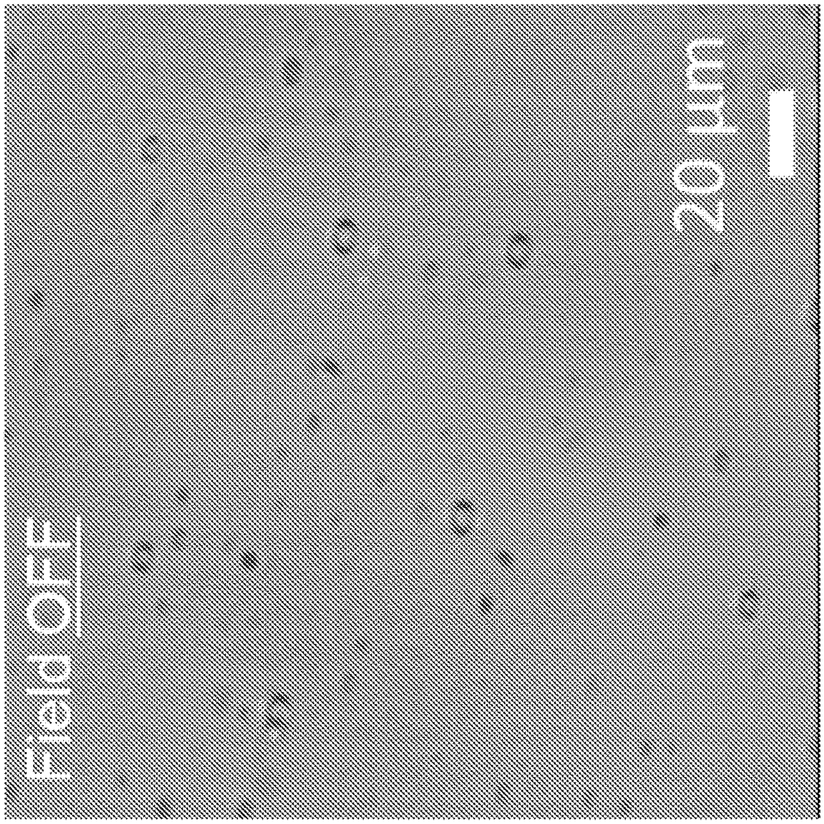

Droplets formed at a high-frequency electric field (1 kHz) were also investigated. Different from low-frequency electric field (<10 Hz), the electric field immediately formed bridges between two electrodes at 250 V/1 kHz (FIGS. 2G and 10A-10B). The formation of the bridges at this frequency was likely because the E7 phase made a conductive pathway between two electrodes, as described in past studies. When the electric field was switched off, large droplets with narrow size distribution (23.5±1.8 μm) were stemmed from the bridges after the bridges were ruptured (FIG. 2H-2I). All of the droplets accompanied hyperbolic point defects. This was because their average size, 23.5±1.8 μm, was bigger than the defect transition size. These droplets were further attracted by each other resulting in many clusters made of 2-6 droplets due to elastic dipolar attractions, and the clusters repelled each other and levitated in E7 medium through dipole elastic repulsion. Stabilized by hyperbolic point defects, the droplets did not exhibit any coalescence. Therefore, these larger droplet clusters levitating in E7 constituted the third stable state of this optical device.

Figure 3A:
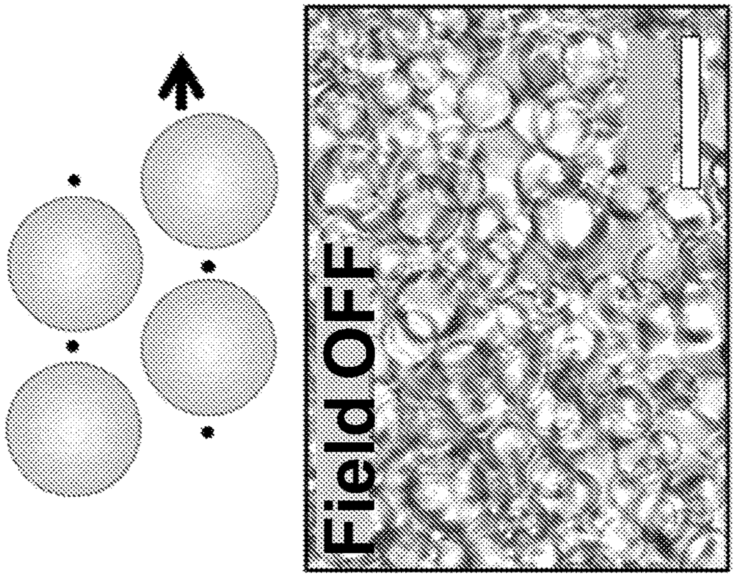
(FIG. 3A) A stabilized DS droplet network in E7 without an electric field. A DS in E7 emulsion (FIG. 3B)~0.1 sec, (FIG. 3C) 0.3 sec, (FIG. 3D)~0.5 sec, (FIG. 3E)~2.7 sec after the onset of an electric field.
Figure 3B:
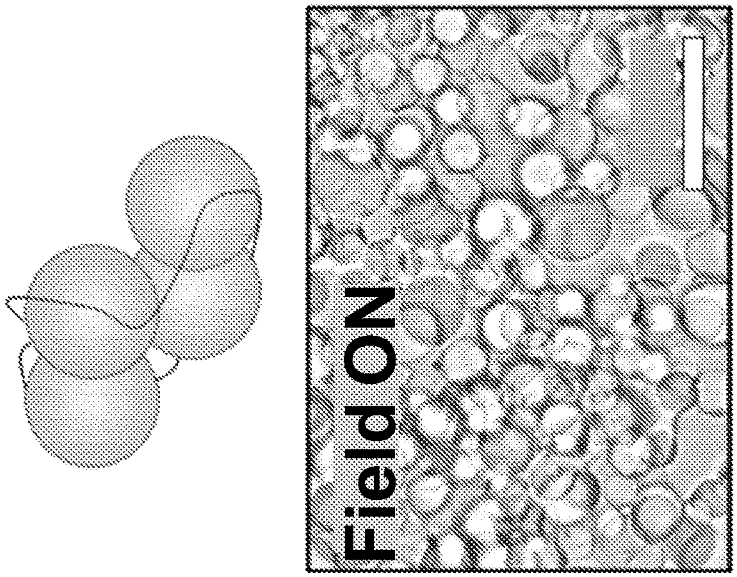
FIG. 3 shows micrographs (single polarizer) and schematic illustrations of optical sheets comprising a DS/LC emulsion (15 vol. % DS in E7) between indium-tin-oxide (ITO) glasses.
(FIG. 3F) Morphology of a DS/E7 mixture after coalescence and film formation without an electric field. The box in FIG. 3C indicates stretching of a DS droplet pulled by two disclination lines. The arrow in FIG. 3E indicates attraction of a DS droplet to a pitch of the DS film. Micrographs in FIG. 3A-3F were taken with a single polarizer.
(FIG. 3G) Changes in diameters and number of DS droplets under the electric field (FIG. 3A-3F) as a function of time. The graph indicates the different stages of droplet coalescence. The micrographs were taken with a single polarizer.
(FIG. 3H) Changes in diameter of DS droplets under the electric field (FIG. 3A-3F) as a function of voltage (V).
Figure 3C:
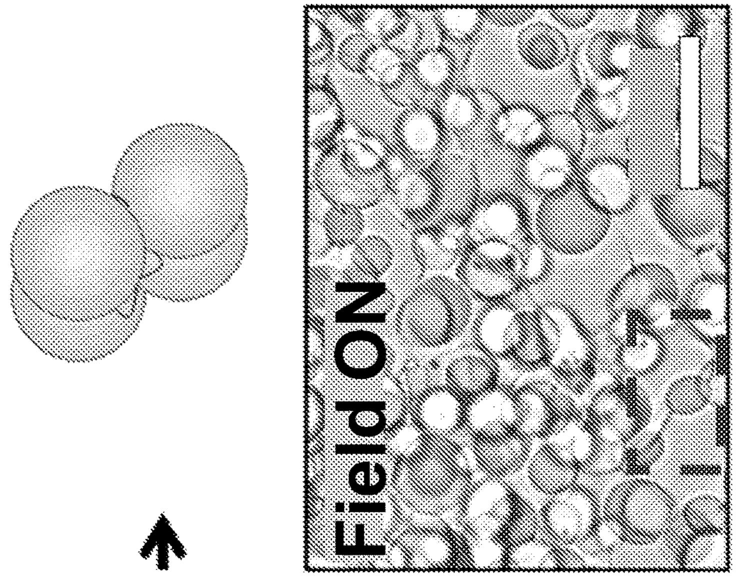
Figures 3D, 3E, 3F:
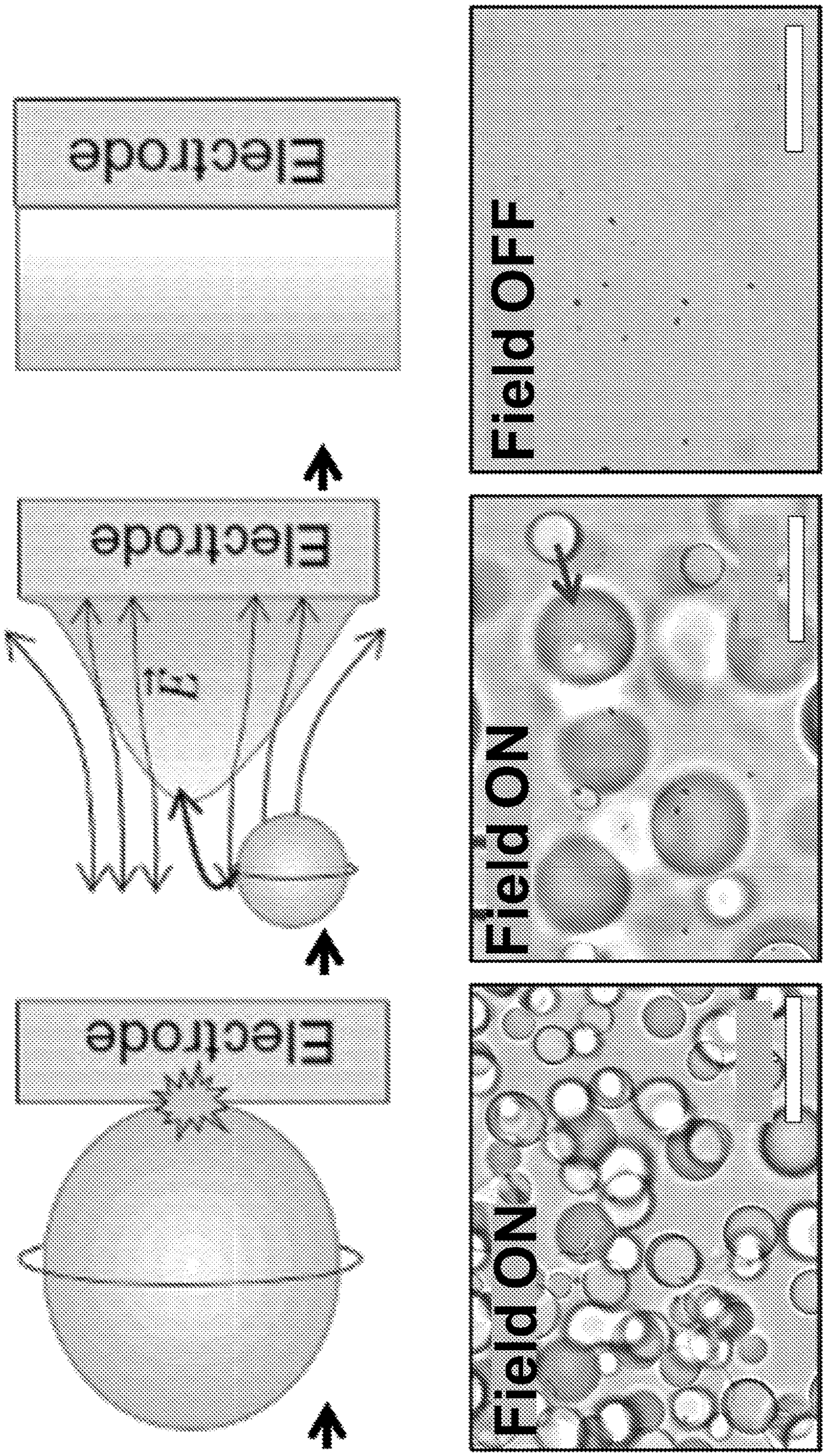
Figure 3G:
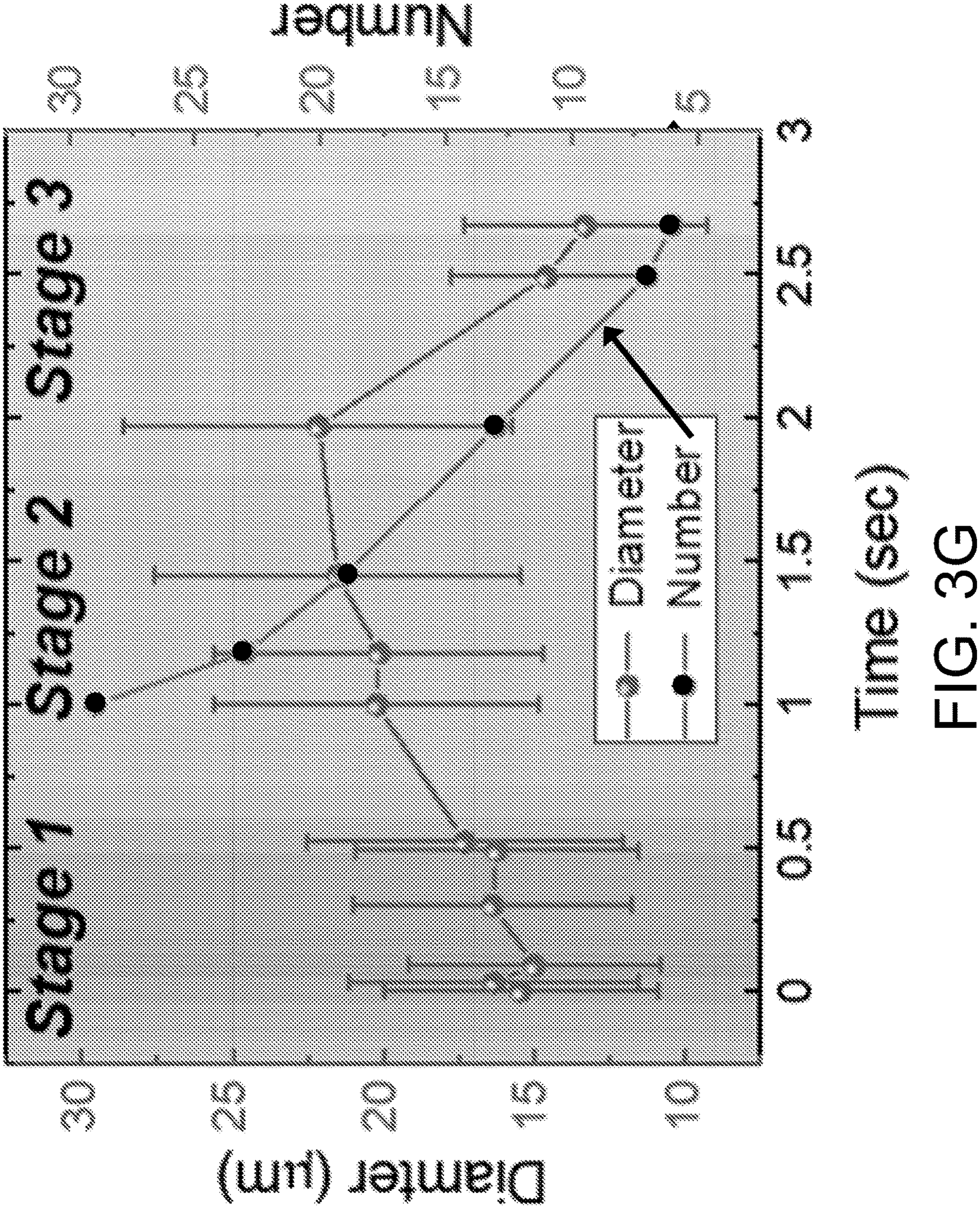

Next, coalescence behavior of DS droplets under an electric field was investigated. FIG. 3A shows DS droplets stabilized after electric field-induced emulsification (250 V and 10 Hz). These droplets formed a 3D network through elastic attraction and repulsion by point defects (FIGS. 2K and 3A). These droplets were chained but also staggered (see also FIG. 11A). Under an electric field at 1 kHz, it was observed that the coalescence procedure was divided into three stages. In the first stage, disclination loops surrounding the droplet network were immediately formed within ~0.1 sec after the onset of an electric field (100 V and 1 kHz for FIG. 3 and 50 V/1 kHz for FIG. 11), and droplets dangled (like "grapes") to the disclination lines (FIGS. 3C and 11B-11F). The disclination loops further shrank, and the droplets were coarsened (FIGS. 11E-11I and 3G). All the droplets formed from the first stage of coalescence had Saturn ring defects, and the coalescence by the first stage took ~0.5 sec at 100 V/1 kHz (FIG. 3G). In the second stage, droplets formed from the first stage started to be adsorbed to the surface of ITO glasses upon direct contact (FIG. 3D). This led to a decrease in the number of droplets in E7 without an increase in the size of droplets (FIG. 3G). As more large droplets were adsorbed, the DS film on ITO glasses became undulated (FIG. 3E). In the last stage, relatively smaller droplets that were not coalesced in the first and second stages were further attracted towards the pitches of undulated DS film (marked with a box in FIG. 3E). When the field turned off, the undulation of the DS phase disappeared, forming flat films and was evidenced with complete extinction of birefringence signal under crossed polarizers.

Figure 3H:
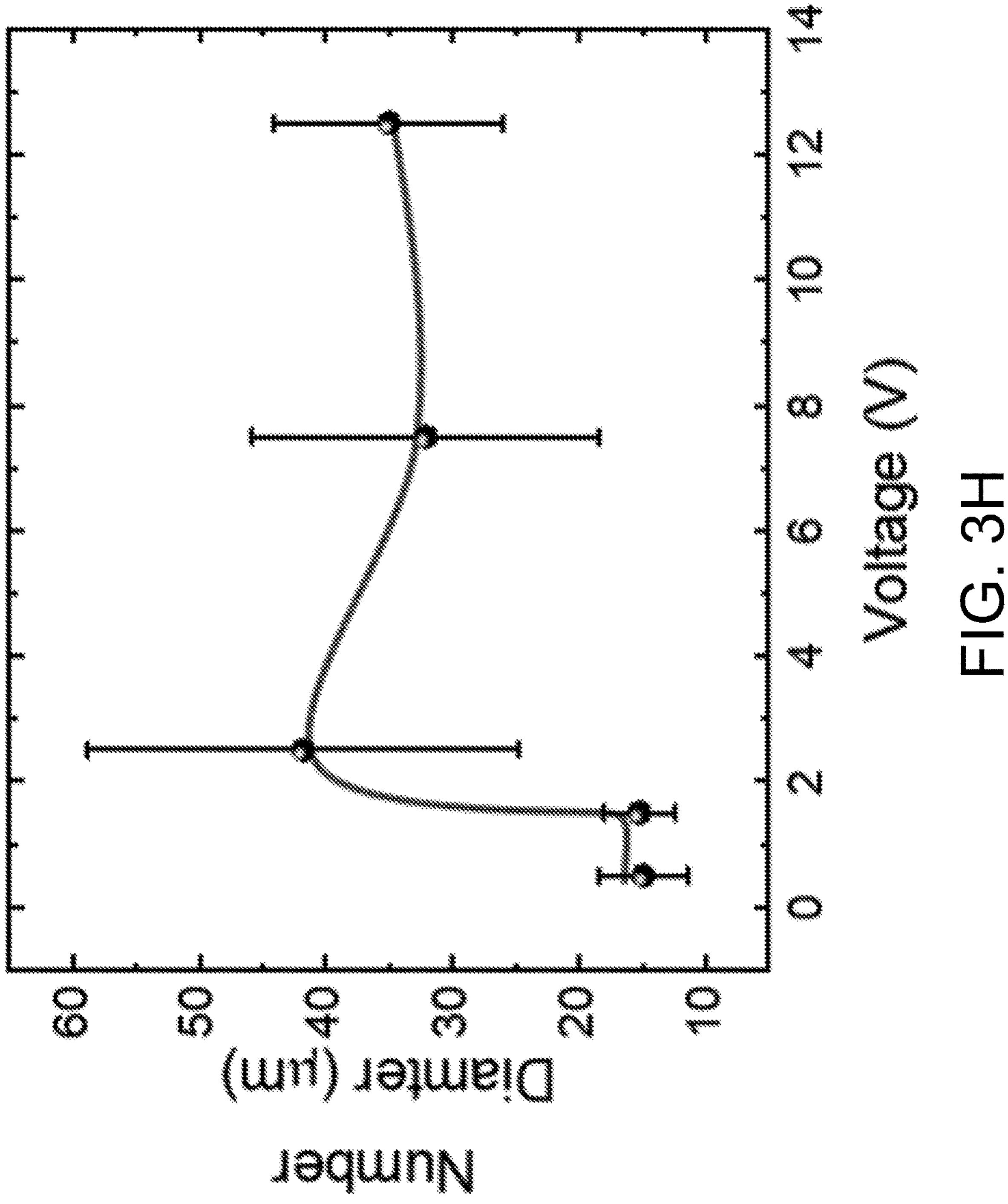
Figure 12:
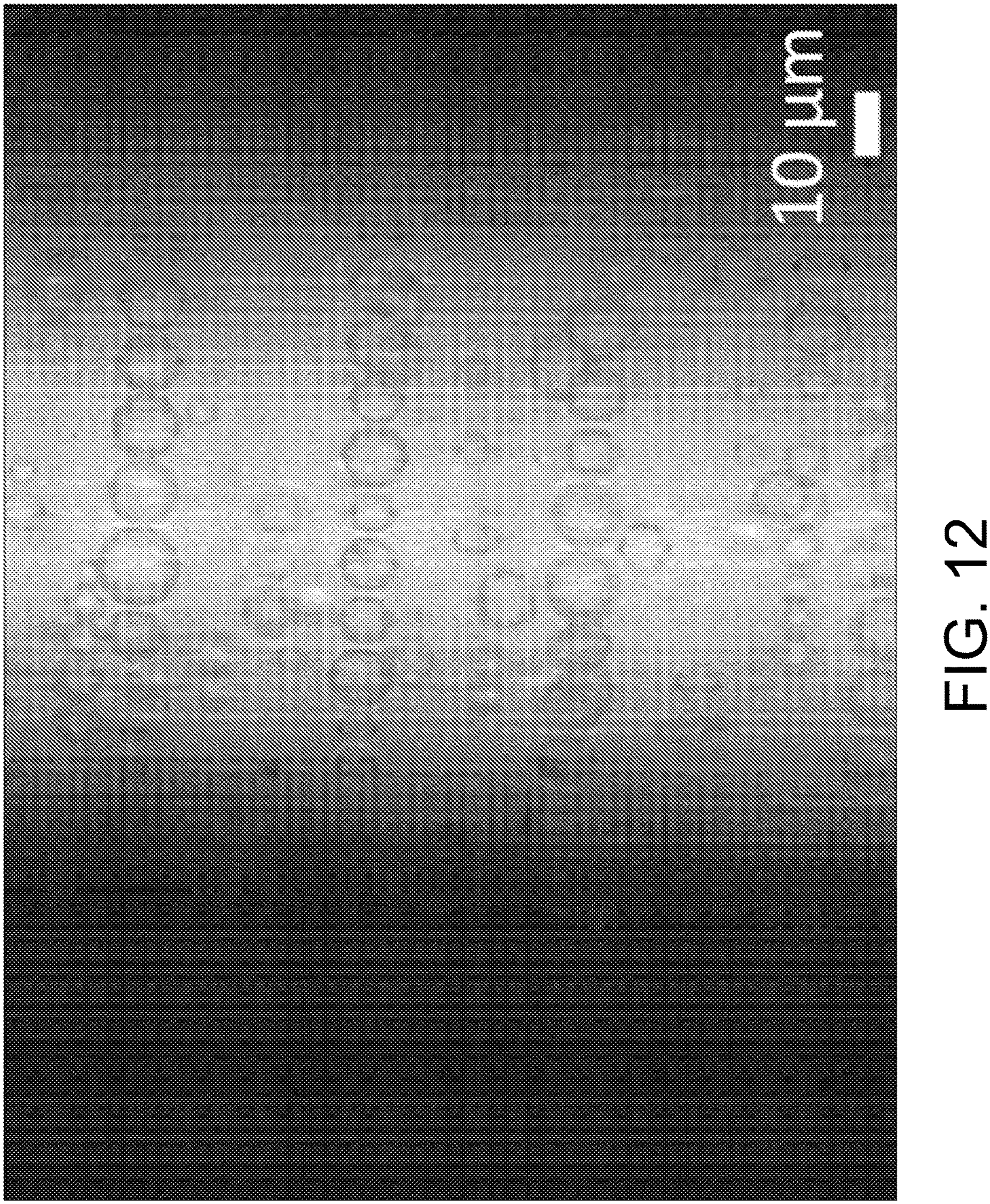
FIG. 12 shows formation of Saturn ring defects and chaining of DS droplets without coalescence (25 V/1 kHz). The micrograph was taken under a single polarizer.
Figure 13:
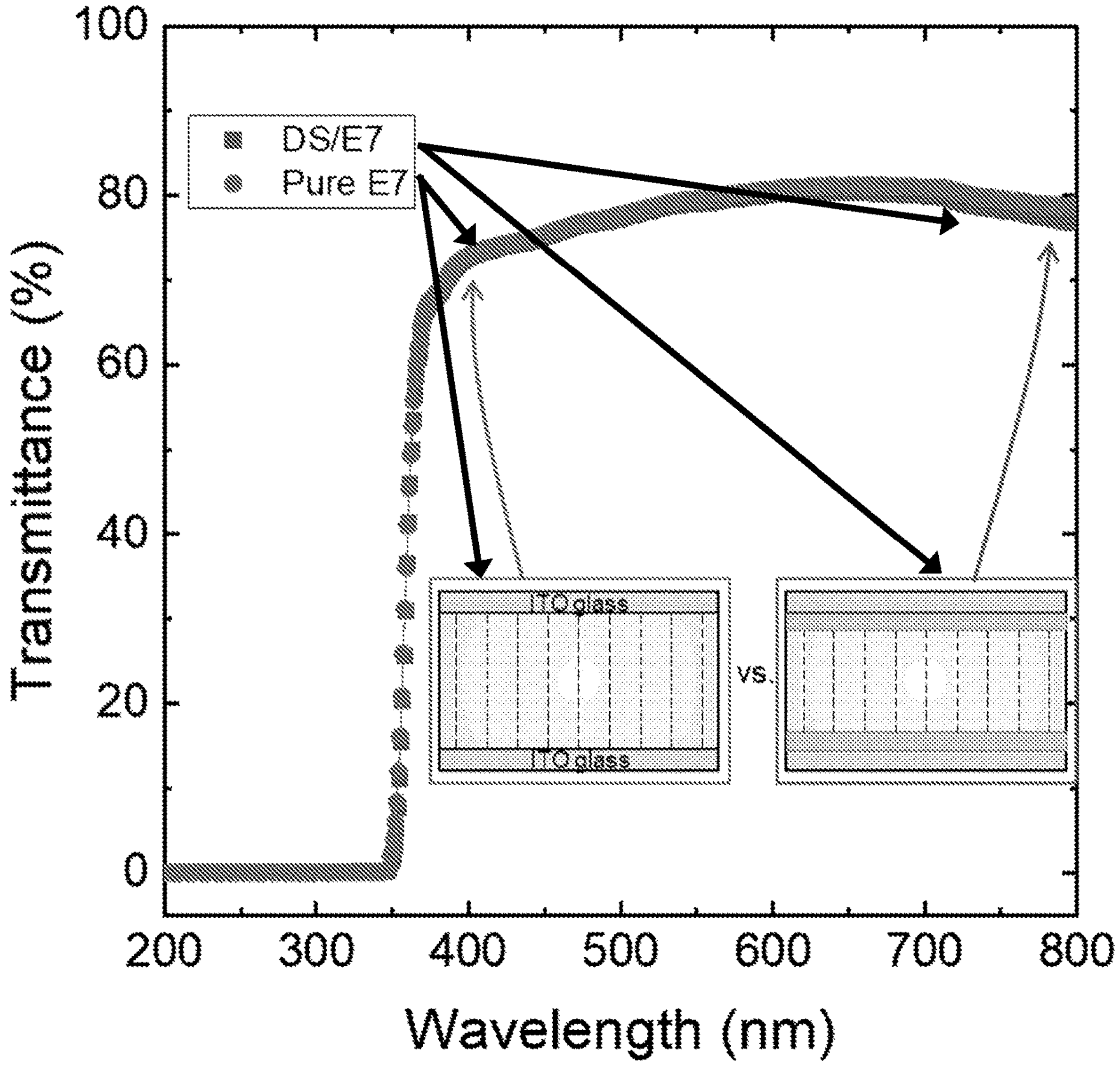
FIG. 13 shows light transmittance of optical sheets comprising either pure E7 (n=3) or DS/E7=13.5/86.5 (v/v) mixture (n=1) between dimethyloctadecyl[3-(trimethoxysilyl)propyl]ammonium chloride (DMOAP) treated ITO glasses. The thickness of both cells was ~100 μm. The reference sample was ambient air for both measurements. The electric field was not applied during the measurements.

Past studies have reported that droplets in an isotropic medium can coalesce under an electric field. Under an electric field, each droplet generated a local gradient in electric field intensity, and the gradient drove the droplets into chaining along external electric field direction and coalesces the droplets. The electric field-induced coalescence of droplets has also been investigated in a nematic medium. Past studies have shown that hyperbolic point defects transform to Saturn ring defects under an electric field. These droplets carrying Saturn ring defects were chained but, as the electric field intensity increases, the distance between droplets decreased. At high enough electrical voltage, the droplets eventually coalesced as a result of strong electrical dipolar interaction. In this study, similar chaining and defect transformation were observed with DS droplets in E7. It required at least 25 V for the chained droplets to coalesce (FIGS. 12 and 13). On the other hand, the minimum voltage needed to induce coalescence was as low as 2.5 V (FIG. 3H). Moreover, instead of showing chaining and coalescence, the DS droplets which did not align along the external field coalesced (FIG. 11C, 11H), which is not favorable for electrical dipolar interactions in the first stage of coalescence. Thus, this observation led to the hypothesis that electric dipolar interaction did not play a pivotal role in droplet coalescence. How the electric field-induced coalescence of droplets was investigated is disclosed in further detail in the following sections.

In the first stage of the coalescence, disclination loops appeared around the DS droplet network (FIGS. 3B and 11A-11I). Such a formation of disclination loops and coalescence was found with an electric field as low as 7.5 V at 1 kHz. It was observed that these disclination loops were sticky to DS droplets, as evidenced by the stretching of droplets pulled by two disclination loops (box in FIG. 3C). The "stickiness" of disclination loops to DS droplets was likely associated with minimizing elastic energy in liquid crystals by being placed near droplets. Since the disclination loop was energetically unstable and tended to reduce its length by shrinkage, this led the droplets to be accompanied by disclinations lines, eventually giving rise to jamming of droplets upon shrinkage (FIG. 11A-11I). It was observed that, even when an external electric field was suddenly ceased after ~3 sec at 25 V/1 kHz, droplets further coalesced. This further suggests that the coalescence of droplets was not an electric field-induced dipolar interaction but a topological defect-induced jamming in the first stage of droplet coalescence.

Figure 11A:
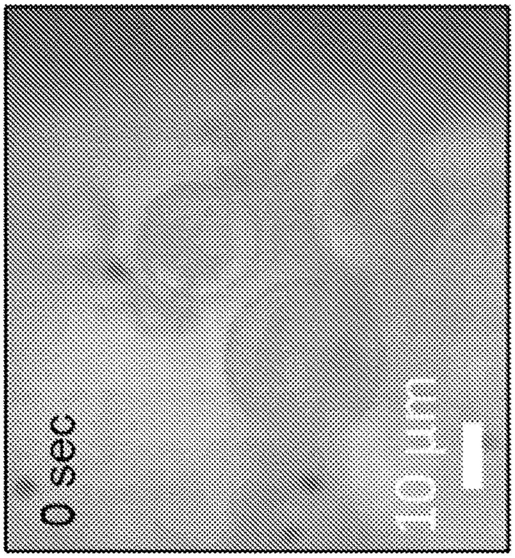
FIG. 11 shows optical micrographs of DS droplets in E7 under 50V 1 kHz at different time scales (FIG. 11A) 0 sec.
(FIG. 11B) 0.1 sec.
(FIG. 11C) 0.67 sec.
(FIG. 11D) 0.76 sec.
(FIG. 11E) 1.13 sec.
(FIG. 11F) 1.79 sec.
(FIG. 11G) 1.88 sec.
(FIG. 11H) 2.31 sec.
(FIG. 11I) 2.9 sec. The micrographs were taken under a single polarizer.
Figure 11B:
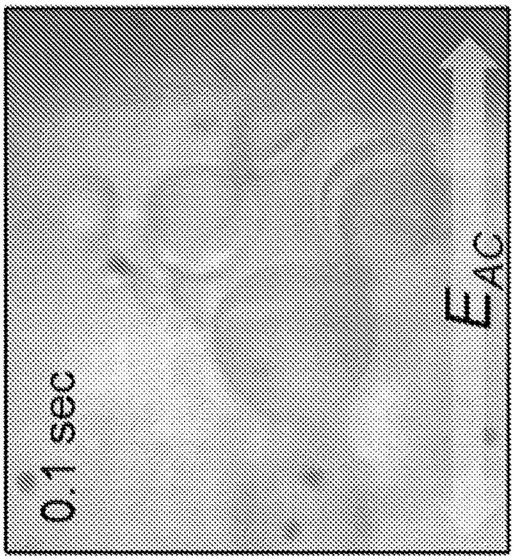
Figure 11C:
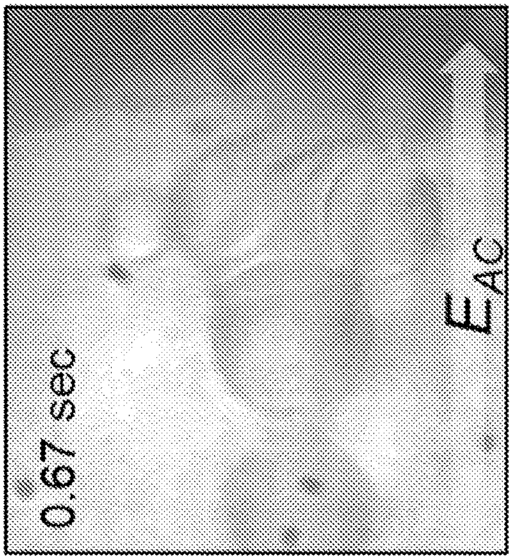
Figure 11F:
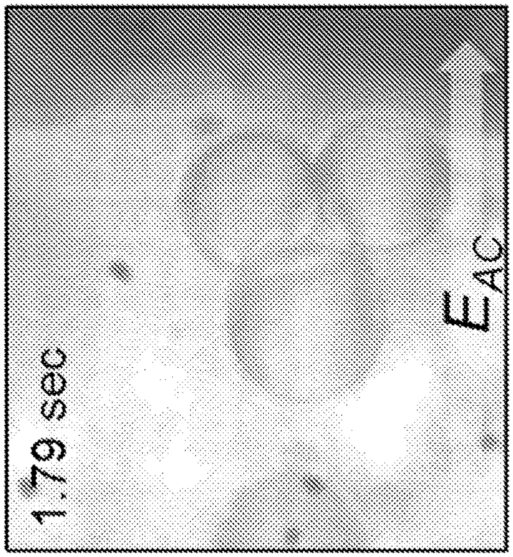
Figure 11E:
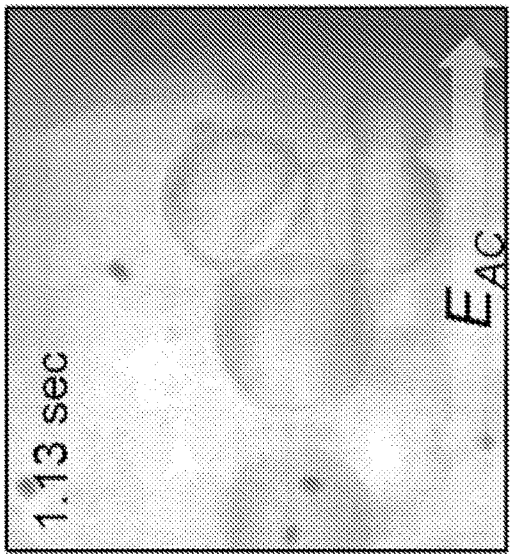
Figure 11D:
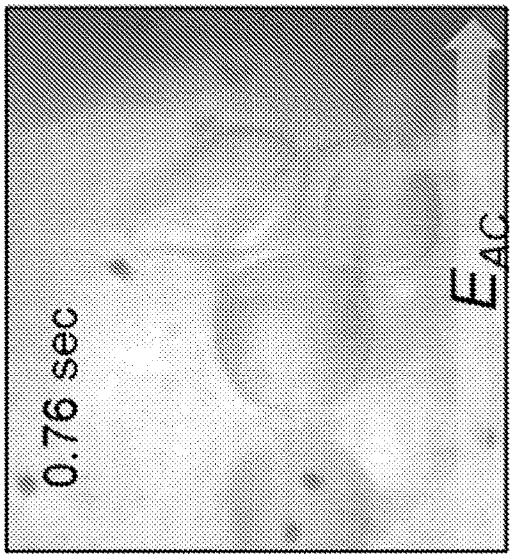
Figure 11G:
Figure 11H:
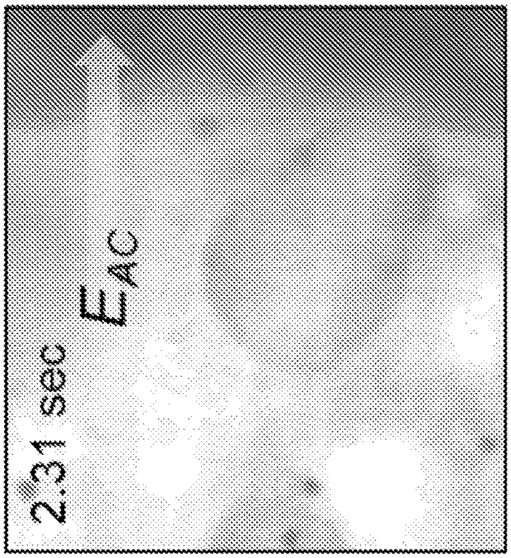
Figure 11I:
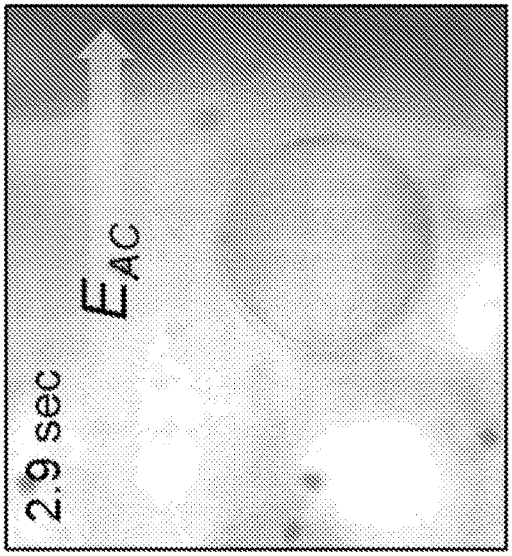

All of the large droplets formed from the initial disclination line-induced coalescence had Saturn ring defects (FIG. 11I). The droplets with Saturn ring defects further coalesced when they were aligned nearly perpendicular to the external electric field direction. It was observed that the coalescence of such a large droplet occurred even without an electric field if the droplet had Saturn ring defects. This was likely because the droplets with Saturn ring defects had weak repulsion, as described in FIG. 2K. These large droplets further adsorbed to an electrode upon physical contact because there was no elastic energy barrier associated with the defects (FIG. 3D). In the last stage of coalescence, it was observed that the adsorbed DS phase formed an undulation (FIG. 3E). At this stage, small droplets were then attracted to poles of this undulation and absorbed (FIG. 3E). No evidence was found of topological defect near the poles; thus, the attraction was mainly caused by dielectrophoresis induced by local electric field intensity gradient near the pitches of the undulated DS phase. The series of observations on coalescing droplets were also found with the droplets formed at 1 kHz/250 V (FIG. 2G, State 3).

Figure 4A:
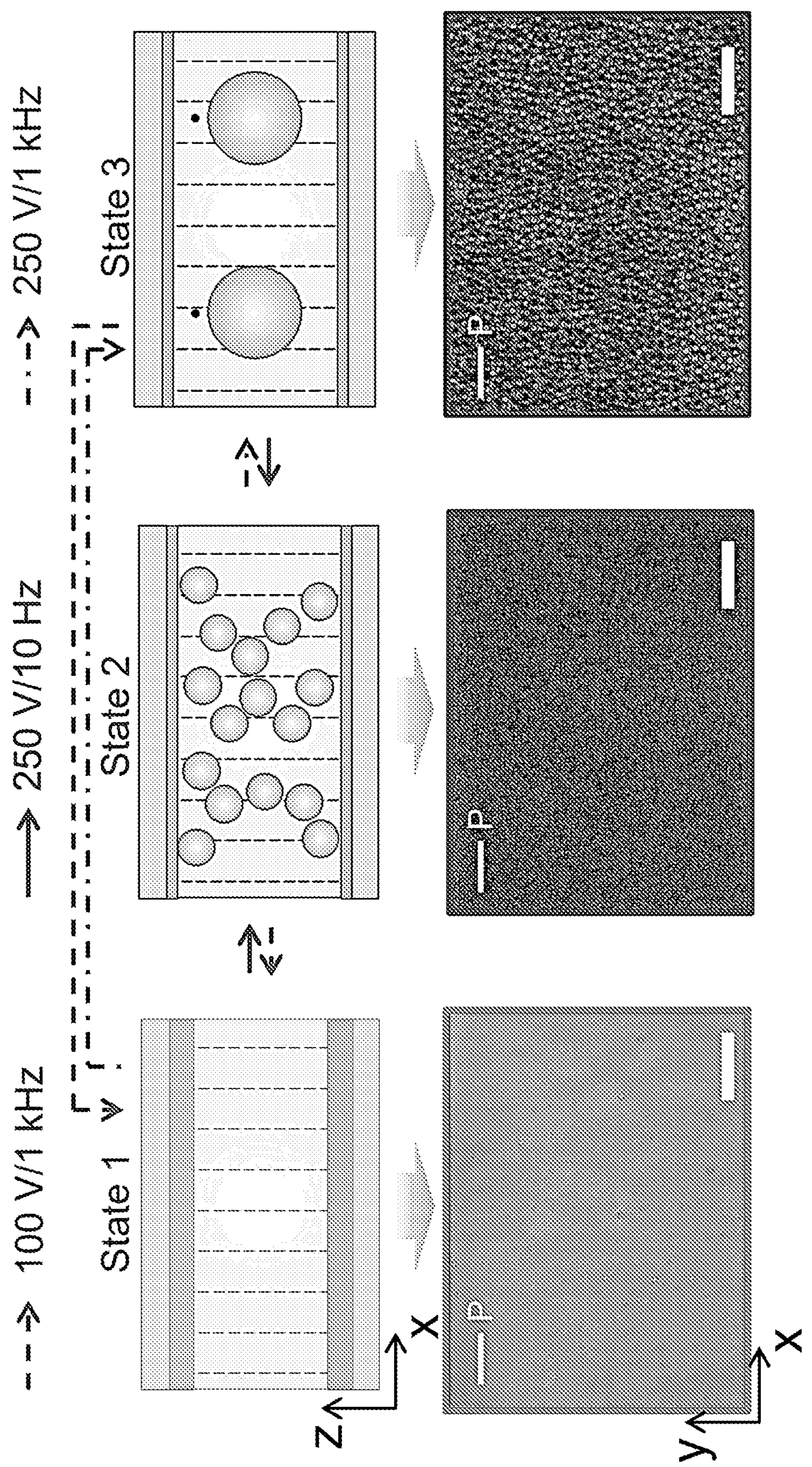
(FIG. 4A) Schematic illustrations of three representative states of optical sheets and optical micrographs corresponding to each state (13.5 vol % DS in E7). Macroscale photographs of optical sheets at (FIG. 4B) state 1, (FIG. 4C) state 2, and (FIG. 4D) state 3. The distance between an optical sheet and a logo was kept to 37 mm.

As discussed above, the three different stable states accessible by different modes of electric fields are shown in FIG. 4A. In state 1, the DS phase formed films on the surfaces of ITO glasses (FIG. 4A). From this state, application of an electric field at two different frequencies (1 kHz and 10 Hz) could result in two different morphologies 1) Many small droplets (size~15 μm) forming a 3D network by applying 10 Hz at 250 V (FIGS. 2B and 4A) and 2) lower number of large droplets by applying 1 kHz at 250 V (FIGS. 2H and 4A). These two states were observed to be accessed directly from either of the states (FIG. 4A). Further, by applying a 2.5-100 V at 1 kHz to these two states, droplets coalesced through topological defect transformation and dielectrophoretic force (FIG. 3A-3H).

Figure 4B:
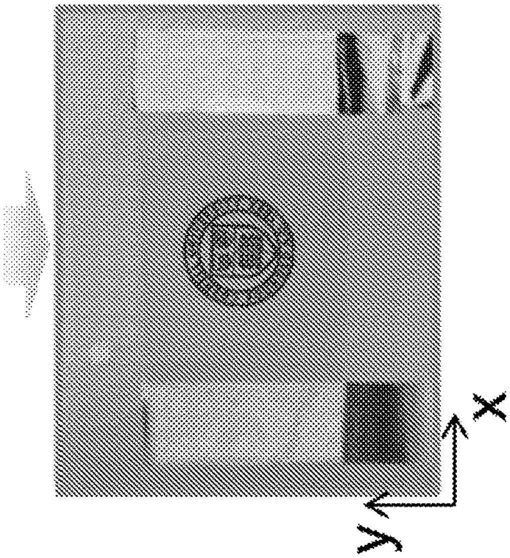
FIG. 4 shows.
(FIG. 4E) Transmittance vs. wavelength of state 1, state 2, and state 3 over the entire visible wavelength of light (about 400 nm-700 nm).
(FIG. 4F) Cyclic test on light transmittance (at wavelength 600 nm) of optical sheets undergoing changing between state 1 and state 2.
(FIG. 4G) Transmittance (at 600 nm) of optical sheets of state 1, state 2, and state 3 versus time.
Figure 4C:
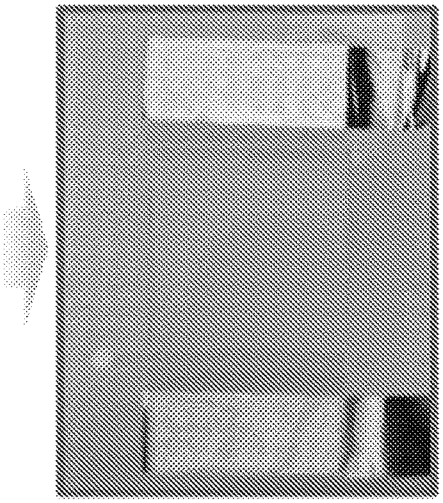

The optical properties of the different states could be adjusted based on droplet size and the number of droplets, thus allowing each state to exhibit different optical properties. Therefore, the transmittance of the DS/E7 emulsions could be switched among multiple states (FIG. 4A). FIG. 4B shows an optical sheet (13.5 vol. % of DS in E7) and logo behind it (distance: 37 mm). This particular vol. % of DS was chosen to assess optical materials because it displayed the best transmission at a transparent state (FIG. 4B). The formation, stabilization, and destabilization of droplets with 15 vol. % of DS droplets shown in FIGS. 1-3 were also observed in the same fashion with 13.5 vol. % DS in E7 (as shown in the micrographs in FIG. 4A).

Figure 4D:
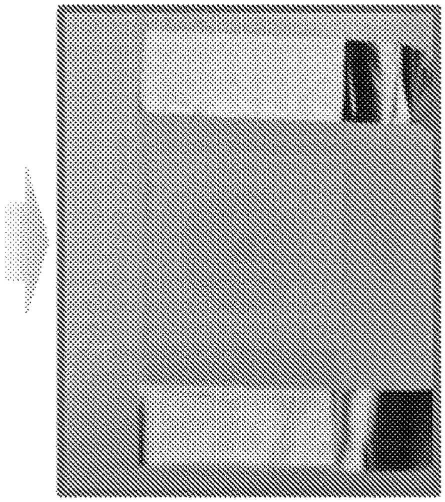
Figure 4E:
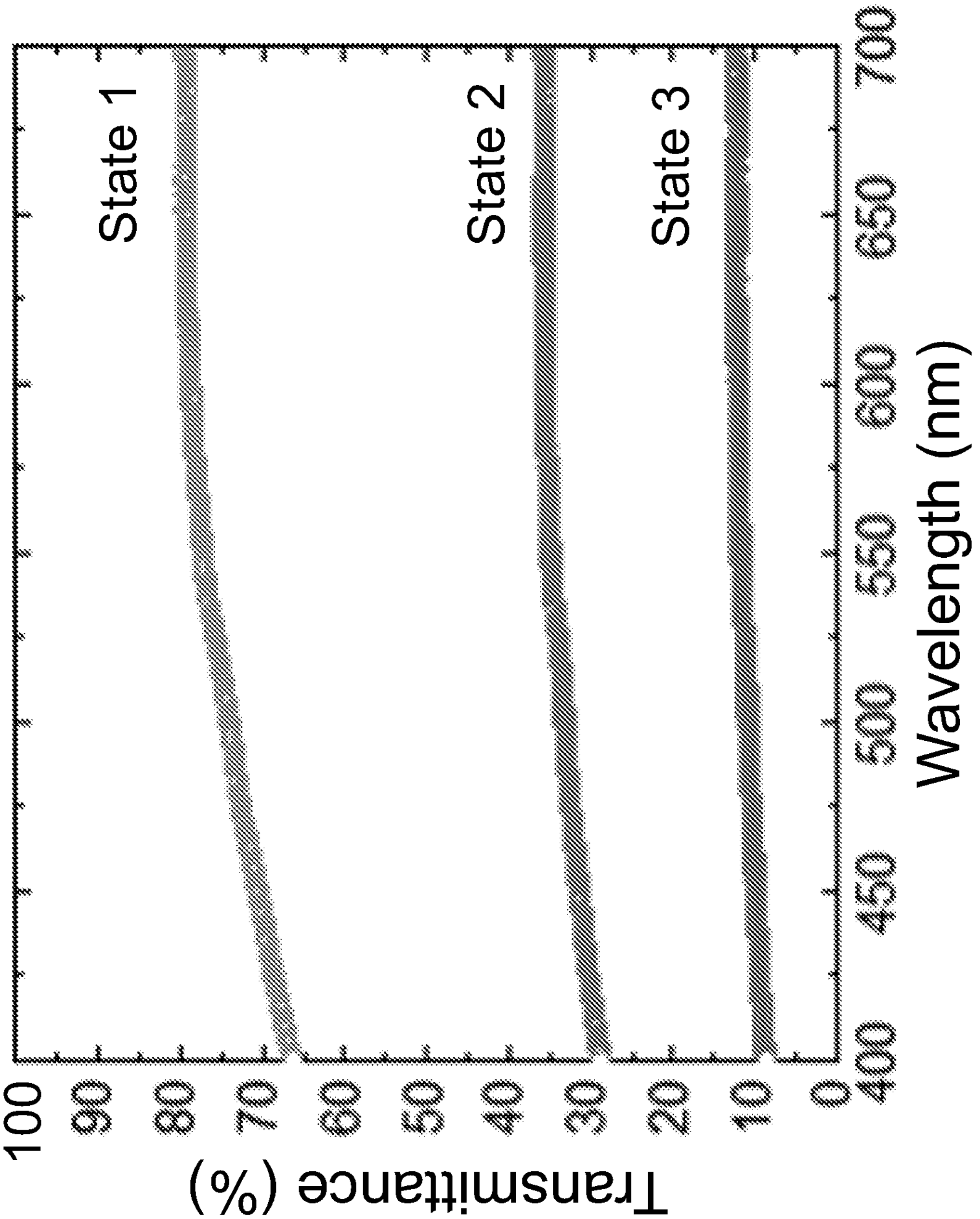
Figure 4F:
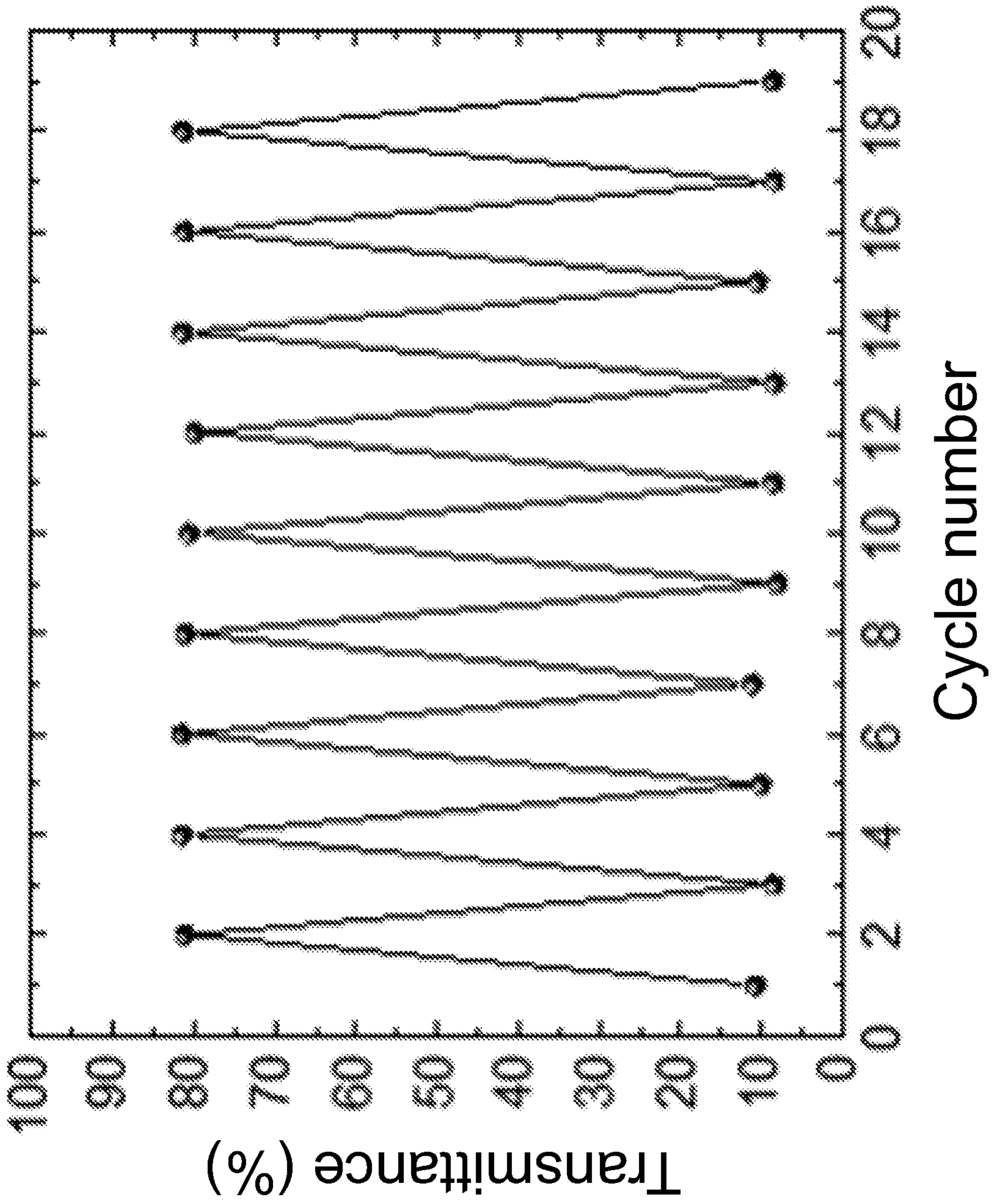
Figure 4G:
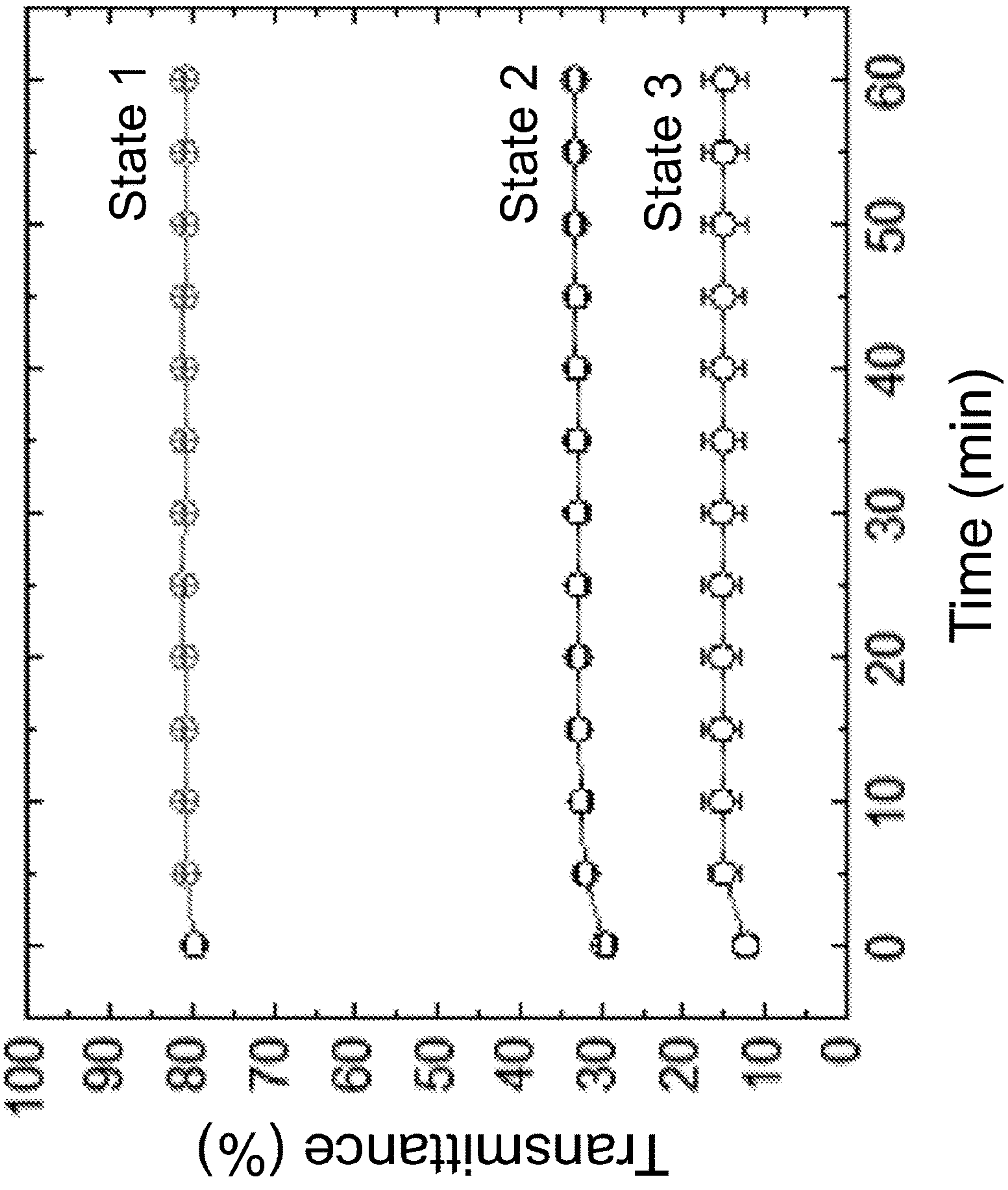

The optical sheet that did not have droplets (state 1) was optically transparent, allowing the image behind the optical sheet to be seen clearly (FIG. 4B). The transmittance measured with a UV-Vis spectrophotometer at the transparent state (State 1) was ~76% which was averaged over the entire visible wavelength window (about 400-700 nm) in comparison to air as a reference cell (FIGS. 13 and 4E). It is worth noting that the transmittance was close to the transmittance of pure E7 confined between DMOAP coated ITO glasses without DS phase (FIG. 13). Moreover, the transmission at state 1 was not incident light-angle dependent. When an electric field was applied at 250V/10 Hz, microdroplets were formed, and the emulsion turned to state 2. The transmittance was ~11% at this state (FIG. 4E), and the object behind the optical sheet was hidden entirely. Switching between states 1 and 2 were reversible upon applying an electric field at 100 V/1 kHz and 250 V/10 Hz, respectively (FIG. 4F). When an electric field at 250 V/1 kHz was applied to the sheet, the optical sheets contained relatively larger droplets from bridges (State 3), and transmittance was adjusted to ~34% (State 3, FIG. 4E). At this state, the object behind the optical sheet was slightly visible (FIG. 4D). The optical transmittance can be further fine-tuned by adjusting the voltage and frequency. Optical transmittance of these materials was maintained without significant variation for more than 1 hr (FIG. 4G), indicating that the three states were stable.

In summary, a new class of bistable optical devices based on isotropic oil in liquid crystalline emulsions is presented. Opaque and transparent states were accessed by applying an external electric field at different frequencies and voltage. It has been shown that the efficient emulsification for state 2 (FIG. 4A) was enabled by electroconvection with optimized parameters including 1) viscosity ratio~1 and 2) low interfacial tension. For state 3, an electric field (125-250V) at high frequency (1 kHz) was applied. Application of high electric field generated bridges connecting two electrodes. When the electric field was switched off abruptly, the bridges were ruptured into droplets due to Rayleigh instability. The emulsion droplets of states 2 and 3 were stabilized by elastic dipolar repulsion associated with hyperbolic point defects. Upon applying an electric field at high frequency, droplets coalesced via electric field-induced disclination line formation and further dielectrophoresis by absorbed DS. Therefore, stabilization and destabilization of droplets were mainly achieved by topological defect control via an external electric field.

We demonstrated that the demulsification of droplets is induced by the transformation of hyperbolic point defect to disclination lines upon an electric field. Moreover, we observed that the droplets of SDS containing aqueous solution and fluorinated oils in E7 did not exhibit defect transformation and following coalescence at high frequency (1 kHz) of the voltage window (<250 V). This suggests that it costs more energy to transform the point defects to disclination, indicating the anchoring energy coefficient is much bigger and DS interfaces. The strong anchoring is likely associated with the intensity of interfacial free energy resulting from weak van der Waals interactions between droplet phase and continuous liquid crystalline phase.

Although DS and E7 were selected as model isotropic oil and liquid crystalline oil for understanding of the emulsification, demulsification, and defect induced stabilization in this study, there are potentially other suitable pairs of oils for this switchable emulsion system. Such pairs can be prudently selected based on the disclosed $Ca_{cr}$ calculation. For example, when the density between an isotropic oil phase and a liquid crystalline phase is matched, the droplets dispersed in the liquid crystalline phase can be better stabilized. Moreover, the light transmittance of the optical sheets at an opaque state (State 2) can further be decreased by choosing isotropic oil phase that induces strong anchoring to liquid crystals; thereby, smaller droplets are stabilized with hyperbolic point defects leading to more efficient light scattering. The emulsification of the isotropic phase depends on the EHD flow. Since the EHD flow intensity largely depends on the ionic concentrations in an LC phase, the voltage needed to emulsify the isotropic phase can be further decreased. While a fixed thickness of the optical cell was used, the operational voltage for emulsification and demulsification can be further reduced when the optical cell thickness decreases. Observations of this study have shown that the numbers and sizes of droplets are fine-tuned depending on time, the intensity of voltage, and the frequency of an electric field. This further gives rise to the precise tuning of optical transmittance of the optical sheets. Therefore, this may be useful for energy-efficient displays (e.g., E-papers or E-books) that need gradient in optical transmittance for displays after pixelization. Lastly, although this study was limited to evaluation of changes in optical properties, the switching of different states can trigger changes in other beneficial physical properties in the emulsions which contain rheology (like electrorheological fluids). Overall, switchable emulsions of this study can be the basis of a new class of stimuli-responsive materials needing stability in multiple physical properties that can be accessed by a short pulse of external electric field and lead to lots of new applications.

Methods. Fabrication of optical cells. ITO glasses (15-25 Ω/sq, Sigma-Aldrich) were treated with 1 vol. % of dimethyloctadecyl[3-(trimethoxysilyl)propyl]ammonium chloride solution (42 wt. % in methanol, Sigma-Aldrich) aqueous solution for 30 mins. DMOAP treatment led to uniform distribution of DS phase on ITO glasses. The DMOAP treated ITO glasses were washed with approximately 100 ml of Millipore water followed by compressed $N_2$ gas. Two ITO glasses were attached using double-sided scotch tapes (3M) with a gap size of ~100 m. In the overlapped areas, 13.5~15 vol. % of a mixture of squalane (TCI)/dioctyl phthalate (Sigma-Aldrich)=1/1 (v/v) in E7 at one phase was infused into the gap of ITO glasses placed on a hot plate (90° C.) through capillary action. At this temperature, the mixture is one phasic. For a uniform mixture of DS and E7, the mixture was incubated on the hot plate for more than 10 mins. The mixture sandwiched between two electrodes was then quenched in a freezer (Fisher Scientific). The mixture is rapidly phase-separated in the freezer, and the DS phase can be homogeneously distributed in the optical cells. The mixture was then placed in an ambient condition to get equilibrated with ambient temperature. For the experiment on size-dependent defect configuration change, the phase-separated DS/E7 mixture was mechanically agitated for 10 sec using a vortex mixture (VWR) and infused into two slide glasses coated with rubbed polyimide. The rubbing direction of PI-coated glasses was antiparallel to each other. The gap size was 100 μm.

Application of electric fields. A function generator (Keysight, 33210A) connected to a voltage amplifier (Trek, 500 V/V). For AC electric fields, a square waveform was applied. Each ITO glasses of the optical cells were attached with Copper tape (3M) and linked to the amplifier using alligator clips.

Microscopy and macroscopy. An optical microscope (Olympus BX41) equipped with 4×, 10×, 20×, 50×, and 60× objectives, two rotating polarizers, a Moticam 10.0 MP camera, and a halogen lamp (Philips 6V 30 W bulb) for light illumination was used. The white balance function of the digital camera software was used to avoid the biased color from the halogen lamp. For macroscope observation, a digital camera (Canon) was used.

Optical property test. The transmittance of cells was measured with UV-Vis spectra (Varian, CARY 100 Scan UV-Visible Spectrophotometer). Air was used as a reference.

Example 2

The following is an example of compositions of the present disclosure, methods of making same, and methods of using same.

Figure 14:
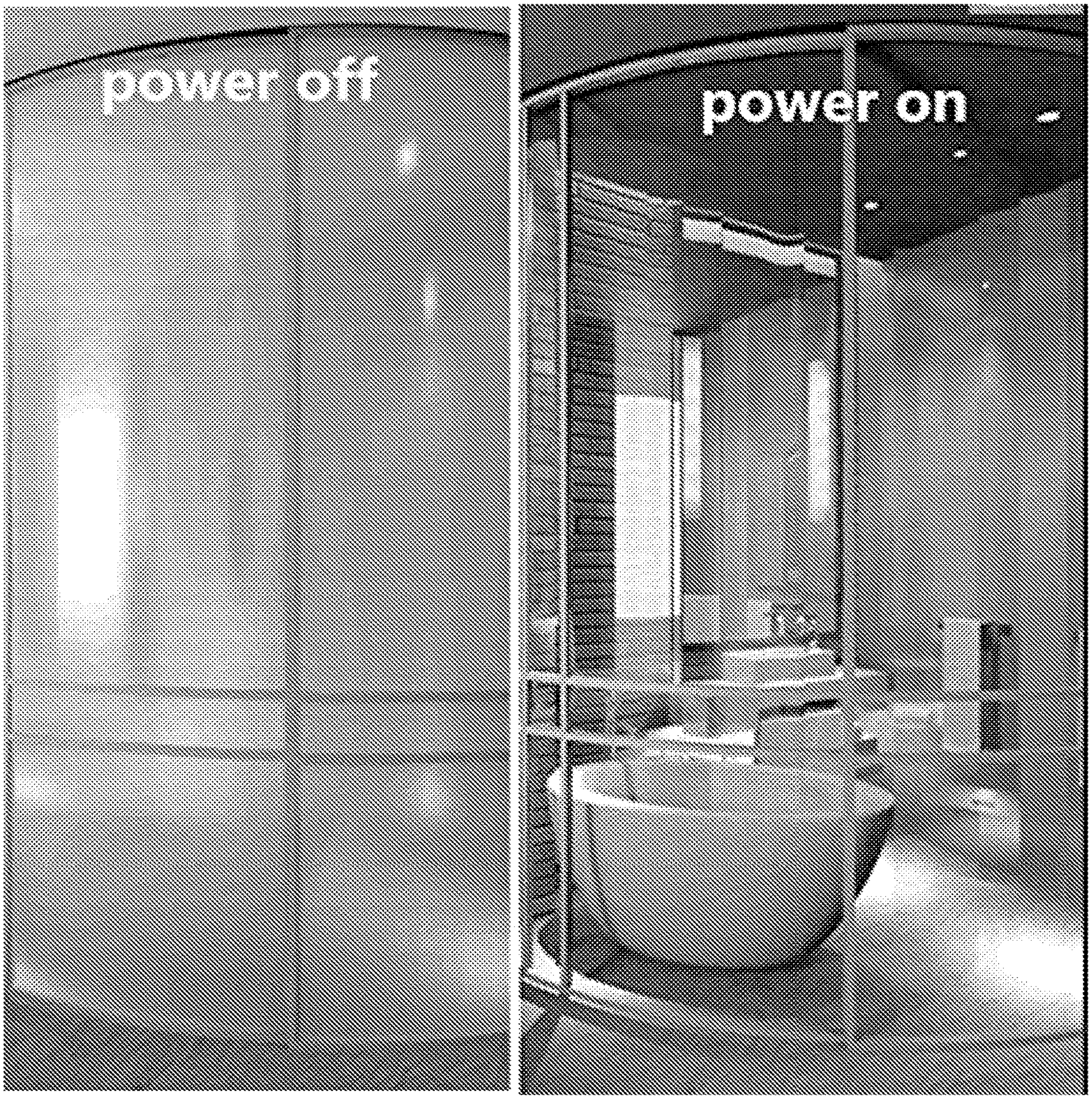
FIG. 14 shows an example of a commercially available light shutter based on polymer dispersed liquid crystals.

A new class of bistable light shutters by liquid crystalline emulsions. A new class of bistable liquid crystalline emulsions are disclosed herein which have superior performance relative to existing light shutter devices. Light shutters are a class of optical devices which are capable of changing transparency on-demand. Well-known and commercially available examples of such light shutters include polymer dispersed liquid crystals (PDLCs) where liquid crystal (LC) droplets are uniformly embedded in a polymer matrix (FIG. 14). Without an electric field, PDLCs are opaque due to light scattering from refractive index mismatch between dispersed LC phases and polymer matrices. By turning on an electric field, LC molecules in the droplet phases are aligned along the field and refractive indices are matched. Therefore, PDLCs switch between transparent and opaque states by turning electric field on and off, respectively. In spite of active research and development efforts on PDLCs since early in 1990's, PDLCs have significant limitations 1) they are not energetically efficient because the electric field must be applied continuously to maintain transparency and 2) they exhibit narrow viewing angles (transparency is only apparent when viewed as near-normal incidence). As an alternative technique for PDLCs, polymer stabilized cholesteric liquid crystals (PSCLCs) have been introduced and developed. PSCLCs exhibit transparent mode and opaque mode simply by controlling frequency of alternative current (AC) electric fields. In contrast to PDLCs, PSCLCs can generate either transparent or opaque states after removal of the electric field—that is, they are bistable. However, bistable PSCLCs possess several drawbacks such as 1) reflecting certain wavelengths of light in their transparent state and 2) their mechanical instability.

A new light shutter design based on bistable liquid crystalline emulsions (BLCEs, FIG. 15) is disclosed herein that exhibits a wide viewing angle and optical bistability, thus overcoming key limitations of previous technologies.

Figures 15A, 15B, 15C, 15D:
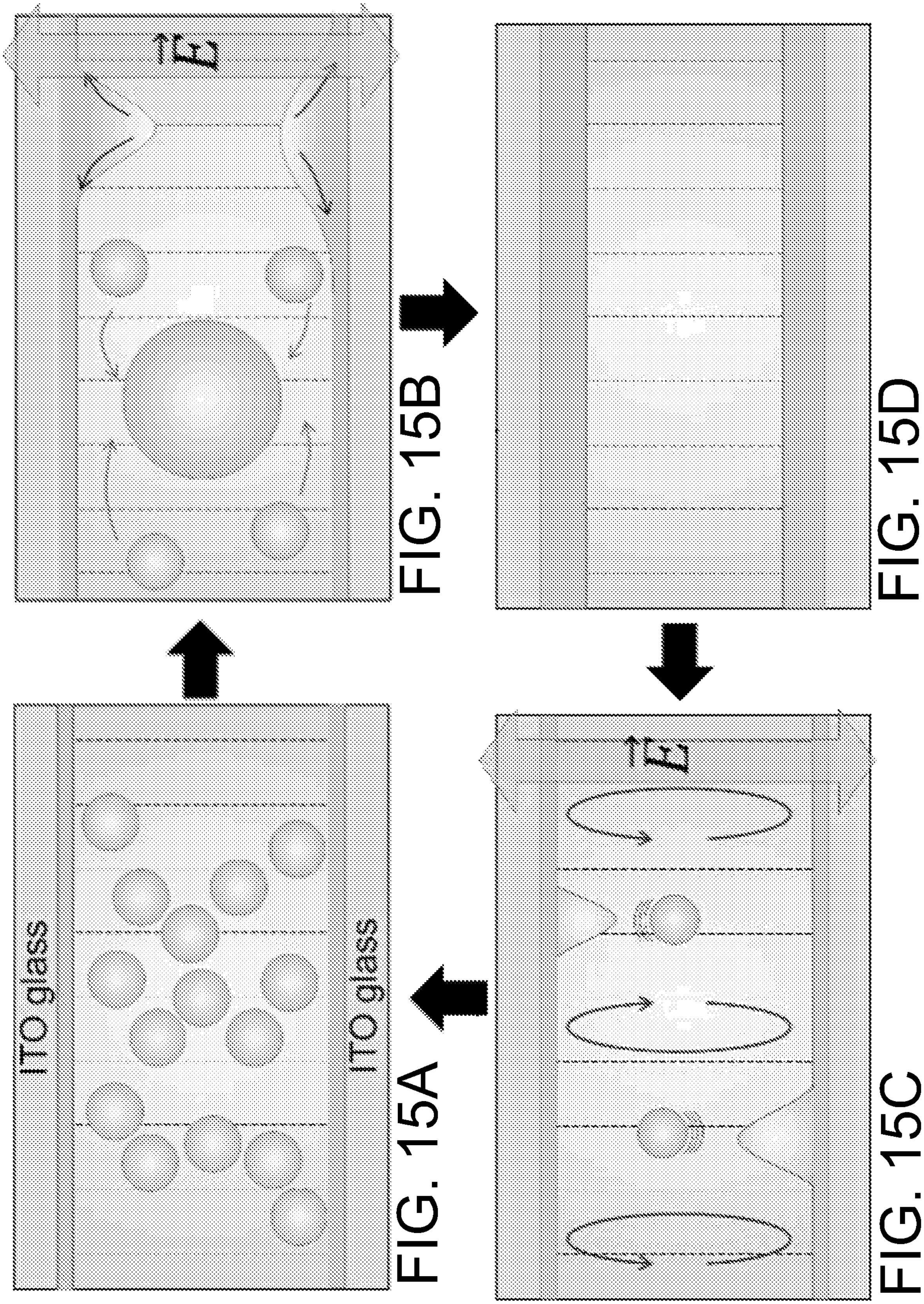
(FIG. 15A) Opaque state of a LC emulsion. Oil droplets are dispersed and trapped by elastic dipolar interaction of LC medium.
(FIG. 15B) Electrocoalescence and spreading of oil droplets under an AC electric field at high frequency.
(FIG. 15C) Electroemulsification of an oil phase under an AC electric field at low frequency.
(FIG. 15D) Transparent state by spreading of an oil phase on substrates.

Our discovery leads to a light shutter that possesses bistability and wide viewing angle. Our light shutter is based on bistable liquid crystalline emulsions (BLCEs, FIG. 15). BLCEs are distinguished over existing PDLCs or PSCLCs in terms of the composition of the device and the mechanisms of switching from transparent to opaque modes. BLCEs are comprised of a biphasic mixture of oil and thermotropic liquid crystals between two conductive indium tin oxide (ITO) glasses (FIG. 15A-15D). BLCEs exhibit two stable states: 1) small oil droplets dispersed in LC medium (optically opaque state, FIG. 15A) and 2) an oil phase spread onto ITO glasses (optically transparent state, FIG. 15D). Surprisingly, these two states can be accessed by applying a short pulse of an electric field, with the state accessed by the electric field being dependent on the frequency of the electric field. Different from PDLCs and PSCLCs, where electric fields are used to change LC molecular alignments, electric fields were used for reversible emulsification/demulsification of oil droplets. At low frequencies, it was found that the isotropic oil phase is emulsified in the LC phase by a electrohydrodynamic flow (FIG. 15C). Due to refractive index mismatch between small the oil droplets and LC phase, the emulsified oil droplets acted as light scattering sites, thus, the BLCEs became opaque. In this state, the oil droplets in LC medium were immobilized after removal of the low frequency electric field, thus preventing coalescence, due to a strong elastic dipolar repulsion force generated by LC medium (FIG. 15A). This is the basis of stability of the opaque state of the BLCE optical shutter. In contrast, it was discovered that application of an electric field at a high frequency leads to droplet coalesce and growth in their size, apparently by electric dipolar attraction force that can overcome the elastic dipolar repulsion force (FIG. 15B). In the presence of the high frequency electric field, when the oil droplets reach to a diameter which is comparable to the size of the gap between the surfaces of the optical cell, the oil droplets are observed to spread (contact angle: 0°) across the surfaces of the ITO glass forming a transparent film (FIG. 15D). The elimination of droplets leads to the transparent state of BLCEs. Similar to the opaque state, the transparent state is maintained without an electric field. In a nutshell, surprisingly, two stable states can be obtained, one transparent and one opaque, by transient application of electric fields that differ in frequency. It appears that elastic dipolar repulsion between oil droplets (FIG. 15A) and capillary spreading of oil at ITO glass surfaces (FIG. 15D) are key phenomena underlying the discovery, but the scope of the disclosure is not limited by the specific physical mechanisms leading to the reversible formation of the two stable states of the system.

Selection of materials. The present disclosure involves an isotropic oil dispersed in a liquid crystal. We tried numerous combinations of isotropic oil and liquid crystal that did not work, and surprising found some combinations that worked. It was found to be important that the isotropic oil and liquid crystal materials: 1) form two phases; 2) undergo reversible coalescence and emulsification (of the dispersed oil phase) in the presence of electric fields; and 3) form a film of the oil phase at the LC-ITO glass interface. Table 2 shows pairs of materials that were investigated. Qualitatively, it is considered that the affinity between oil phase and LC phase determines whether a BLCE will be realized or not. For instance, if the affinity between oil phase and LCs phase is strong, oil/LC mixtures form one phase. In contrast, if the affinity is weak, oil phase is not emulsified by electric field because interfacial tension between oil phase and LC phase is too high to emulsify them. The affinity needs to be moderate to form two phases with very low interfacial tension. For a systematic comparison of affinity of LC/oil pairs, it should be possible to 1) quantify these affinities based on interaction parameters or Hildebrand (or Hansen) solubility parameters and 1) find the range of "affinity values" that work for this system. The following descriptions include actual demonstration of BLCEs for a light shutter using mineral oil (MO) as an oil phase and E7 as a liquid crystalline phase. Table 3 shows specific pairs of liquid crystal-isotropic oil which have been observed to coalesce under an electric field (<500 V/1 kHz). It is proposed that the high anchoring energy coefficient of LC hinders the coalescence of certain pairs of liquid crystal-isotropic oil under an electric field.

TABLE 2

| Liquid Crystal Phase | Droplet Phase | Miscibility | Reversible Electroemulsification and Electrocoalescence | Film Formation |
|---|---|---|---|---|
| TL 205 | Mineral Oil | One Phase | N/A | N/A |
| 5CB | Mineral Oil | One Phase | N/A | N/A |
| HNG708600-100 | Mineral Oil | One Phase | N/A | N/A |
| PCH-3 | Mineral Oil | One Phase | N/A | N/A |
| MBBA | Mineral Oil | One Phase | N/A | N/A |
| PCH-3/PCH-5 mix | Mineral Oil | One Phase | N/A | N/A |
| E7 | Mineral Oil | Two Phases | Yes | Yes |
| E7 | Hexadecane | Two Phases | Yes | Yes |
| E7 | perfluoro decahydronaphthalene | Two Phases | No | N/A |
| E7 | Water | Two Phases | No | N/A |

TABLE 3

| Liquid Crystal Phase | Droplet Phase | Coalescence under electric field (<500 V/1 kHz) |
|---|---|---|
| E7 | Perfluorodecahydronaphthalene | No |
| E7 | Mineral Oil | Yes |
| E7 | DOP/Squalane (1/1 v/v) | Yes |
| E7 | Water (containing SDS) | No |

Figures 16A, 16B, 16C, 16D, 16E, 16F:
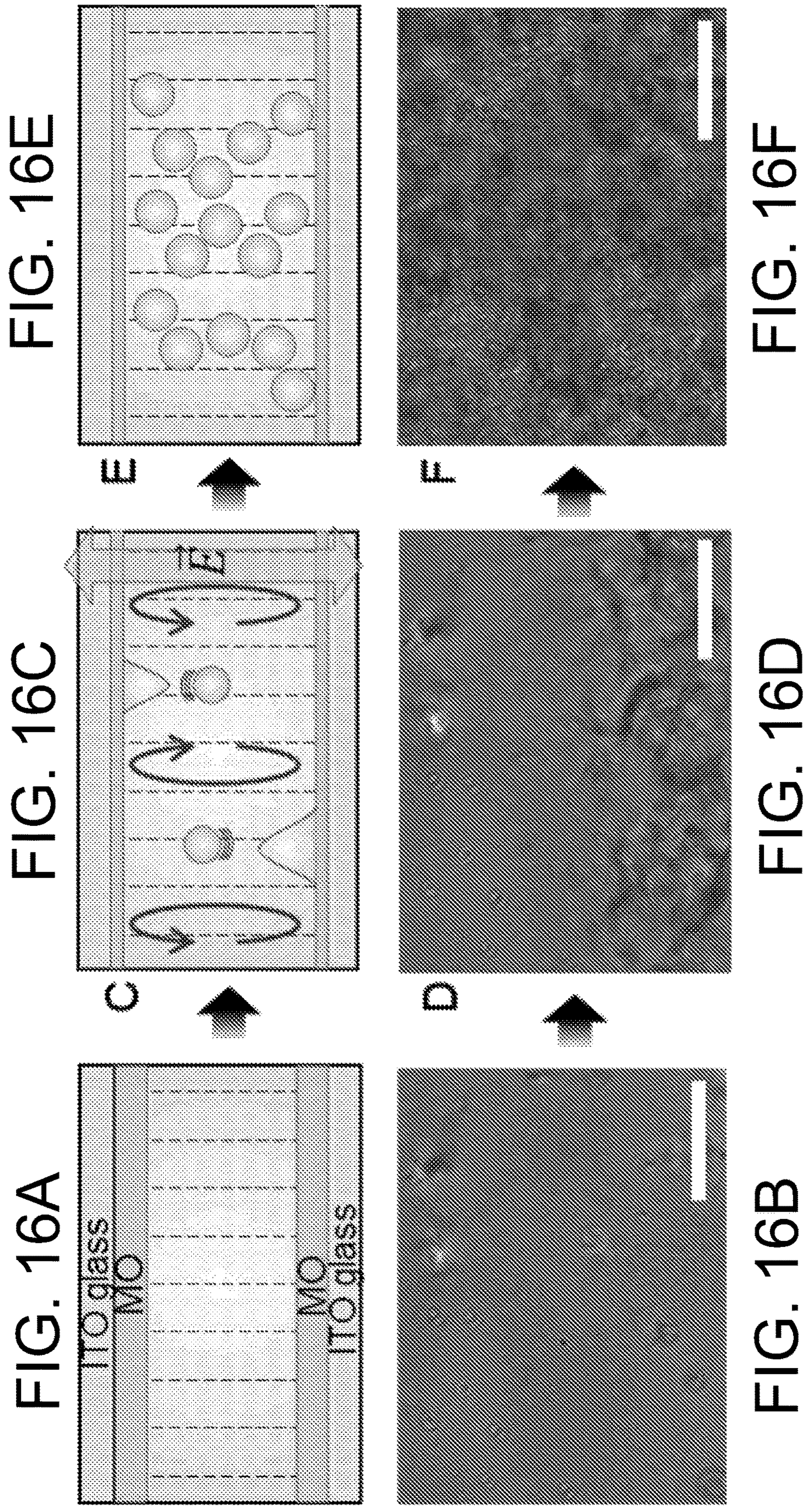
Figure 16G:
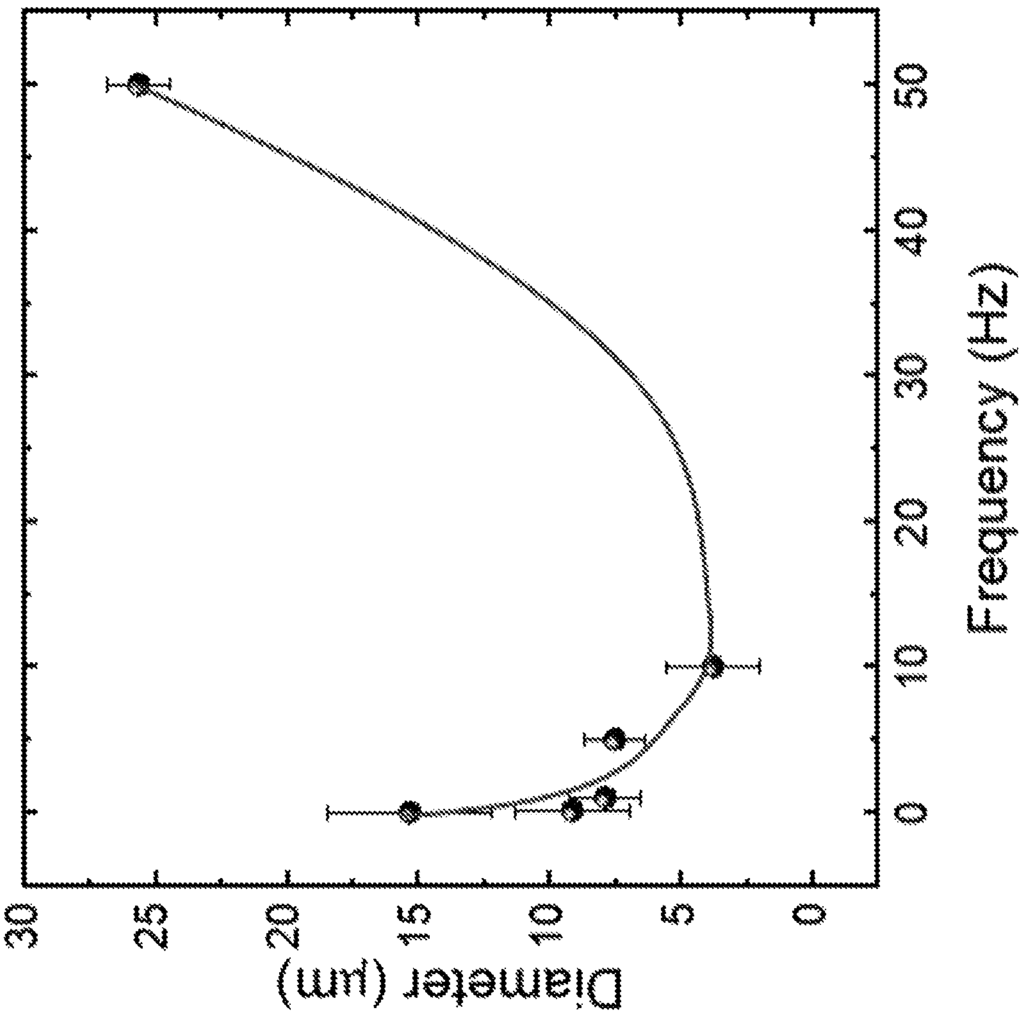
Figure 16H:
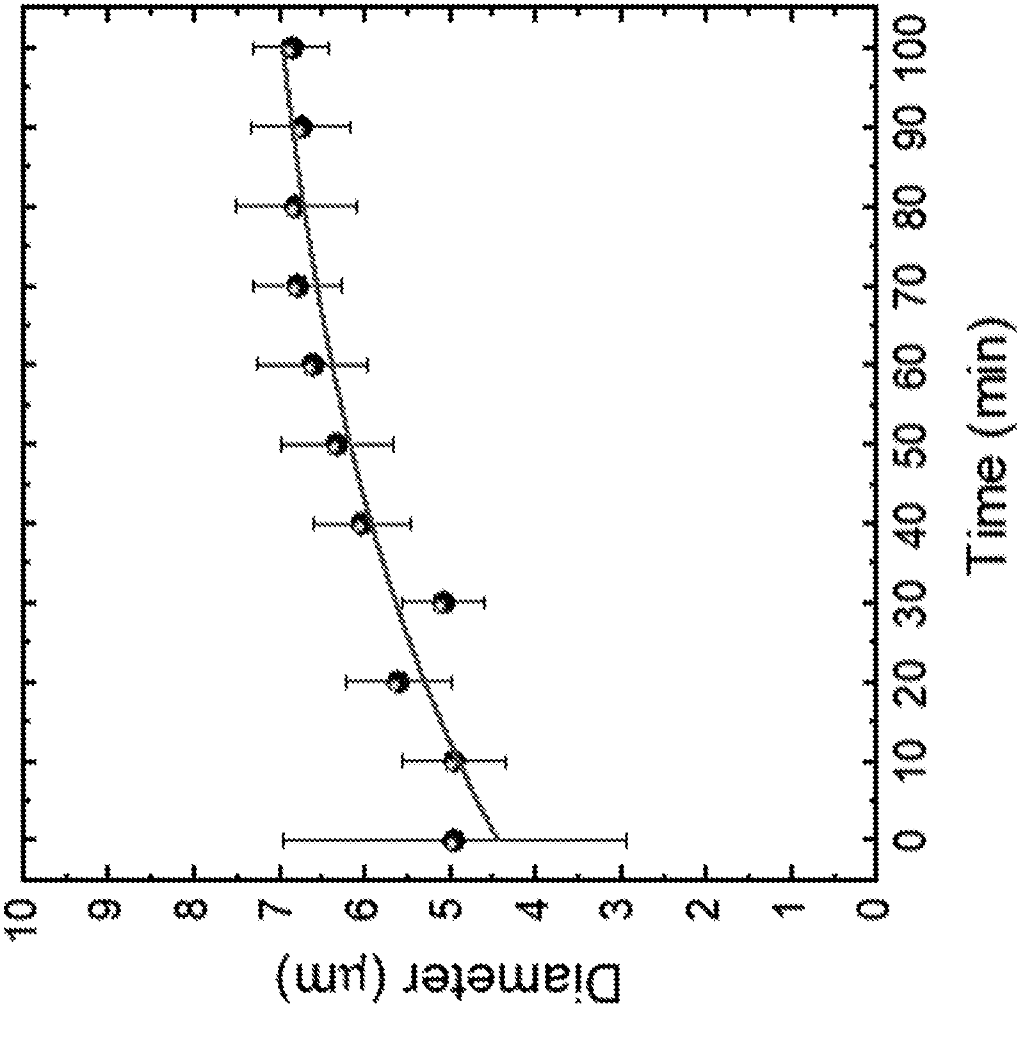

Electric field induced emulsification. A 100 μm thick cell was prepared that was filled with MO (20 vol. %)/E7 (80 vol. %). Initially, the MO phase separated from the E7 medium by forming thin layers onto ITO glasses (FIG. 16A, 16B). The micrograph in FIG. 16A does not show mineral oil droplets. When an AC electric field was applied at 250V and 10 Hz, MO droplets (~5 μm) were immediately formed and displaced throughout the E7 phase (FIG. 16C-F). When the electric field was removed, the MO droplets remained in the E7 medium. When the frequency of AC electric field at fixed 250V was varied from 0 Hz to 50 kHz, smallest droplets (~5 μm) were formed only near 10 Hz. Since the diameter of droplets has a large influence on the optical transmittance of emulsion materials, this further suggests that optical transmittance can be tuned by changing frequency. After the droplets were formed at 10 Hz, almost no increase in size of MO droplets was observed for 100 mins (only 5 μm to 7 μm). The rate of increase in droplet size slowed over time. While the emulsification was explored at a fixed voltage (250V), the voltage needed to emulsify the oil droplets can be further reduced by 1) adding ionic salts in E7 phase and 2) decreasing cell thickness.

Figures 17A, 17B, 17C, 17D, 17E, 17F:
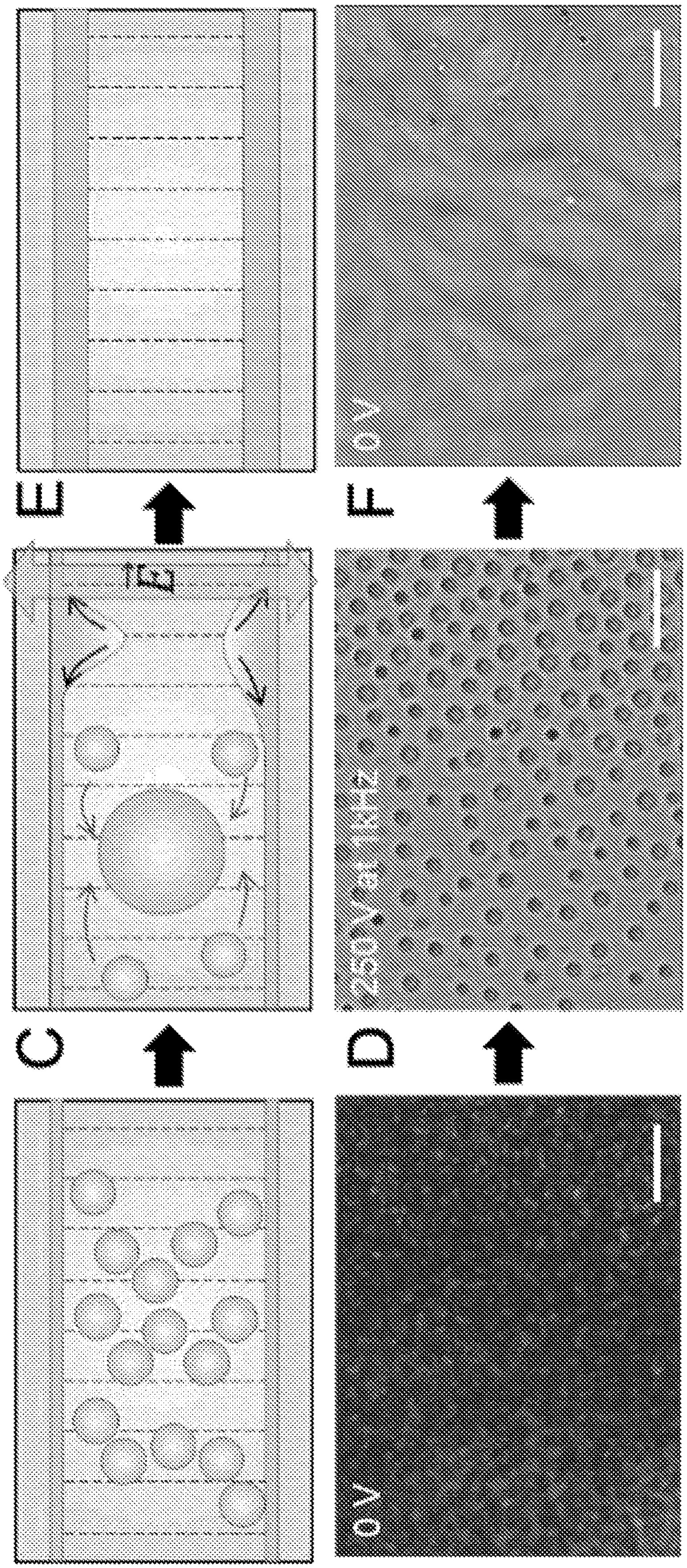
(FIG. 17A-17F) Schematic illustrations and micrographs showing coalescence of oil droplets in LC medium.
Figure 17G:
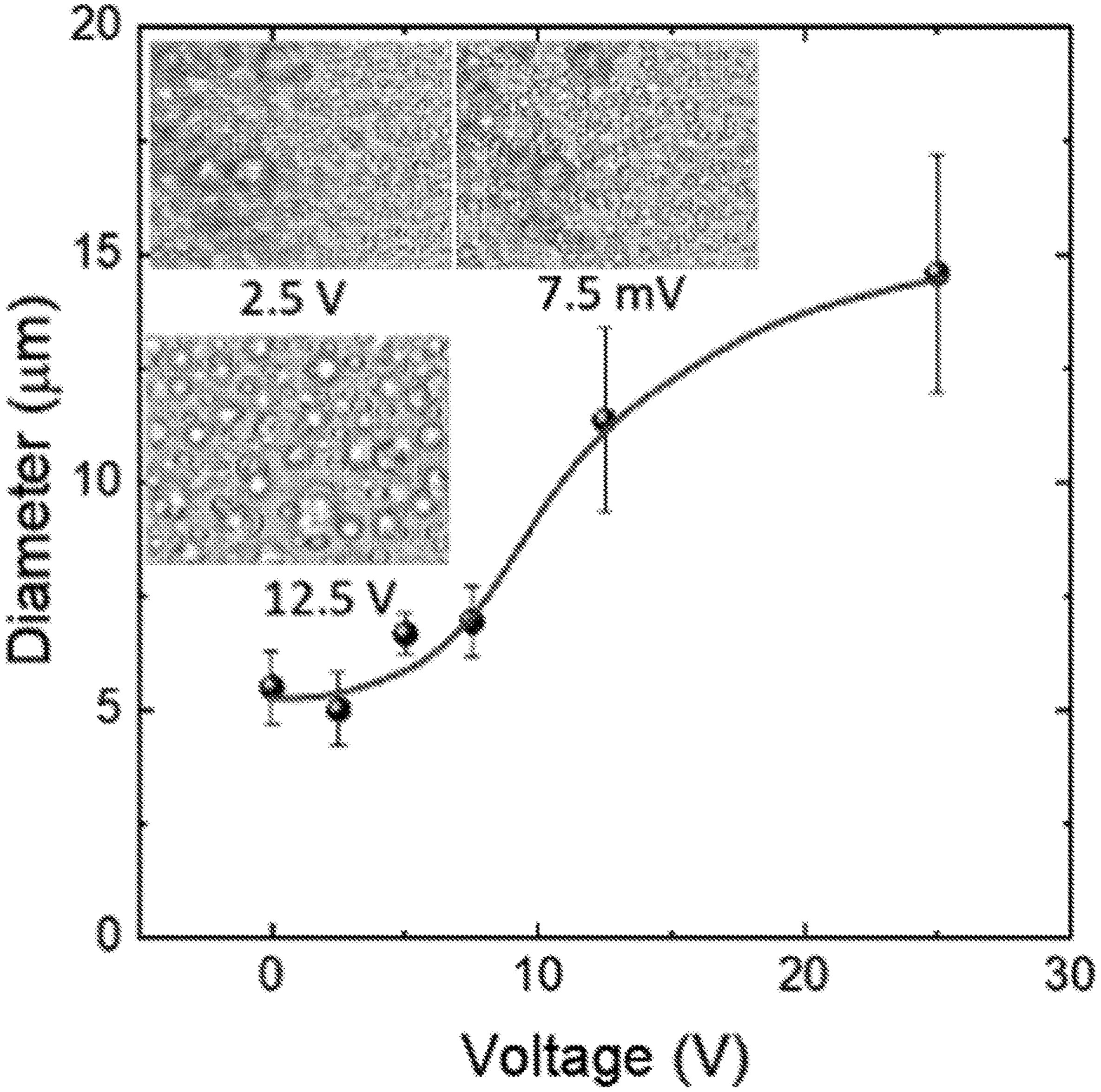
(FIG. 17G) Diameter change of droplets vs. voltage (at 1 kHz).

Electric field induced coalescence and film formation. FIG. 17 shows electric field-induced coalescence and film formation. Initially, MO droplets were suspended in E7 medium (FIG. 17A, 17B). Upon application of an electric field (250 V at 1 kHz), the MO droplets rapidly coalesced and formed capillary bridges connecting top and bottom plates (FIG. 17C, 17D). After removing the electric field, the capillary bridges disappeared as the oil spread across the ITO glass surfaces (FIG. 17E, 17F). The minimum voltage for coalescence of MO droplets was 12.5 V as shown in FIG. 17G (with a 100 μm thick cell).

Figure 18A:
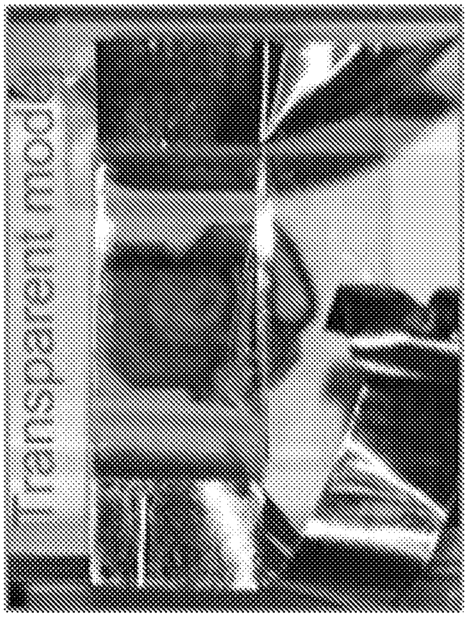
(FIG. 18A) Control of light transmission in an optical sheet comprising a BLCE.
Figure 18B:
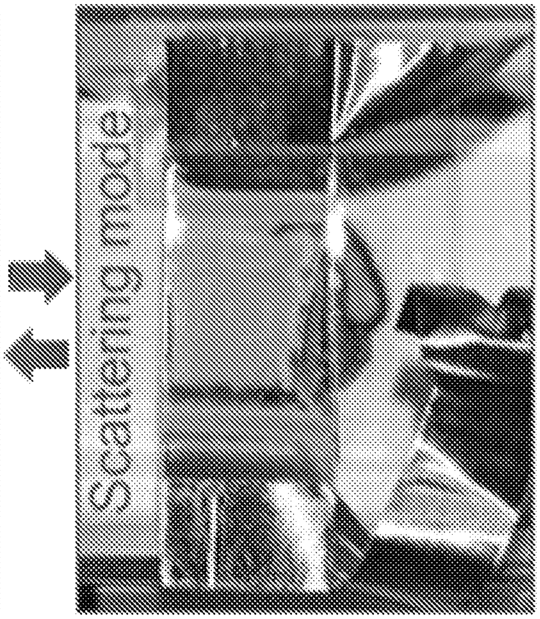
Figure 18C:
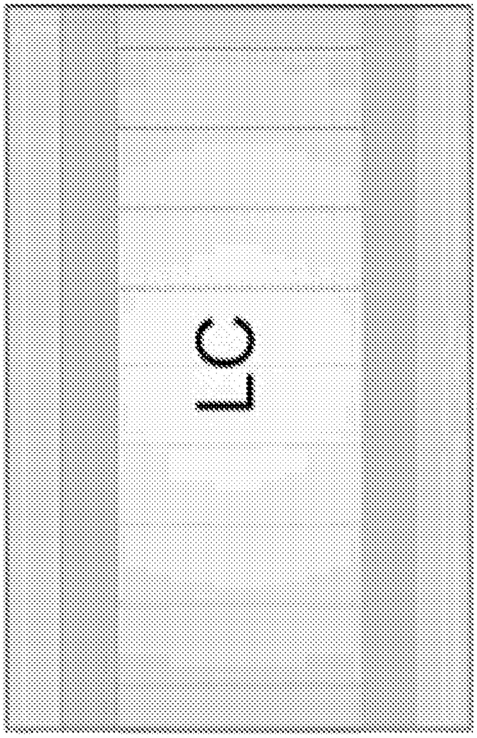
(FIG. 18C, 18D) A photograph and corresponding schematic of a BLCE in an opaque (light scattering) state.
Figure 18D:
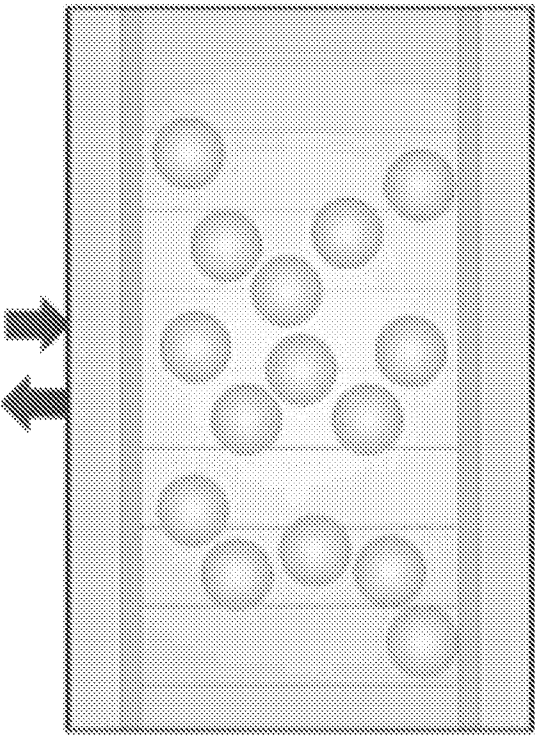

Transmission control of BLCEs. Optical property changes induced by electric fields were further investigated, as shown in FIG. 18. When a BLCE comprised a film of MO at the ITO glass (no droplets), the BLCE was transparent (FIG. 18A, 18B). However, after a short pulse of an electric field at 250 V and 10 Hz, the BLCE became opaque (FIG. 18C, 18D). Applying an AC electric field at 250 V and 1 kHz led to a transparent state again.

Example 3

The following is an example of liquid crystal compositions, methods of making same, and methods of using same.

Selection of Substrate. It was observed that the optical sheets of the present disclosure work both with 1) bare indium tin oxide glass and 2) DMOAP treated ITO glass substrates. Bare indium tin oxide glasses induce spreading of the isotropic oil phase which is consistent with a small contact angle (<90 degrees) of isotropic oil or positive spreading coefficient.

Example 4

The following is an example of liquid crystal compositions, methods of making same, and methods of using same.

Figure 19B:
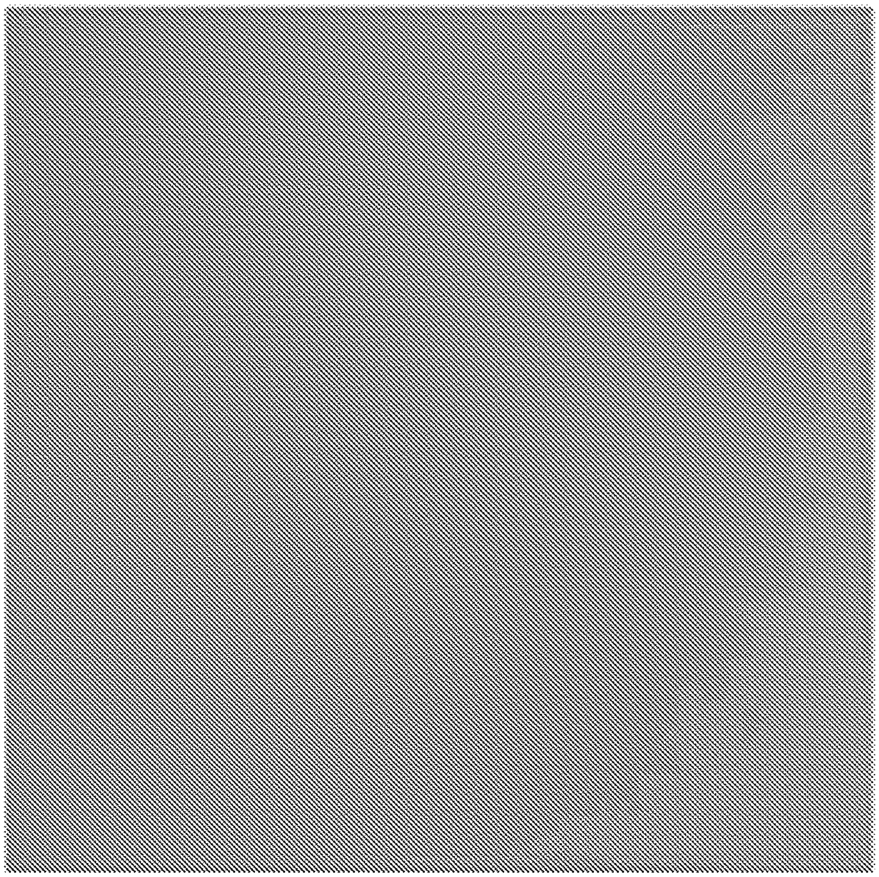
FIG. 19 shows optical sheets (thickness≈75 μm) comprising a BCLE (13.5 vol. % DS in E7) with $5\times10^{-5}$ w/v % tetrabutylammonium bromide (TBAB). The optical sheets reversibly switch from (FIG. 19A) a transparent state to (FIG. 19B) an opaque state upon application of 80 V/75 μm at either 1 kHz or 1 Hz.
FIG. 19C shows light transmittance (at 600 nm) as a function of time (measured in minutes (min)) through the bistable light shutter in the transparent and opaque states.
Figure 19A:
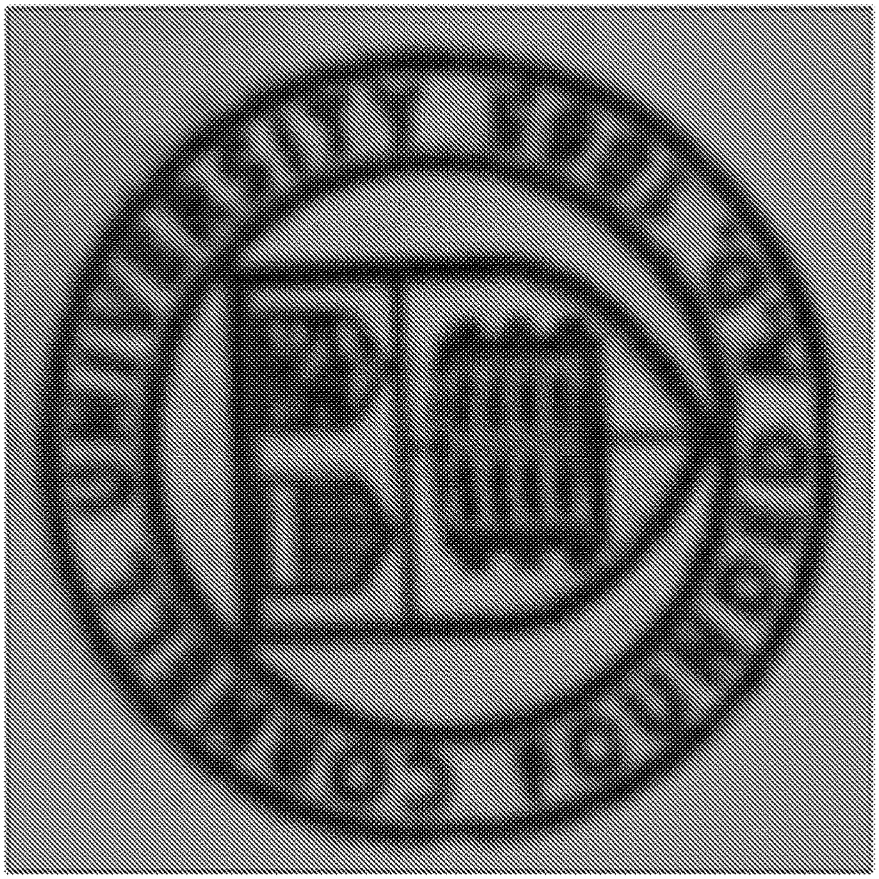
Figure 19C:
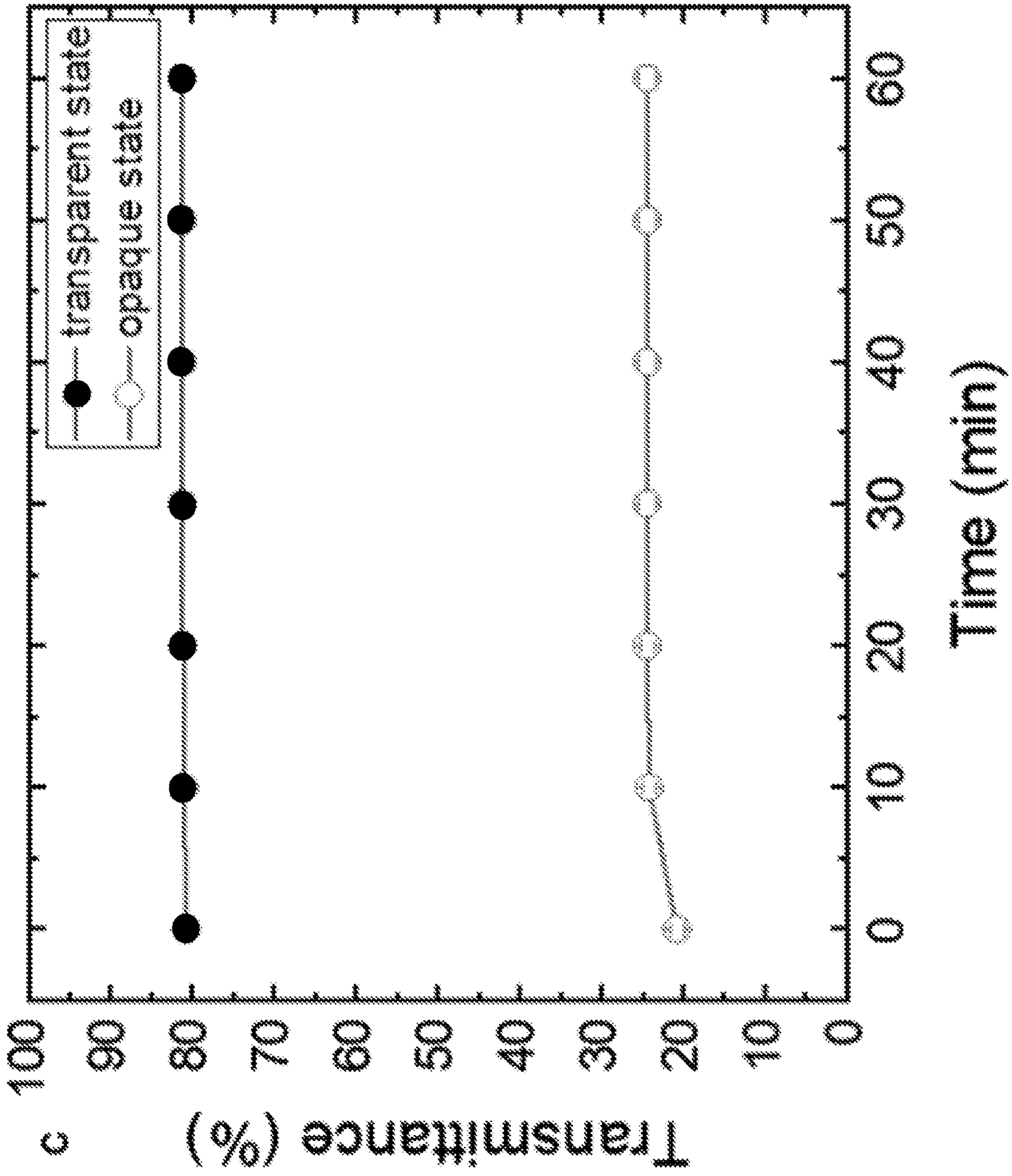
Figure 20A:
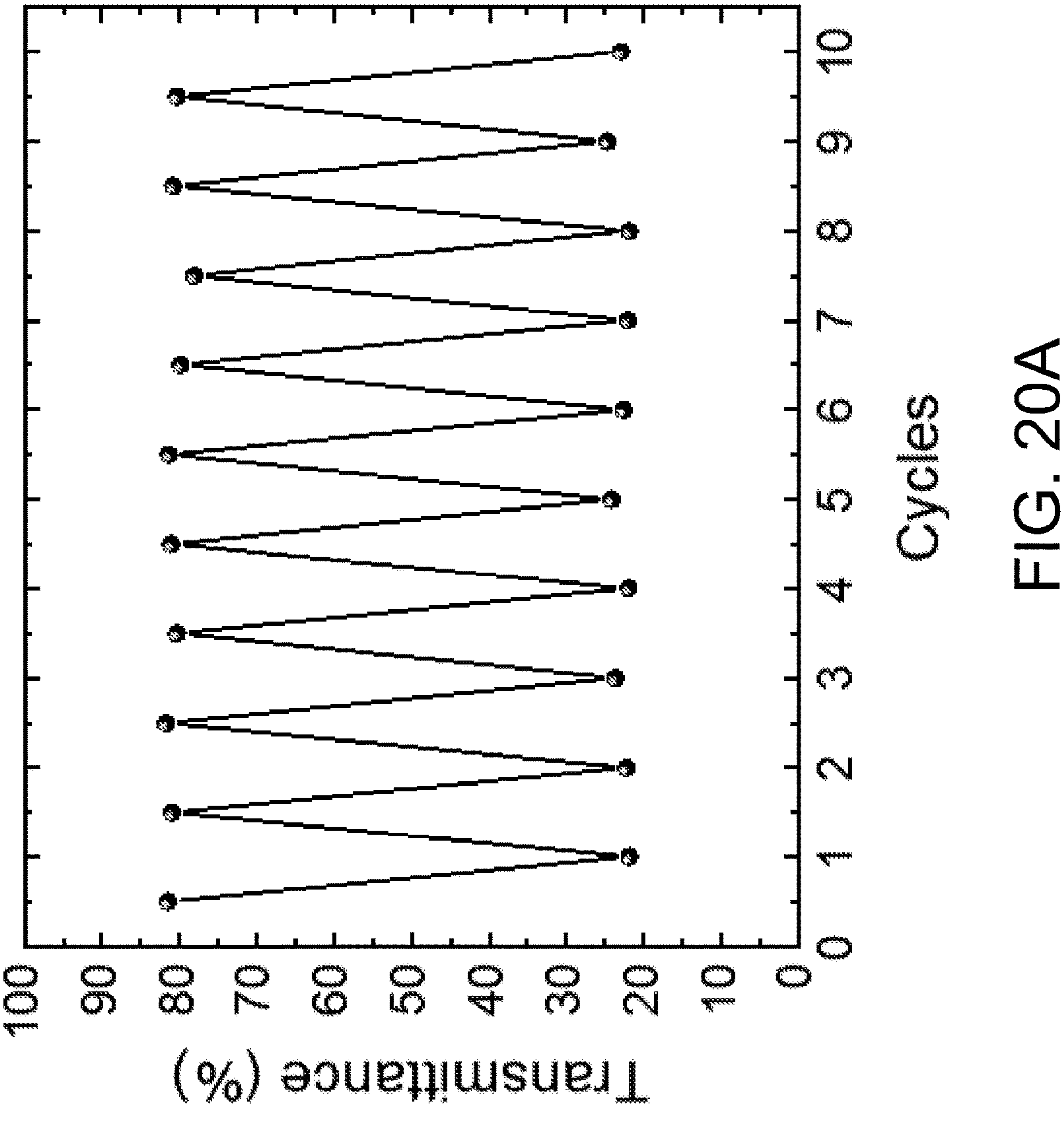
(FIG. 20A) Cyclic test of light transmittance (wavelength: 600 nm) of the optical sheets of FIG. 19 undergoing change between state 1 and state 2 upon the repeated application of 80 V/75 μm at either 1 kHz or 1 Hz.
Figure 20B:
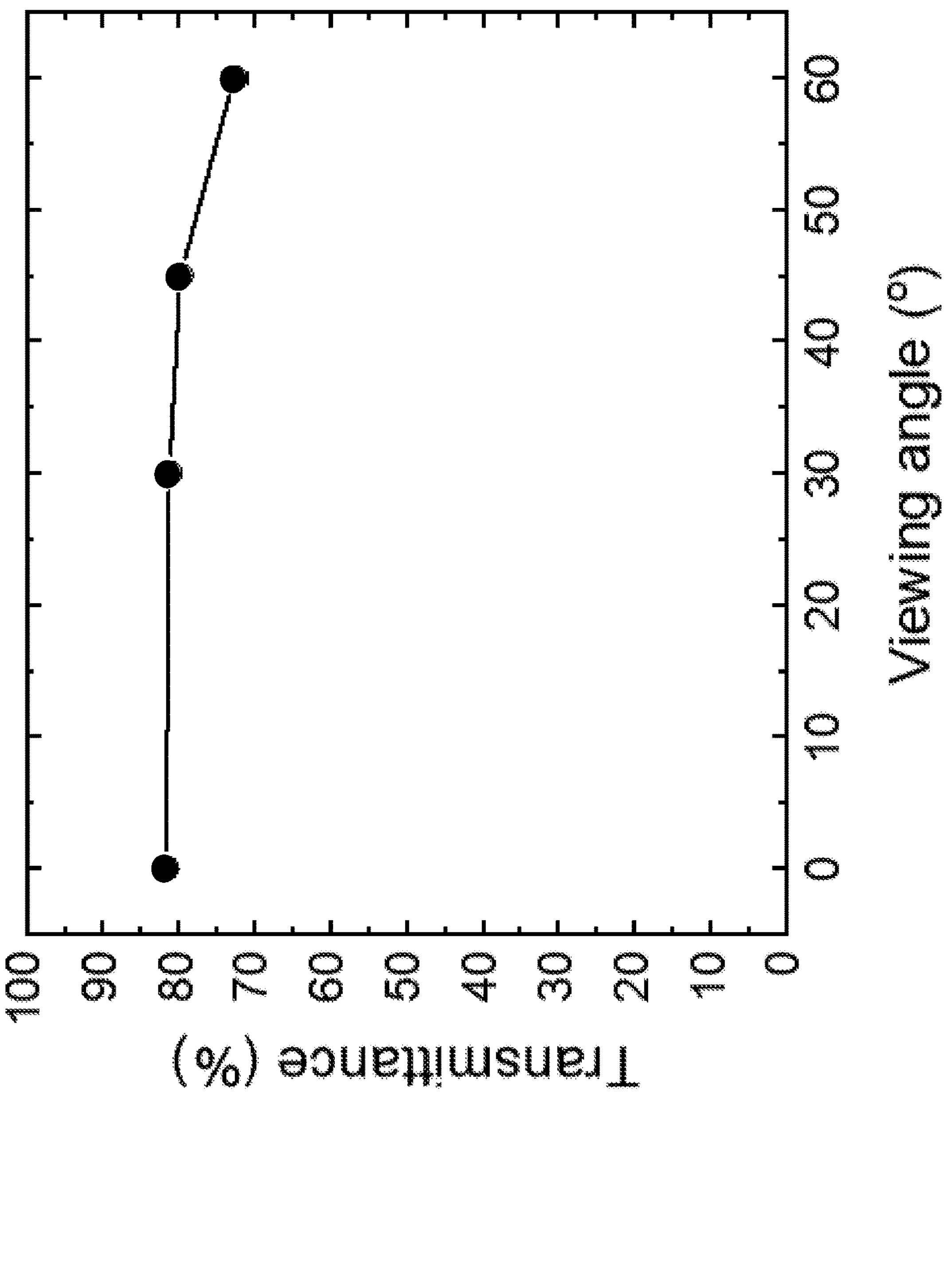
(FIG. 20B) Change in the transmittance of the transparent state of the optical sheets as a function of viewing angle.

Reduction in the operating voltage by adding salt. By adding a salt to the liquid crystal composition, the operating voltage required to form an emulsion was reduced. For example, it was observed that the addition of $1\times10^{-7}$ w/v %-1 w/v % of tetrabutylammonium bromide (TBAB) in E7 reduced the operating voltage to switch a bistable light shutter from a transparent state into an opaque state from a range of 10 V/μm-1 V/μm to a range of 10 V/μm to 0.25 V/μm (frequency: 0 Hertz to 100 Hertz) for a 20 μm-100 μm thick cell). FIG. 19 shows a bistable light shutter (thickness≈75 μm) comprising a liquid crystal composition (13.5 vol. % DS in E7 containing $5\times10^{-5}$ w/v % salt which was switched from a transparent state (FIG. 19A) to an opaque state (FIG. 19B) by applying 80 V/75 μm at either 1 kHz or at 1 Hz. The logo behind the optical sheet was hidden completely by the scattering of light. FIG. 19C shows the transmittance (at 600 nm) versus time for the optical sheets in the transparent and opaques states. The reduction in the operating voltage further supports the theory that the electrohydrodynamic flow under an electric field is responsible for the emulsification. FIG. 20A shows a cyclic test of light transmittance (wavelength: 600 nm) of the same optical sheets undergoing the change between state 1 and state 2 upon the repeated application of 80 V/75 μm at either 1 kHz or 1 Hz. FIG. 20B shows the change in the transmittance of the transparent state of the optical sheets as a function of viewing angle.

Figure 21:
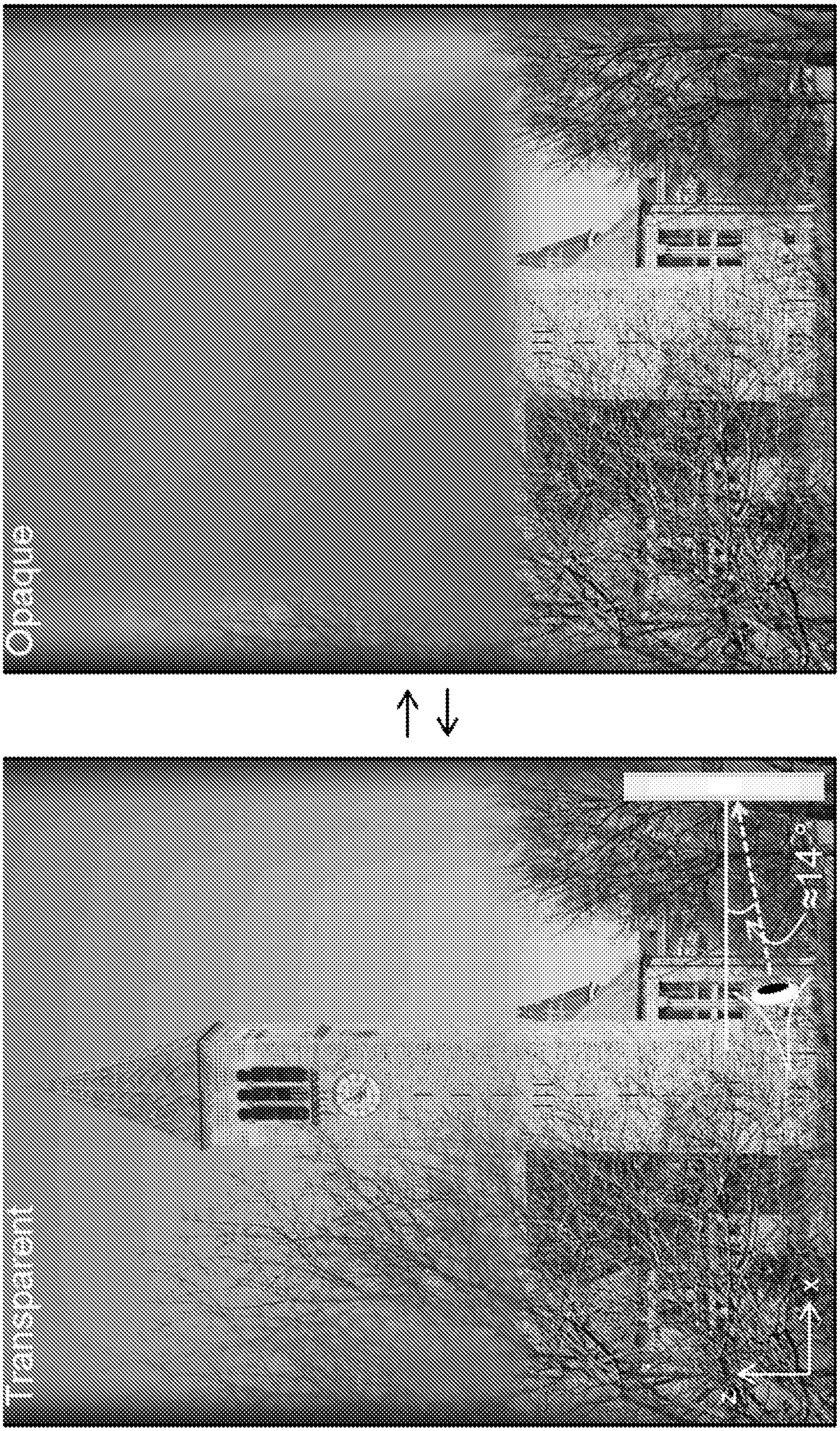
FIG. 21 shows Cornell McGraw Tower (≈140 m distance from a camera) seen through an optical sheet (≈40 mm×50 mm×100 μm) mounted on a window (left) at transparent state and (right) opaque state.

Larger scale optical sheets. FIG. 21 shows Cornell McGraw Tower (≈140 m distance from a camera) seen through an optical sheet (≈40 mm×50 mm×100 μm) mounted on a window (left) at transparent state and (right) opaque state.

Example 5

The following is an example of compositions, methods of making same, and methods of using same.

Tunable emulsions with ITO glasses (as transparent electrodes) without surface treatment. A composition was disposed between ITO glasses without surface treatment as transparent electrodes. Results are shown in FIGS. 22-24.

Figure 22:
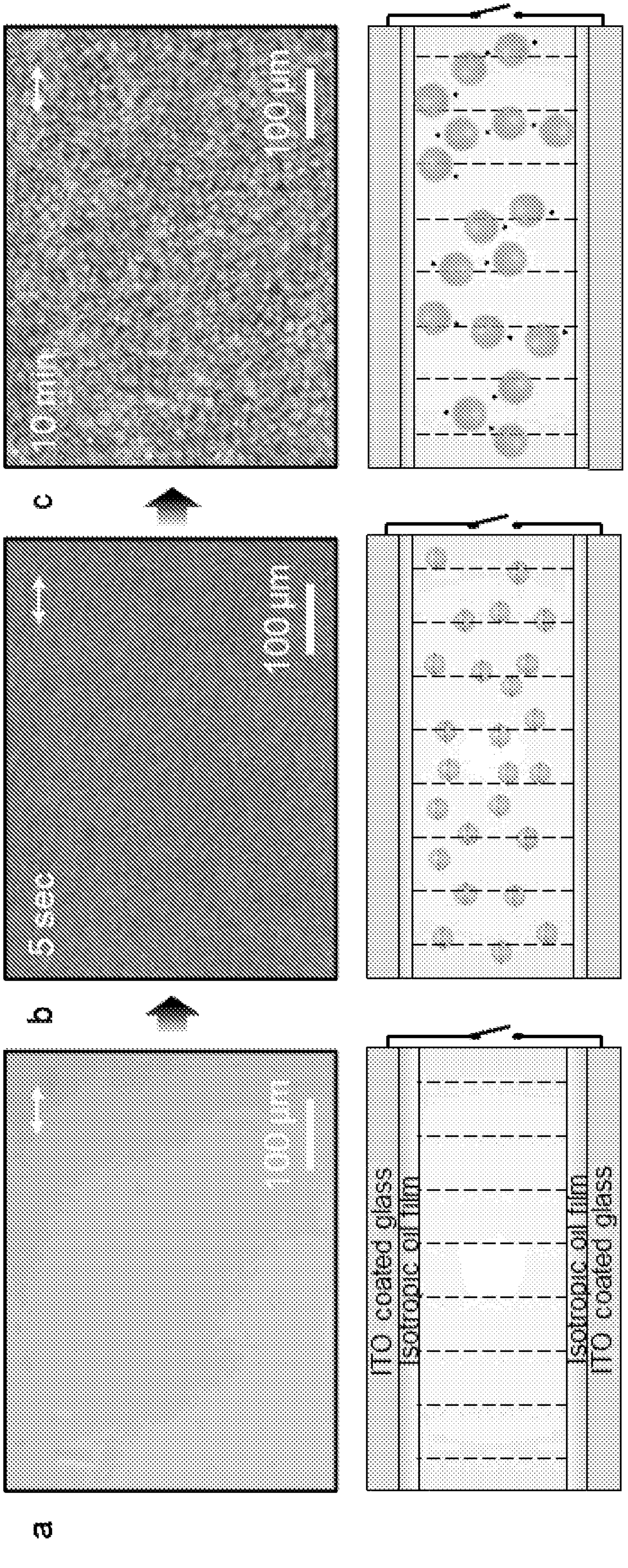
FIG. 22 shows (a) a laminated state of a tunable emulsion consisting of 13 vol. % isotropic oil (a mixture of dioctyl phthalate and squalane, DS) and 87 vol. % LC (E7, containing $5\times10^{-5}$ w/v % of tetrabutylammonium bromide). (b) An emulsified state of tunable emulsion 5 sec after switching off an electric field at 250V/10 Hz. (c) Isotropic oil droplets incubated for 10 mins after switching off an electric field at 250V/10 Hz. Schematic illustrations of the side-view corresponding to each micrograph are displayed under the corresponding micrographs.

FIG. 22 shows (a) a laminated state of a tunable emulsion consisting of 13 vol. % isotropic oil (a mixture of dioctyl phthalate and squalane, DS) and 87 vol. % LC (E7, containing $5\times10^{-5}$ w/v % of tetrabutylammonium bromide). The laminated state is stable. (b) Emulsified state of tunable emulsion 5 sec after switching off an electric field at 250V/10 Hz. The electric field induced the emulsification of the isotropic oil phase. The emulsified droplets were observed to exhibit rapid coalescence initially. (c) Isotropic oil droplets incubated for 10 mins after switching off an electric field at 250V/10 Hz. Within ≈5 mins after switching off an electric field, the droplet coalescence was greatly suppressed. Therefore, the emulsified state is stabilized. The schematic illustrations of the side-view corresponding to each micrograph are displayed under the micrographs. The thickness of the cell (excluding the thickness of electrodes) was ≈100 μm. Indium tin oxide (ITO) coated glasses (purchased from Sigma-Aldrich) were used as electrodes after simple rinsing with organic solvents (ethanol and acetone) without surface treatment.

Figure 23:
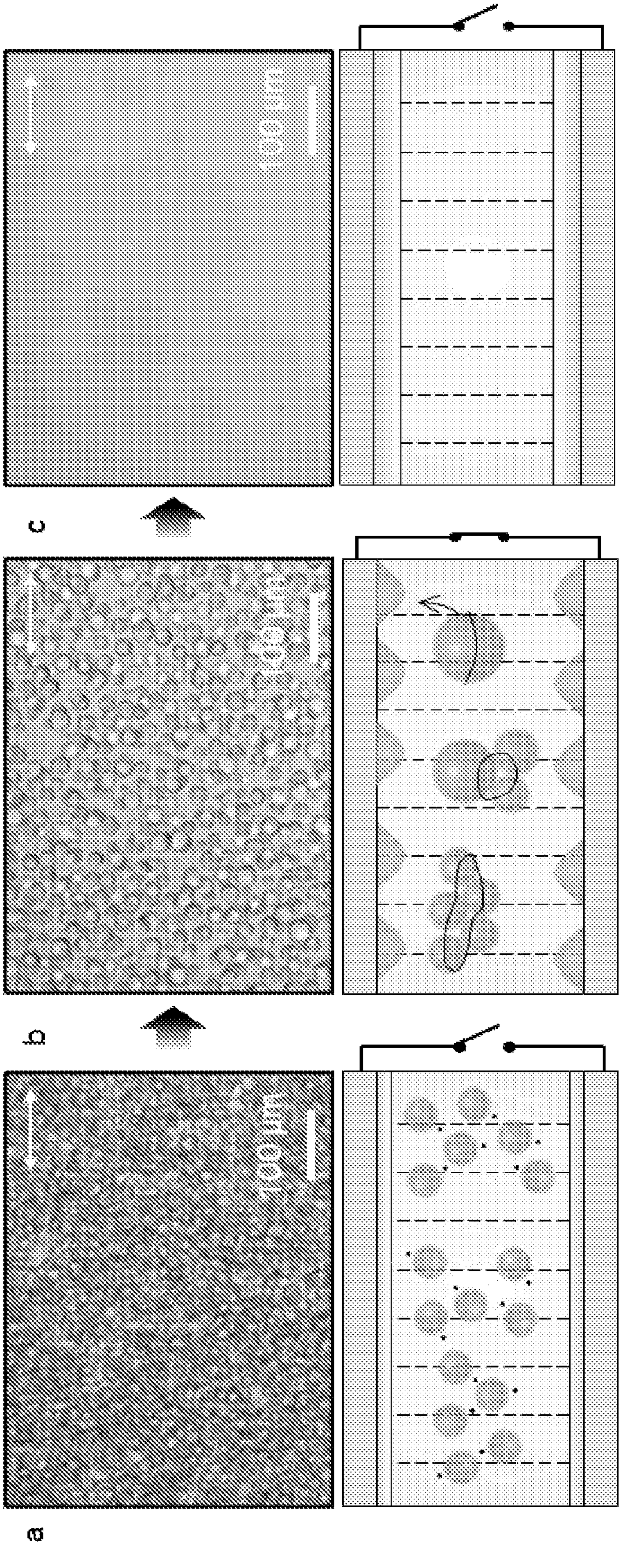
FIG. 23 shows (a) an emulsified state of a tunable emulsion consisting of 13 vol. % isotropic oil (a mixture of dioctyl phthalate and squalane) and 87 vol. % LC (E7, containing $5\times10^{-5}$ w/v % of tetrabutylammonium bromide). (b) DS droplets in E7 emulsion under an electric field (100 V/1 kHz). (c) Laminated state of isotropic oil in liquid crystal after switching off the electric field from (b). Schematic illustrations of the side-view corresponding to each micrograph are displayed under the corresponding micrographs.

FIG. 23 shows (a) emulsified state of a tunable emulsion consisting of 13 vol. % isotropic oil (a mixture of dioctyl phthalate and squalane) and 87 vol. % LC (E7, containing $5\times10^{-5}$ w/v % of tetrabutylammonium bromide). Initially, the isotropic droplets in LC were stabilized. (b) DS droplets in E7 emulsion under an electric field (100 V/1 kHz). The droplets were observed to coalesce under an electric field. (c) Laminated state of isotropic oil in liquid crystal after switching off the electric field from (b). The Laminated state is stabilized again in the absence of an electric field. The schematic illustrations of the side-view corresponding to each micrograph are displayed under the micrographs. The thickness of the cell (excluding the thickness of electrodes) was ≈100 m. Indium tin oxide (ITO) coated glasses (purchased from Sigma-Aldrich) were used as electrodes after simple rinsing with organic solvents (ethanol and acetone) without surface treatment.

Figure 24:
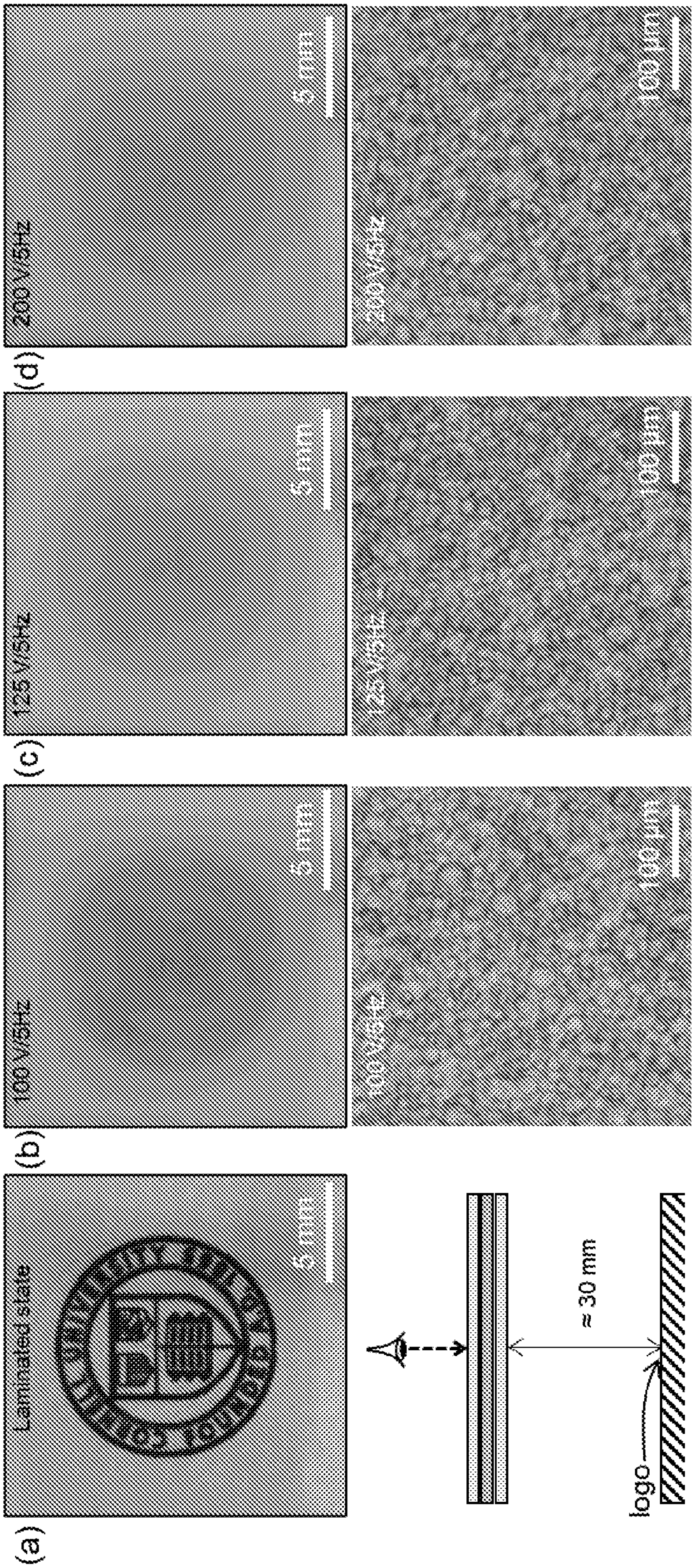
FIG. 24 shows photographs of optical cells and corresponding micrographs. (a) Laminated state (transparent), (b) emulsified state incubated for 10 mins after switching off 100V/5 Hz, and (c) emulsified state incubated for 10 mins after switching off 125V/5 Hz, (d) emulsified state incubated for 10 mins after switching off 200V/5 Hz.

FIG. 24 shows photographs of optical cells and corresponding micrographs. (a) Laminated state (transparent), (b) emulsified state incubated for 10 mins after switching off 100V/5 Hz, (c) emulsified state incubated for 10 mins after switching off 125V/5 Hz, (d) emulsified state incubated for 10 mins after switching off 200V/5 Hz. The tunable emulsion consists of 13 vol. % isotropic oil (a mixture of dioctyl phthalate and squalane) and 87 vol. % LC (E7, containing $5\times10^{5}$ w/v % of tetrabutylammonium bromide). The thickness of the cell (excluding the thickness of electrodes) was ≈100 m. Indium tin oxide (ITO) coated glasses (purchased from Sigma-Aldrich) were used as electrodes after simple rinsing with organic solvents (ethanol and acetone) without surface treatment.

Although the present disclosure has been described with respect to one or more particular examples, it will be understood that other examples of the present disclosure may be made without departing from the scope of the present disclosure.

The invention claimed is:

1. A device comprising one or more multiphase or multilayer composition(s) comprising one or more liquid crystal composition(s) and one or more isotropic liquid composition(s), wherein the one or more liquid crystal composition(s) and the one or more isotropic liquid composition(s) form coexisting phases and an interfacial tension between two of the coexisting phases is about 10 mM/m or less; and at least two conductive elements, each conductive element comprising one or more electrode(s) or an electrically conducting substrate, configured to apply one or more electric field(s) to the one or more multiphase or multilayer composition(s) such that the one or more multiphase or multilayer composition(s) exhibit(s) a plurality of states comprising a first state under and/or after applying a first electric field and a second state under and/or after applying a second electric field, wherein the plurality of states are reversible and are independently a non-emulsified state or an emulsified state.

2. The device of claim 1, wherein the device is chosen from light shutters, displays, televisions, sensors, windows, energy efficient windows, labels, electronic paper, electrooptical devices, and privacy windows.

3. The device of claim 1, wherein the at least two conductive elements comprise at least two electrically conducting substrates having at least one substrate being transparent, and wherein the one or more multiphase or multilayer composition(s) is/are disposed in a space defined by the at least two electrically conducting substrates.

4. The device of claim 3, wherein the space comprises a thickness of 1 micrometer to 1 millimeter.

5. The device of claim 1, wherein the plurality of states comprise two substantially stable states independently chosen from a transparent state, a translucent state, and an opaque state, after subjecting the one or more multiphase or multilayer composition(s) to the first electric field or the second electric field and removing the first electric field or the second electric field.

6. The device of claim 1, wherein the plurality of states comprises three states including a transparent state, a translucent state, and an opaque state.

7. The device of claim 1, wherein the first electric field and the second electric field are different in voltage and/or frequency.

8. The device of claim 7, wherein the first electric field and the second electric field have different frequencies independently from 1 Hz-50 kHz, and optionally the first electric field has a frequency of 10 Hz or less and the second electric field has a frequency of 1 kHz or more.

9. The device of claim 1, wherein the one or more multiphase or multilayer composition(s) comprise(s) one or more bubbles or droplets of the one or more isotropic liquid composition(s) dispersed in the one or more liquid crystal composition(s), and wherein the plurality of states comprises a transparent state having 5 vol. % or less of bubbles or droplets and exhibiting an optical transmission of greater than 60% for one or more optical wavelength(s).

10. The device of claim 9, wherein the bubbles or droplets have a first average size under and/or after applying a first AC electric field having a first frequency and wherein the bubbles or droplets have a second average size under and/or after applying a second AC electric field having a second frequency.

11. The device of claim 10, the first average size and/or the second average size is/are independently 4 μm to 35 μm.

12. The device of claim 1, wherein the one or more liquid crystal composition(s) independently comprise:

a mixture of 4-cyano-4'-n-pentyl-biphenyl, 4-cyano-4'-n-heptyl-biphenyl, 4-cyano-4'-n-oxyoctyl-biphenyl, and 4-cyano-4"-n-pentyl-p-terphenyl at a weight percent ratio of about 51:25:16:8;

4'-butyl-4-heptyl-bicyclohexyl-4-carbonitrile;

4-(trans-4-pentylcyclohexyl)benzonitrile;

trans-4 (4-propylcyclohexyl)-benzonitrile;

4-n-pentyl-4'-cyanobiphenyl;

4'-Heptyl-4-biphenylcarbonitrile;

n-octyloxy-cyanobiphenyl;

4-cyano-4'-pentylterphenyl;

4-cyano-4'-pentylterphenyl;

N-(p-methoxybenzylidene)-p-butylaniline;

disodium cromoglycate; or any combination thereof.

13. The device of claim 1, wherein the one or more liquid crystal composition(s) is/are present in the one or more multiphase or multilayer composition(s) at about 50 volume percent to about 99 volume percent of the coexisting phases.

14. The device of claim 1, wherein the one or more isotropic liquid composition(s) independently comprise an aliphatic compound, a compound comprising one or more aliphatic group(s), an aliphatic ether, or any combination thereof.

15. The device of claim 1, wherein the one or more isotropic liquid composition(s) independently comprise a mineral oil; a hexadecane; a dioctylphthalate; a squalane; a perfluorononane; a polydimethylsiloxane; a polyphenylmethylsiloxane; a polydiphenysiloxane; a polyether; or any combination thereof.

16. The device of claim 1, wherein the one or more isotropic liquid composition(s) comprise(s) one or more component(s) and the one or more component(s) is/are present in the one or more multiphase or multilayer composition(s) at about 1 volume percent to about 50 volume percent of the coexisting phases.

17. The device of claim 1, wherein the one or more multiphase or multilayer composition(s) independently comprise:

4-cyano-4'-n-pentyl-biphenyl, 4-cyano-4'-n-heptyl-biphenyl, 4-cyano-4'-n-oxyoctyl-biphenyl, and 4-cyano-4"-n-pentyl-p-terphenyl (E7) at a weight percent ratio of about 51:25:16:8 and mineral oil;

E7 and hexadecane;

E7 and dioctylphthalate and squalene;

E7 and dioctylphthalate;

E7 and squalene;

E7 and perfluorononane;

E7 and polydimethylsiloxane;

E7 and polyphenylmethylsiloxane;

E7 and polydiphenysiloxane; or

E7 and squalane.

18. The device of claim 1, wherein the one or more multiphase or multilayer composition(s) further comprising one or more salt(s) at about 1×10-10 percent by weight (wt %) to 10 wt % (based on the total weight of the one or more multiphase or multilayer composition(s)).

19. A device comprising:

at least two substrates or electrodes, wherein at least two of the at least two substrates or electrodes are electrically conducting substrates; and one or more composition(s) comprising:

one or more liquid crystal composition(s) independently comprising:

a mixture of 4-cyano-4'-n-pentyl-biphenyl, 4-cyano-4'-n-heptyl-biphenyl, 4-cyano-4'-n-oxyoctyl-biphenyl, and 4-cyano-4"-n-pentyl-p-terphenyl at a weight percent ratio of about 51:25:16:8, 4'-butyl-4-heptyl-bicyclohexyl-4-carbonitrile, 4-(trans-4-pentylcyclohexyl)benzonitrile, trans-4 (4-propylcyclohexyl)-benzonitrile, 4-n-pentyl-4'-cyanobiphenyl, 4'-Heptyl-4-biphenylcarbonitrile, n-octyloxy-cyanobiphenyl, 4-cyano-4'-pentylterphenyl, 4-cyano-4'-pentylterphenyl, N-(p-methoxybenzylidene)-p-butylaniline, disodium cromoglycate, or any combination thereof; and one or more isotropic liquid composition(s), wherein the one or more liquid crystal composition(s) and the one or more isotropic liquid composition(s) form coexisting phases and an interfacial tension between two of the coexisting phases is about 10 mM/m or less, the one or more composition(s) is/are disposed in a space defined by the at least two substrates, and the device is configured to apply an electric field to the one or more composition(s).

20. The device of claim 19, wherein the device is chosen from light shutters, displays, televisions, sensors, windows, energy efficient windows, labels, electronic paper, electrooptical devices, and privacy windows.

* * * * *